United States Patent
Eng et al.

(10) Patent No.: US 12,215,215 B2
(45) Date of Patent: *Feb. 4, 2025

(54) STABILIZER COMPOSITIONS AND METHODS FOR USING SAME FOR PROTECTING POLYMERIC ORGANIC MATERIALS FROM UV LIGHT AND THERMAL DEGRADATION

(71) Applicant: Cytec Industries Inc., Princeton, NJ (US)

(72) Inventors: Jerry Mon Hei Eng, Wilton, CT (US); Joseph Kozakiewicz, Trumball, CT (US); Ram B. Gupta, Stamford, CT (US); Jian-Yang Cho, Easton, CT (US); Roderick G. Ryles, Milford, CT (US); Fadi Khawam, Upper Saddle River, NJ (US)

(73) Assignee: Cytec Industries Inc., Princeton, NJ (US)

( * ) Notice: Subject to any disclaimer, the term of this patent is extended or adjusted under 35 U.S.C. 154(b) by 283 days.

This patent is subject to a terminal disclaimer.

(21) Appl. No.: 17/365,172

(22) Filed: Jul. 1, 2021

(65) Prior Publication Data

US 2022/0396691 A1 Dec. 15, 2022

Related U.S. Application Data

(62) Division of application No. 14/947,163, filed on Nov. 20, 2015, now Pat. No. 11,091,615.

(60) Provisional application No. 62/082,580, filed on Nov. 20, 2014.

(51) Int. Cl.
| | |
|---|---|
| *C08L 23/12* | (2006.01) |
| *C08K 5/00* | (2006.01) |
| *C08K 5/06* | (2006.01) |
| *C08K 5/132* | (2006.01) |
| *C08K 5/134* | (2006.01) |
| *C08K 5/1535* | (2006.01) |
| *C08K 5/3475* | (2006.01) |
| *C08K 5/3492* | (2006.01) |
| *C08K 5/357* | (2006.01) |
| *C08L 23/06* | (2006.01) |
| *C08L 77/06* | (2006.01) |

(52) U.S. Cl.
CPC ............. *C08L 23/12* (2013.01); *C08K 5/005* (2013.01); *C08K 5/06* (2013.01); *C08K 5/132* (2013.01); *C08K 5/1345* (2013.01); *C08K 5/1535* (2013.01); *C08K 5/3475* (2013.01); *C08K 5/3492* (2013.01); *C08K 5/34926* (2013.01); *C08K 5/357* (2013.01); *C08L 23/06* (2013.01); *C08L 77/06* (2013.01); *C08L 2201/08* (2013.01); *C08L 2207/062* (2013.01); *C08L 2310/00* (2013.01)

(58) Field of Classification Search
CPC ...... C08K 5/132; C08K 5/357; C08K 5/3492; C08K 5/3435; C08K 5/005; C08L 23/00; C08J 3/22

See application file for complete search history.

(56) References Cited

U.S. PATENT DOCUMENTS

| | | | |
|---|---|---|---|
| 2,976,259 | A | 3/1961 | Hardy et al. |
| 3,049,443 | A | 8/1962 | Coleman |
| 3,399,169 | A | 8/1968 | Horton |
| 4,322,455 | A | 3/1982 | Olson et al. |
| 4,446,262 | A | 5/1984 | Okumura et al. |
| 4,619,956 | A | 10/1986 | Susi |
| 4,740,542 | A | 4/1988 | Susi |
| 4,965,301 | A | 10/1990 | Leininger |
| 5,221,287 | A * | 6/1993 | Reinert ............... C08K 5/3435 544/219 |
| 5,246,988 | A | 9/1993 | Wincklhofer et al. |
| 5,262,233 | A | 11/1993 | Sudo et al. |
| 5,264,539 | A | 11/1993 | Shepherd |
| 5,414,030 | A | 5/1995 | Kotani et al. |
| 5,667,580 | A | 9/1997 | Bäbler |
| 5,760,228 | A | 6/1998 | Wateman |
| 5,869,625 | A | 2/1999 | Jaffe et al. |
| 6,013,127 | A | 1/2000 | Bäbler |
| 6,051,164 | A | 4/2000 | Samuels |
| 6,251,981 | B1 * | 6/2001 | Tanaka ................ C09D 183/02 524/457 |
| 6,414,155 | B1 | 7/2002 | Sassi et al. |

(Continued)

FOREIGN PATENT DOCUMENTS

| | | |
|---|---|---|
| EP | 0704560 A1 | 4/1996 |
| EP | 0781800 A1 | 7/1997 |

(Continued)

OTHER PUBLICATIONS

Machine translation of JP 2009007397 (2009, pages).*

(Continued)

*Primary Examiner* — Brieann R Johnston

(74) *Attorney, Agent, or Firm* — Osha Bergman Watanabe & Burton LLP

(57) ABSTRACT

Stabilizer compositions having a stabilizing amount of at least one co-active agent; an ultraviolet light absorber chosen from an ortho-hydroxy benzophenone, and/or an ortho-hydroxyphenyl benzotriazole; and a hindered amine light stabilizer, are provided herein, along with masterbatch concentrates containing same, and processes for using same for stabilizing polymeric organic materials to protect against light and thermal degradation due to exposure to UV irradiation.

28 Claims, 1 Drawing Sheet

(56) References Cited

U.S. PATENT DOCUMENTS

| | | |
|---|---|---|
| 6,630,527 B2 | 10/2003 | Pierre et al. |
| 6,677,392 B2 | 1/2004 | Ravichandran et al. |
| 6,774,232 B2 | 8/2004 | Sarkar |
| 6,843,939 B2 | 1/2005 | Stretanski et al. |
| 6,902,695 B2 | 6/2005 | Stadler |
| 7,332,105 B2 | 2/2008 | Braig et al. |
| 7,642,320 B2 | 1/2010 | McNamara et al. |
| 8,207,070 B2 | 6/2012 | Li et al. |
| 8,663,517 B2 | 3/2014 | Li et al. |
| 10,975,278 B2 * | 4/2021 | Kozakiewicz ............ C08K 5/05 |
| 11,091,615 B2 * | 8/2021 | Eng ........................ C08K 5/005 |
| 2001/0047046 A1 | 11/2001 | Gupta et al. |
| 2002/0083641 A1 | 7/2002 | Leppard et al. |
| 2003/0109629 A1 | 6/2003 | Pierre et al. |
| 2005/0049337 A1 | 3/2005 | Stretanski et al. |
| 2006/0052491 A1 | 3/2006 | Braig et al. |
| 2006/0183824 A1 * | 8/2006 | Hosaka .................... B41M 5/52 524/99 |
| 2009/0085252 A1 | 4/2009 | Minder et al. |
| 2010/0303746 A1 | 12/2010 | Mongiat et al. |
| 2011/0257265 A1 | 10/2011 | Ishaque et al. |
| 2012/0146257 A1 | 6/2012 | Eng et al. |
| 2012/0184651 A1 | 7/2012 | Hurst et al. |
| 2012/0270111 A1 | 10/2012 | Sheng-Shing et al. |
| 2013/0145962 A1 | 6/2013 | Gupta et al. |

FOREIGN PATENT DOCUMENTS

| | | | |
|---|---|---|---|
| JP | 62041240 A2 | | 2/1987 |
| JP | 2009007397 A | * | 1/2009 |
| JP | 2009102633 A | | 5/2009 |
| JP | 2014122298 A | | 7/2014 |
| WO | 200242530 A1 | | 5/2002 |

OTHER PUBLICATIONS

Written Opinion and International Search Report of PCT/US2015/061827; dated Feb. 24, 2016.

Koranit Shlosman et al.; "Controlled migration of antifog additives from LLDPE compatibilized with LLDPE grafted maleic anhydride;" Polym. Adv. Technol. vol. 25; pp. 1484-01; 2014.

Ciba (Tinuvin 1577, 2018, 19 pages).

Hauthaway (Formulating Guidlines for Hauthane Polyurethane Dispersions. Hauthaway. 2009, 4 pages).

Kremer (Tinuvin 292, Kremer Pigmente, 2017, 2 pages).

Ciba (Ciba Tinuvin 1130, Ciba Specialty Chemicals, 1997, 4 pages).

* cited by examiner

STABILIZER COMPOSITIONS AND METHODS FOR USING SAME FOR PROTECTING POLYMERIC ORGANIC MATERIALS FROM UV LIGHT AND THERMAL DEGRADATION

CROSS-REFERENCE TO RELATED APPLICATIONS

This application is a divisional of U.S. application Ser. No. 14/947,163 filed Nov. 20, 2015 (allowed), which claims the benefit of U.S. Provisional Application No. 62/082,580 filed on Nov. 20, 2014, each of which is incorporated herein by reference in its entirety.

BACKGROUND OF THE INVENTION

Field

The present invention generally relates to the field of additivation of certain organic materials with light stabilizer compositions that prevent the deleterious effects of prolonged exposure to UV radiation. More particularly, the instant disclosure relates to stabilizer compositions having certain UV light stabilizers and their use in a variety of materials such as polymeric resins to achieve improved service properties.

Description of the Related Art

A variety of organic materials are known to undergo degradation by several mechanisms including exposure to electromagnetic radiation such as sunlight and other sources of ultraviolet ("UV") radiation and heat. For example, polymeric materials such as plastics often discolor, lose gloss and mechanical properties and/or become brittle as a result of prolonged exposure to the sun. Accordingly, a large body of art has been developed directed toward materials such as UV light absorbers and various other stabilizers, which are capable of inhibiting such degradation in these materials.

In particular, UV light absorbers such as benzotriazoles and benzophenones were initially used to stabilize polymeric materials, and to prevent the degradation of such materials from exposure to UV light. Later, it was discovered that hindered amine light stabilizers ("HALS"), which scavenge free radicals formed in the polymeric material when exposed to UV light, were more effective than UV light absorbers ("UVAs"). Accordingly, the use of HALS and UV light absorbers in combination are conventionally used to stabilize polymeric materials.

The use of UVAs by themselves or in combination with HALS to stabilize polymers such as coatings and plastics against weathering due to the direct or indirect impact of heat and ultraviolet light has remained an active area of research. For example, U.S. Pat. Nos. 4,619,956; 4,740,542; and 5,760,228 disclosed compositions and/or methods of stabilizing a polymer film, coating, or a molded article against the action of light, moisture, or oxygen by incorporating aryl triazines and HATS into said polymers. It was further disclosed that such triazines exhibited an enhanced degree of stabilization due to a synergistic effect when combined with certain HALS.

Synergistic combinations of stabilizer compositions were further demonstrated by U.S. Pat. No. 6,051,164, wherein it was disclosed that polyolefins containing certain ratios of HALS (having a molecular weight of at least 500 Da) and orthohydroxyphenyl triazines provided superior performance properties over polyolefins containing either stabilizer alone or those with both HALS and triazine, but which were not in the synergistic ratio. Similarly, U.S. Pat. No. 6,843,939 disclosed synergistic UV stabilizing additive blends that included orthohydroxyphenyl triazines, HALS, and hindered hydroxybenzoates, and which provided improved performance over either stabilizer alone or combinations of only 2 of the stabilizer additives.

Furthermore, while it is the intent of most stabilizer compositions to reduce or prevent degradation caused by heat, such stabilizer compositions do not typically yield the desired result. Frequently, stabilizer compositions that are useful for reducing or preventing degradation caused by heat are hindered or completely relinquished due to the antagonistic effect when combined with compounds useful for absorption of ultraviolet light.

It is further known that particular functionalities of organic materials such as polymeric resins can be achieved by blending certain additives with the polymeric resins. For example, in certain instances it is desirable to modify the surface interface of polymeric materials to produce a variety of related surface effects such as improved slip or lubricity, reduced blocking, or to lubricate processing equipment. It may also be desirable in certain instances to modify polymeric surfaces to improve release of adhesives and promote demolding or adhesion of other materials from a polymeric composition surface. In other instances, polymer films having good clarity and optical properties, and which resist fogging, are desirous. A variety of prior art additives classified as anti-block additives, slip aids, coefficient of frictions modifiers, anti-fog agents, anti-static agents, and release aids have been used in an attempt to provide these attributes to different types of organic materials. These various prior art additives are generally described to be surface active compounds (i.e., surfactants).

Higher levels of these additives, i.e., an amount that significantly reduces the hydrophobicity of the surface of the polymeric article (as measured by contact angle), are required to achieve these intended functionalities. Thus, when added in sufficient concentration (typically at least 1-3% by weight, or higher, based on polymer) certain of these classes of additives can make the surface of a polymeric article containing such additive(s) less hydrophobic, thereby reducing the contact angle of water on the surface of the article, and imparting the desired features or properties. Although the amount of surface active additives required to reduce the contact angle can vary depending on the type(s) of additive(s) and/or polymeric resin(s) used, the total amount of such additives(s) needs to be high enough to impart the desired property to the polymer article. Read another way, whatever the precise concentration of these classes of additives that is required, the contact angle of water at the surface of the article of manufacture containing such additives(s) needs to be low enough so that the desired property (e.g., anti-fogging or antistatic), is achieved. It has been reported by Shlosman et al., *Controlled migration of antifog additives from LLDPE compatabilized with LLDPE grafted maleic anhydride, Polym. Adv. Technol.* vol. 25, pp. 1484-91 (2014), for example, that the contact angle of water on an article of manufacture containing these classes of compounds should be at or less than about 20°, and more typically less than 10°, in order to achieve the desired level of the property/surface effects for anti-fogging. However, use of these higher levels of surface active compounds which are required to achieve the desired surface effects leads to higher cost and can also often lead to undesirable properties such as blooming and poor processability. Blooming is a process whereby the polymeric article becomes supersaturated with these higher levels of surface active compounds causing the formation of unsightly precipitates at the surface of the article.

Accordingly, synergistic combinations of stabilizer additives can still be discovered even though the compounds themselves are perhaps known for individual use for a particular purpose, or are known to be used together for a particular purpose at concentrations or ratios not previously disclosed or suggested, and which do not cause undesirable performance properties such as blooming or poor processability of the organic material to which they are added.

The discovery of such synergistic stabilizer additives that substantially improve the performance characteristics of a variety of organic materials subject to mechanical stress, or effects such as oxidation, chain scission, and uncontrolled recombinations and cross-linking reactions that are caused by photo-oxidation, as well as heat, would be a useful advance in the art and could find rapid acceptance in a number of industries requiring such stabilized materials.

SUMMARY OF THE INVENTION

The foregoing and additional objects of the invention are attained in accordance with the principles of the invention described herein, wherein the inventors detail the surprising discovery that certain classes of compounds (some of which are known in the art as surface active agents being useful at various concentrations for providing antifogging, antistatic, or slip properties to polymeric resins containing same) have a synergistic effect on the stabilization properties of UV absorbers, particularly when combined with radical stabilizers such as hindered amine light stabilizers, and are effective for stabilizing a variety of organic materials susceptible to the deleterious effects caused by prolonged exposure to heat and/or light such as from electromagnetic radiation. For purposes of describing the present invention, these certain classes of additive compounds are referred to throughout the specification and claims as "co-active agents." As used throughout the specification and claims the term "UV stabilizer" shall refer to the classes of ultraviolet ("UV") light absorbers (or "UVA") or hindered amine light stabilizers ("HALS") described herein, individually as a class, or in combination with each other. Reference to UVA or HALS alone will just refer to the corresponding individual classes of compounds.

Organic materials such as polymeric resins containing a stabilizing amount of these co-active agents with UV stabilizers described herein have enhanced performance characteristics even when used at lower loading levels. Additionally, other performance problems, such as blooming of films or reduced processability of polymers, are not encountered when stabilizer compositions containing the co-active agents with UV stabilizers are used to make such films, or are blended with such polymers.

Accordingly, in a first aspect the invention provides stabilizer compositions having a stabilizing amount of an ultraviolet light absorber selected from the group consisting of orthohydroxyphenyl triazine compounds; orthohydroxybenzophenone compounds; orthohydroxyphenyl benzotriazole compounds; benzoxazinone compounds; and mixtures thereof; and a stabilizing amount of a co-active agent, wherein the co-active agent is present at from 1 wt. % to 99 wt. % based on the total weight of the stabilizer composition.

In an aspect related to the first, the invention also provides stabilizer compositions having a stabilizing amount of a hindered amine light stabilizer; a stabilizing amount of an ultraviolet light absorber selected from the group consisting of orthohydroxyphenyl triazine compounds; orthohydroxybenzophenone compounds; orthohydroxyphenyl benzotriazole compounds; benzoxazinone compounds; and mixtures thereof; and a stabilizing amount of a co-active agent, wherein the co-active agent is present at from 1 wt. % to 99 wt. % based on the total weight of the stabilizer composition.

In another aspect, the invention provides masterbatch concentrates having one or more stabilizer composition as herein described, and at least one organic material that is identical to or compatible with an organic material to be stabilized.

In still another aspect, the invention provides processes for forming a stabilized article of manufacture by combining an organic material subject to degradation and/or discoloration due to effects of light, oxygen, and/or heat (from, for example, prolonged exposure to electromagnetic radiation) with one or more stabilizer composition or masterbatch concentrate as herein described, and shaping the organic material into an article of manufacture, thereby forming a stabilized article of manufacture. Consequently, articles of manufacture made from an organic material to be stabilized, and a stabilizing amount of one or more stabilizer composition or masterbatch concentrate herein described or claimed are also provided.

The invention also provides processes for protecting an organic material from the deleterious effects of light and heat due to exposure to UV irradiation by combining the organic material with a stabilizing amount of one or more stabilizer composition or masterbatch concentrate herein described or claimed.

Finally, the invention also provides kits, having in one or more containers one or more stabilizer composition or component thereof, or one or more masterbatch concentrate, as herein described or claimed, for stabilizing an organic material subject to thermal and/or oxidative degradation due to light and heat.

These and other objects, features and advantages of this invention will become apparent from the following detailed description of the various aspects of the invention taken in conjunction with the accompanying FIGURES and Examples.

BRIEF DESCRIPTION OF THE DRAWINGS

So that the manner in which the above-recited features of the present invention can be understood in better detail, a more particular description of the invention may be had by reference to embodiments, some of which are illustrated or captured in the appended figures. It is to be noted, however, that the appended FIGURES represent only certain embodiments of this invention and should not be considered limiting of its scope, for the invention may admit to other equally effective embodiments.

DETAILED DESCRIPTION OF CERTAIN EMBODIMENTS OF THE INVENTION

Figure 1A:
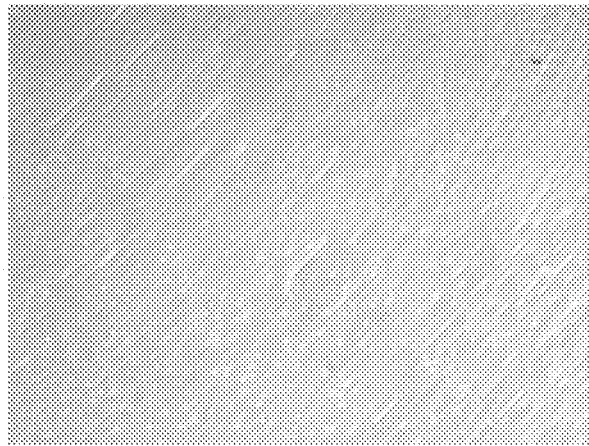
FIGS. 1A-1B correlate to the data provided in 7-(5) and 7-(6) of Table 7A, and show images of weathered polypropylene plaques exposed for 800 hrs. (A) polypropylene plaque stabilized with 0.09 wt. % of CYASORB® UV-3346 (HALS) (available from Cytec Industries, Inc., Woodland Park, NJ) and 0.01 wt. % of CYASORB® UV-1164 (orthohydroxyphenyl triazine) (available from Cytec Industries, Inc., Woodland Park, NJ) shows surface crazing (i.e., failure) at 800 hrs; (B) polypropylene plaque stabilized with 0.09 wt. % of CYASORB® UV-3346 (HALS); 0.01 wt. % of CYASORB® UV-1164 triazine; and 0.10 wt. % of BRIJ® S2 (diethylene glycol octadecyl ether) (available from Sigma Aldrich Corp., St. Louis, MO) shows a smooth surface at 800 hrs. Each plaque is shown at 40× magnification.

As summarized above, the present invention is based on the discovery that additive compounds currently known in the art as being useful at certain concentrations for providing a variety of performance functions (e.g., antifogging, antistatic, or slip properties) to polymer resins or manufactured articles containing same have a synergistic effect on the stabilization properties of UV stabilizers, and are effective for stabilizing a variety of organic materials susceptible to the deleterious effects caused by exposure to UV light, heat and/or oxidation—even at concentrations lower than those typically used to achieve other performance functions exemplified in the prior art.

Materials containing the stabilizer compositions described herein provide such improved performance properties against exposure to electromagnetic and thermal radiation as compared to state of the art stabilizer compositions, that the results were entirely surprising and unexpected. Although only certain classes of these additive compounds having a synergistic effect with the stabilization properties of UV stabilizers on organic materials are described herein, the invention encompasses any additive, or mixtures of additives, that acts synergistically with the UV stabilizers to stabilize organic materials from the deleterious effects of UV light, heat and/or oxidation. In some instances these classes of additive compounds impact the surface tension on an article of manufacture containing the stabilizer compositions according to the invention, wherein the contact angle of water at the surface of the article is above 20°. Preferably the contact angle of water at the surface of an article containing the stabilizer compositions as herein described is higher than 25°.

Accordingly, as used throughout the specification and claims, the term "co-active agent" shall refer to any such additive compound, or mixtures of additive compounds, (and not necessarily a surfactant) that acts synergistically with UV absorbers alone or in combination with hindered amine light stabilizers to help stabilize organic materials from the deleterious effects of UV light, heat and/or oxidation. The stabilizer compositions containing these co-active agents are optionally capable of providing a contact angle with water at the surface of an article of manufacture containing the stabilizer compositions according to the invention of greater than 20°.

Stabilizer Compositions. The stabilizer compositions according to the present invention are suitable for use in stabilizing various organic materials subject to mechanical stress, discoloration, or effects such as oxidation, chain scission, and uncontrolled recombinations and cross-linking reactions that are caused by photo-oxidation and can be incorporated into such organic material to protect it from these deleterious effects, or it can be used as, or within, a UV filter layer for preventing UV radiation from reaching the organic material or an article of manufacture produced with the organic material.

The stabilizer compositions according to the invention can be readily combined with an organic material to be stabilized, or vice versa, by any suitable method known to those of skill in the art. As used herein the term "combined" or "combining" in reference to the stabilizer composition and the organic material to be stabilized includes all manners and/or techniques known to those skilled in the art for intermixing, admixing, integrating, mixing, or blending two or more substances. In certain embodiments, the components of the stabilizer compositions can be combined with the material to be stabilized by at least one technique chosen from extruding, pelletizing, grinding, and molding. In other embodiments, combining can be performed by at least one of melting, dissolution in a solvent, direct mixing, and dry mixing.

The incorporation of the stabilizer compositions according to the invention, and of optional further co-stabilizers and/or co-additives, into the organic materials to be stabilized can be carried out by known methods such as dry blending in the form of a powder, or wet mixing in the form of solutions, dispersions, or suspensions for example in an inert solvent, water, or oil. Such stabilizer compositions are preferably non-aqueous. The incorporation of co-active agent and UV stabilizers for the stabilizer composition, and optional further co-stabilizers and/or co-additives, into the organic material to be stabilized can be carried out by any suitable method known to those of skill in the art and include, for example, before or after molding, or also by applying the dissolved or dispersed stabilizer mixture to the organic material to be stabilized, with or without subsequent evaporation of the solvent or suspension/dispersion agent. They may be added directly into processing apparatus (e.g., extruders, internal mixers, kneaders etc.) as a dry mixture or powder, or as a solution or dispersion, or suspension or melt.

Individual components of the stabilizer compositions according to the invention, and optional further co-stabilizers and/or co-additives, can also be combined into organic materials such as polymers at a time before, during, or just after, for example, polymerization of corresponding monomers, or before crosslinking. In this context, the stabilizer compositions according to the invention can also be combined into the organic material to be stabilized in pure form (i.e., neat and directly to the resin) or encapsulated in waxes, oils or polymers.

Various additives can also be preblended (i.e., mixed together) for simple addition to an organic material to be stabilized. Individual components of the stabilizer composition, and optional further co-stabilizers and/or co-additives, can also be sprayed onto the organic material to be stabilized. They are able to dilute other conventional additives or their melts so that they can also be sprayed together with these additives onto the materials to be stabilized. Addition by spraying during the deactivation of any polymerization catalysts can be particularly advantageous as the steam evolved can be used for deactivation of the catalyst. In the case of spherically polymerized polymers, for example, it may be advantageous to apply individual additive components of the stabilizer composition optionally together with other additives, by spraying.

Accordingly, in one aspect the invention provides stabilizer compositions having a stabilizing amount of an ultraviolet light absorber (UVA) selected from the group consisting of orthohydroxyphenyl triazine compounds; orthohydroxybenzophenone compounds; orthohydroxyphenyl benzotriazole compounds; benzoxazinone compounds; and mixtures thereof; and from 1 wt. % to 99 wt. % of a co-active agent based on the total weight of the stabilizer composition. In certain embodiments, the stabilizer compositions can further include a stabilizing amount of a hindered amine light stabilizer (HALS).

Reference has been made to this point to the stabilizer composition of the invention as a "neat" composition (i.e., not diluted or mixed with other substances) containing the co-active agent and the UV stabilizer, which can optionally include further UV stabilizers, co-stabilizers, and/or co-additives. In another aspect, however, the invention also includes masterbatch concentrates having a stabilizer composition as described in any embodiment herein, and an organic material that is identical to or compatible with an organic material to be stabilized. In this context, the organic material identical to or compatible with the organic material to be stabilized acts as a carrier vehicle of the stabilizer compositions described herein, which is then admixed with the organic material to be stabilized. While the amount of stabilizer composition present as a portion of the total masterbatch concentrate will vary based on, for example, the type of material to be stabilized and/or its end-use application, in some embodiments the stabilizer composition will be present in an amount from 10 wt. % to 90 wt. %, based on the total weight of the masterbatch concentrate. In other embodiments, the stabilizer composition can be present at from 30 wt. % to 80 wt. %; or from 40 wt. % to 75 wt. % of the total weight of masterbatch concentrate.

In yet another aspect of the stabilizer compositions described herein, the invention provides kits having in one or more containers at least one stabilizer composition as described herein, or a co-active agent and UV stabilizer of such stabilizer compositions, and/or an organic material to be stabilized. The kit may include single or multiple components of at least one stabilizer composition according to the invention, at least one material to be stabilized (e.g., a polymer composition such as a polyolefin), and optionally at least one further co-stabilizer and/or co-additive, each packaged or formulated individually. In other embodiments, the kit can have single or multiple components of at least one stabilizer composition according to the invention, at least one material to be stabilized, and optionally at least one further co-stabilizer and/or co-additive packaged or formulated in combination.

Thus, one or more components of a stabilizer composition as herein described (e.g., co-active agent+UVA; co-active agent+HALS, or co-active agent+UVA+HALS) can be present in first container, and the kit can optionally include one or more components of the stabilizer composition and/or a material to be stabilized in a second or further container. The container or containers can be placed within a package, and the package can optionally include administration or mixing instructions in the form of a label or website address on the package, or in the form of an insert included in the packaging of the kit. A kit can also include additional components or other means for administering or mixing the components, as well as solvents or other means for formulation.

Co-active Agents. As discussed above, the co-active agents refer to any additive or additive mixtures that acts synergistically with a UV absorber, optionally in combination with HALS, to effectively stabilize organic materials from the deleterious effects of UV light, heat and/or oxidation. In certain embodiments, the combination of co-active agent and UV absorber, and optionally in combination with HALS, does not significantly reduce the surface tension properties of the organic material such that an article of manufacture made therefrom possesses a contact angle with water at the surface of such article of manufacture of greater than 20°. While certain of these co-active agents have been known in the art as being useful at certain concentrations for providing specific properties to the materials in which they are contained, it was heretofore unknown that these co-active agents provide a synergistic effect on the stabilization properties of UV absorbers, optionally in combination with radical stabilizers such as hindered light amines, and as demonstrated for the first time prove to be effective for stabilizing a variety of organic materials susceptible to the deleterious effects caused by exposure to heat and/or light such as from electromagnetic radiation.

In certain embodiments the stabilizing amount of co-active agent for the stabilizer compositions described herein can be selected from the group consisting of $C_{12}$-$C_{60}$ alcohols; alkoxylated alcohols or monoalkyl ethers thereof; alkoxylated esters of fatty acids; sorbitan esters or ethoxylates thereof; mono- or polyglycerol esters having from 1 to 20 glycerol units, or alkoxylates thereof; alkoxylated fatty amines, esters thereof, or salts thereof; sugar esters; alkoxylated fatty amides; alkoxylated natural oils; ethylene oxide/propylene oxide copolymers; and mixtures thereof.

In some embodiments, the co-active agent can be a $C_{12}$-$C_{60}$ alcohol, which can be monohydric, polyhydric, or a mixture of the two. When the co-active agent is a monohydric alcohol, the monohydric alcohol can be a $C_{12}$-$C_{36}$ alkanol, and preferably $C_{12}$-$C_{22}$, that is a primary, secondary, linear, branched, or cyclic (i.e., cycloalkanol) alcohol. Such alcohols are well known to those skilled in the art and are commercially available by a number of suppliers under various trade names. Generally suitable alkanols for the present invention include, but are not limited to, 1-dodecanol; 1-tridecanol; 1-tetradecanol; 1-pentadecanol; 1-hexadecanol; 1-heptadecanol; 1-octadecanol; 1-nonadecanol; 1-eicosanol; 1-docosanol; 1-tetracosanol; 1-hexacosanol; 1 octacosanol; 1-triacontanol; 2-methyl-1-undecanol; 2-propyl-1-nonanol; 2-butyl-1-octanol; 2-methyl-1-tridecanol; 2-ethyl-1-dodecanol; 2-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-heptyl-1-decanol; 2-hexyl-1-nonanol; 2-octyl-1-octanol; 2-methyl-1-heptadecanol; 2-ethyl-1-hexadecanol; 2-propyl-1-pentadecanol; 2-butyl-1-tetradecanol; 1-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetradecanol; 3-tetradecanol; 4-tetradecanol; 5-tetradecanol; 6-tetradecanol; tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol; 9-octadecanol; 9-octadedcanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol; and mixtures thereof.

In the same or other embodiments, the co-active agent can include an alkoxylated alcohol, or a monoalkyl ether thereof. In certain embodiments, the co-active agent can be an alkoxylated alcohol, or monalkyl ether thereof, according to Formula (III):

R—(OCHR'CH$_2$)$_y$—OR"  (III)

wherein R is a hydrocarbyl group having from 12 to 60 carbon atoms; R' is chosen from H or $C_1$-$C_4$ alkyl; R" is chosen from H or a hydrocarbyl group having from 1 to 10 carbon atoms; and y is an integer from 1 to 100.

The term "hydrocarbyl" as used herein is a generic term encompassing aliphatic, alicyclic and aromatic groups having an all-carbon backbone and consisting of carbon and hydrogen atoms. In certain cases, as defined herein, one or more of the carbon atoms making up the carbon backbone may be optionally replaced or interrupted by a specified atom or group of atoms, such as by one or more heteroatom of N, O, and/or S. Examples of hydrocarbyl groups include alkyl, cycloalkyl, cycloalkenyl, carbocyclic aryl, alkenyl, alkynyl, alkylcycloalkyl, cycloalkylalkyl, cycloalkenylalkyl, and carbocyclic aralkyl, alkaryl, aralkenyl and aralkynyl groups.

Such hydrocarbyl groups can also be optionally substituted by one or more substituents as defined herein. The examples and preferences expressed below also apply to each of the hydrocarbyl substituent groups or hydrocarbyl-containing substituent groups referred to in the various definitions of substituents for compounds of the formulas described herein unless the context indicates otherwise.

Preferred non-aromatic hydrocarbyl groups are saturated groups such as alkyl and cycloalkyl groups. Generally, and by way of example, the hydrocarbyl groups can have up to one hundred carbon atoms, unless the context requires otherwise. Hydrocarbyl groups with from 1 to 60 carbon atoms are preferred, with 1 to 36 carbons more preferred. Within the sub-set of hydrocarbyl groups, particular examples are $C_{12-60}$ hydrocarbyl groups, $C_{12-30}$ hydrocarbyl groups, $C_{12-22}$ hydrocarbyl groups, $C_{1-10}$ hydrocarbyl groups, or $C_{1-4}$ hydrocarbyl groups, although any individual value, range, or combination of values selected from $C_1$ through $C_{60}$ hydrocarbyl groups is contemplated by the inventors as if specifically recited herein.

As indicated by the context used herein, the term "alkyl" is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s- and t-butyl, pentyl, hexyl, or cyclohexyl and the like. Preferred alkyl groups include those of $C_{36}$ or below.

Accordingly, in certain embodiments, R of Formula (III) can be an alkyl group having from 12 to 30 carbon atoms. In other embodiments, R can contain from 12 to 22 carbon atoms, and ideally from 12 to 18 carbons, or 12 to 15 carbons.

The terms "alkoxy," "alkoxyalkyl," or "alkoxylated" as used herein refer to groups of from 1 to 20 carbon atoms of a straight, branched, or cyclic configuration, or combinations thereof either attached to the parent structure through an oxygen atom, or incorporated into the backbone of a moiety via an oxygen atom. Examples include methoxy, ethoxy, propoxy, isopropoxy, butoxy, cyclopropyloxy, cyclohexyloxy and the like.

Thus, in certain embodiments, or in the same embodiments as those previously described with respect to Formula (III), R' can be methyl or ethyl. In still other embodiments, R' can be H.

Accordingly, in certain embodiments the stabilizer compositions according to the present invention can include a co-active agent that can be alkoxylated with one or more alkoxide. In some embodiments, the co-active agent according to Formula (III) can be ethoxylated. In other embodiments, the co-active agent according to Formula (III) can be propoxylated. In the same or other embodiments, the co-active agent according to Formula (III) can include a mixture of ethoxylated alcohols and propoxylated alcohols, or can be an alcohol that is both ethoxylated and propoxylated.

While the degree of alkoxylation (i.e., the number of ethoxy and/or propoxy groups in the co-active agent) can vary amongst co-active agents, the degree of alkoxylation contemplated by the inventors for the co-active agents described herein ranges from 1 to 100. In certain embodiments, the degree of alkoxylation given by "y" of the co-active agent according to Formula (III) can range from 1 to 75. In other embodiments, the degree of alkoxylation can range from 2 to 25, or from 2 to 12.

In any of the embodiments discussed above for the co-active agent according to Formula (III), the co-active agent can be an alcohol, such as when R" is H. In other embodiments, the co-active agent can be a monoalkyl ether derived from such alcohol, such as when R" is a hydrocarbyl having from 1 to 10 carbon atoms. In one embodiment where the co-active agent is a monoalkyl ether according to Formula (III), R" is methyl.

In certain embodiments, the co-active agent can be selected from one or more of the following ethoxylated and/or propoxylated alcohols, wherein the alcohol is chosen from docosyl alcohol; stearyl alcohol; oleyl alcohol; cetyl alcohol; isotridecyl alcohol; lauryl alcohol; $C_{12}$-$C_{30}$ alcohols; $C_{16}$/$C_{18}$ alcohol mixtures; $C_{20}$-$C_{50}$ alcohols; or monoalkyl ethers of these ethoxylated and/or propoxylated alcohols. In a particular embodiment, the co-active agent is an ethoxylated and propoxylated $C_{12}$-$C_{30}$ alcohol. In another particular embodiment, the co-active agent can be a mixture of ethoxylated and propoxylated $C_{12}$-$C_{15}$ alcohols having from 2 to 5 ethylene oxide groups and propylene oxide groups.

While the alkoxylated alcohols or monoalkyl ethers thereof according to Formula (III) of the invention can be made by known methods already available to those of ordinary skill in the art, there are also a host of such compounds presently commercially available. Such commercially available alkoxylated compounds include, but are not limited to, any of the alkoxylated alcohols commercially available or known under the BRIJ® trade name (available from Sigma Aldrich, St. Louis, MO); JEECOL® (available from Jeen Int'l Corp.); NOVEL® (available from Sasol Olefins & Surfactants, Hamburg, Germany); UNITHOX® Ethoxylates (available from Baker Hughes, Inc.); GENAPOL® (available from Clariant SE, Switzerland); and HETOXOL® (available from Global Seven, Rockaway, NJ). While the compounds can generally be in any form (i.e., liquid, solid, semi-solid, flake, pastille), solids or semi-solid forms are preferred.

In certain embodiments, the co-active agent can be chosen from any one or more of diethylene glycol octadecyl ether (available as BRIJ® S2); triethylene glycol octadecyl ether (available as BRIJ® S3); 2-(dodecyloxy) ethanol (available as laureth 2); polyoxyethylene (5) octadecyl ether (available as Steareth-5); polyoxyethylene (10) octadecyl ether (available as JEECOL® SA-10); polyoxyethylene (2) oleyl ether (available as BRIJ® 93); polyoxyethylene docosyl ether (available as NOVEL® 22-4); polyoxyethylene (2.6) saturated linear, $C_{20}$ to $C_{50}$ synthetic alcohol (available as UNITHOX® 420); $C_{12}$-$C_{15}$ oxo alcohol having 2 EO and 5 PO (available as GENAPOL® EP 2525); $C_{12}$-$C_{15}$ oxo alcohol having 5 EO and 2 PO (available as GENAPOL® EP 2552); or polyoxyethylene (4) oleyl ether (available as HETOXOL® OL-4).

Esters of fatty acids have a wide range of commercial applications and their alkoxylated forms are also suitable for use as co-active agents in the stabilizer compositions according to the invention. The term "ester" has its ordinary meaning as used throughout the specification and claims and refers to compounds where a hydroxyl group of the reference compound is replaced with an —OCO-alkyl group. Any acid derived from fats by hydrolysis is suitable but it must include at least one alkoxide. The fatty acid can be linear, branched, or cyclic, and can be monounsaturated, polyunsaturated, or saturated.

In an embodiment, the alkoxylated esters of fatty acids can include mono- or di-esters of (poly)ethylene or (poly)propylene glycol. As used herein the term "(poly)ethylene glycol" refers to "polyethylene glycol" as well as "ethylene glycol." The same applies to the term "(poly)propylene glycol." In certain embodiments, one or more ester portion of the (poly)ethylene or (poly)propylene glycol is independently chosen from a hydrocarbyl group having from 12 to 30 carbon atoms. In a particular embodiment, the hydrocarbyl can be an alkyl group having from 12 to 18 carbon atoms.

Commercially available mono- or di-esters of (poly)ethylene or (poly)propylene glycol include any of those under the brand name PEGOSPERSE® (available from Lonza, Ltd. Switzerland). Thus, in various embodiments the co-active agent can be an ethoxylated and/or propoxylated ester of fatty acid chosen from one or more of ethylene glycol monostearate, ethylene glycol distearate, diethylene glycol monostearate, diethylene glycol distearate, diethylene glycol monooleate, diethylene glycol monolaurate, polyethylene glycol monostearate, polyethylene glycol distearate, polyethylene glycol monooleate, polyethylene glycol dioleate, polyethylene glycol monotallate, polyethylene glycol ditallate, polyethylene glycol monocaprylate/caprate, polyethylene glycol monolaurate, polyethylene glycol dilaurate, 2-(2-hydroxyethoxy)ethyl dodecanoate; polyethylene glycol beeswax, mannitol monooleate, natural oil ethoxylates/propoxylates, ricinoleic acid ethoxylates; or pentaerythrityl dioleate.

In other embodiments, the co-active agent can be sorbitan esters, or ethoxylates thereof, which have also been shown to act synergistically with the UV stabilizers to provide improved stabilization properties in an organic material stabilized with these compounds.

Preparation of sorbitan esters can be achieved by reacting sorbitol with a fatty acid of interest to make the corresponding fatty acid ester according to techniques and under conditions well known to those skilled in the art. Sorbitan esters and ethoxylates thereof are also commercially available from various suppliers under different trade names. Sorbitan esters are available under their generally recognized chemical name from Sigma Aldrich, St. Louis, MO, or under the PROTACHEM® tradename from Protameen Chemicals, Totowa, NJ. Sorbitan ester ethoxylates are commercially available as TWEEN® (available from Sigma Aldrich Corp.) or JEESORB® (available from JEEN® Int'l Corp.) among others.

In certain embodiments, the co-active agent can include, but are not limited to, one or more sorbitan ester chosen from sorbitan monolaurate; sorbitan monopalmitate; sorbitan monostearate; sorbitan monooleate; sorbitan monotallate; sorbitan sesquioleate; or sorbitan tristearate. Sorbitan monstearate is a particularly suitable sorbitan ester for use as a co-active agent with the present invention in certain embodiments.

In other embodiments, the co-active agent can include sorbitan ester ethoxylates. While those skilled in the art will recognize that there are many sorbitan ester ethoxylates suitable for use as a co-active agent with the stabilizer compositions according to the present invention, particularly suitable sorbitan ester ethoxylates include one or more chosen from polysorbate 20 (available as TWEEN® 20); polysorbate 21 (available as TWEEN® 21); polysorbate 40 (available as TWEEN® 40); polysorbate 60 (available as TWEEN® 60); polysorbate 61 (available as TWEEN® 61); polysorbate 80 (available as TWEEN® 80); or polysorbate 81 (available as TWEEN® 81).

Monoglycerol and polyglycerol esters, and ethoxylates thereof, are also suitable for use as co-active agents with the stabilizer compositions of the present invention. In certain embodiments the number of glycerol units can be up to and including 20. In other embodiments, the number of glycerol units can be up to and including 10. In the same or other embodiments, the one or more ester portion of the monoglycerol or polyglycerol ester can be independently chosen from a hydrocarbyl group having from 12 to 30 carbon atoms. In a particular embodiment, the ester portion can include a $C_{12}$-$C_{18}$ alkyl group, which can also include mixtures of isomers of those alkyl groups.

Accordingly, in certain embodiments the co-active agent can be one or more monoglycerol ester or polyglycerol ester chosen from glycerol monostearate; glycerol distearate; glycerol oleate; glycerol triisostearate; diglycerol monostearate; diglycerol diisostearate; diglycerol monooleate; triglycerol monostearate; hexaglycerol distearate; polyglyceryl-10 monostearate; polyglyceryl-10 monooleate; polyglycerol-10-dipalmitate; polyglycerol-10 decaoleate; polyglycerol-3 polyricinoleate; polyglycerol ester of vegetable-based fatty acids; polyglycerol-4 caprate; polyglycerol-3 caprate; polyglycerol-4 isostearate; polyglycerol-3 oleate; polyglycerol-6 distearate; polyglyceryl-9 stearate; or polyglycerol-4 oleate. Such compounds are generally commercially available from various suppliers under different trade names such as POLYALDO®™ (from Lonza Ltd, Switzerland) or CITHROL®™ (from Croda Int'l Plc, UK).

Ethoxylated forms of the monoglycerol esters and polyglycerol esters described above are also useful as co-active agents in the stabilizer compositions of the present invention. Thus, in certain embodiments the co-active agent includes, but is not limited to, diglycerol distearate ethoxylates; glycerol stearate ethoxylates; glycerol oleate ethoxylates; glycerol laurate ethoxylates; glycerol cocoate ethoxylates; diglycerol distearate ethoxylates; and diglycerol laurate ethoxylates.

Other ethoxylated monoglycerol esters include ethoxylated castor oil or its hydrogenated form, and are also suitable for use as co-active agents in the stabilizer compositions according to the invention. Such ethoxylated castor oil or ethoxylated hydrogenated castor oil include those available from Croda Int'l Plc (UK) under the tradenames ETOCAS®™ 5, CRODURET®™ 7, and CRODURET®™ 25. Those skilled in the art will appreciate that various natural oil ethoxylates can also be suitable for use as a co-active agent and can include, for example, those from soya oil; groundnut oil; neem oil; and palm oil.

Sugar esters can also be used as co-active agents in the stabilizer compositions described herein. The sugars can be monosaccharides, disaccharides, or oligosaccharides and the ester portion is preferably derived from a fatty acid having from 12 to 24 carbon atoms. Representative monosaccharides include, but are not limited to, glucose, fructose, and galactose. Preferred disaccharides include, but are not limited to, sucrose, maltose, and lactose. While those skilled in the art will appreciate that there are, therefore, numerous sugar esters of fatty acids that can be used as the co-active agent, particularly suitable compounds include, but are not limited to, sucrose stearate; sucrose distearate; sucrose polystearate; sucrose monopalmitate; sucrose laurate; and sucrose polypalmitate. One such sucrose stearate is commercially available from Croda Int'l Plc (UK) under the trade name CRODESTA®™ F-160.

In still further embodiments, the co-active agent can be an alkoxylated fatty amine according to Formula (IV)

esters thereof, or salts thereof,
or an alkoxylated fatty amide according to Formula (V)

wherein $R^4$ of Formula (IV) and Formula (V) is independently chosen from a $C_8$-$C_{60}$ hydrocarbyl group, optionally interrupted with one or more hetero atoms; and each of $R^2$ and $R^3$ of Formula (IV) and Formula (V) is independently chosen from H, a $C_1$-$C_{30}$ alkyl, or (—$CH_2CHR^5O$-)n-H, wherein $R^5$ is chosen from H or methyl, and n is an integer from 1 to 100; and provided that at least one of $R^2$ or $R^3$ of Formula (IV) and Formula (V) is chosen from (—$CH_2CHR^5O$-)n-H.

In some embodiments, $R^4$ of Formula (IV) and Formula (V) can be independently chosen from an alkyl group having from 8 to 30 carbon atoms. In certain embodiments of the co-active agent according to Formula (IV) or Formula (V), the alkyl group may contain from 12 to 22 carbon atoms. In the same or other embodiments, the alkyl group may be interrupted by one or more hetero atom chosen from N, O, or S. In one particular embodiment when the co-active agent according to either Formula (IV) or Formula (V) is interrupted, it is interrupted by one or more oxygen atom.

As previously indicated, the degree of alkoxylation contemplated by the co-active agents according to Formula (IV) and Formula (V) ranges from 1 to 100 for each of $R^2$ and/or $R^3$ when chosen from (—$CH_2CHR^5O$-)n-H, as provided by the value assigned to "n". In certain embodiments, the degree of alkoxylation of the co-active agent according to Formula (IV) or Formula (V) can range from 1 to 75. In other embodiments, the degree of alkoxylation can range from 2 to 25, or from 2 to 12. For all embodiments, the degree of alkoxylation can be as beTWEEN either one of $R^2$ or $R^3$, or as a combined total for the co-active agent of either Formula (IV) or Formula (V). In a particular embodiment, the total degree of alkoxylation can be 20 (i.e., the total value of "n" among $R^2$ and/or $R^3$ in either Formula (IV) or Formula (V) is 20).

Commercially available alkoxylated fatty amines include, but are not limited to, any of the alkoxylated fatty amines under the brand name TOMAMINE® (available from Air Products and Chemicals Inc., Allentown, PA); ETHOMEEN® (available from Akzo Nobel N.V., Netherlands); and GENAMIN® (available from Clariant SE, Switzerland). Thus, in certain embodiments the co-active agent of the stabilizer composition according to the present invention can be an alkoxylated fatty amine according to Formula (IV) and may be chosen from ethoxylated and/or propoxylated forms of one or more chosen from stearyl amines; oleyl amines; tallow amines; hydrogenated tallow amines; cetyl amines; capryl amines; or cocoamines. In a particular embodiment, oleyl amine can be ethoxylated and propoxylated.

Salts of any of the alkoxylated fatty amines according to Formula (IV) are also suitable as co-active agents. While those skilled in the art will recognize that any fatty acid salts of the alkoxylated fatty amines according to Formula (IV) would be suitable for use as a co-active agent for use in the stabilizer compositins according to the invention, a particularly advantageous salt includes carboxylic acid salts. In certain embodiments, the carboxylic acid salts of alkoxylated fatty amines according to Formula (IV) can be derived from a carboxylic acid moiety having from 2 to 30 carbon atoms. In a particular embodiment, the carboxylic acid moiety can have from 12 to 24 carbon atoms.

Commercially available alkoxylated fatty amides include, but are not limited to, any of the alkoxylated fatty amides under the brand name PROTAMIDE®™ (available from Protameen Chemicals, Totowa, NJ); or SERDOX® (available from Elementis Specialties, East Windsor, NJ). Thus, in some embodiments of the invention the co-active agent of the stabilizer composition according to the present invention can be an alkoxylated fatty amide according to Formula (V) and can be chosen from one or more of cocoamide monoethanolamine; cocoamide diethanolamine; lauramide diethanolamine; oleamide diethanolamine; oleamide monoethanolamine; or ethoxylated and/or propoxylated forms thereof.

In certain instances, it may be desirable to further alkoxylate the fatty amides according to Formula (V). Thus, in some embodiments the alkoxylated fatty amides according to Formula (V) can be further alkoxylated with from 1 to 50 ethylene oxide and/or propylene oxide groups.

Yet another class of co-active agent suitable for use in the stabilizer compositions according to the present invention includes block copolymers of ethylene oxide/propylene oxide (EO/PO) monomers. In certain embodiments, the ratio of EO/PO monomers can be from 1:99 to 99:1. In a particular embodiment, the ratio of EO/PO can be from 1:9 to 9:1. In the same or other embodiments, the weight average molecular weight of such copolymers can be up to and including 15,000 Da, wherein the wt. % of oxy ethylene is from 10 wt. % to 90 wt. % based on the total weight of the copolymer. In some embodiments, the weight average molecular weight of the EO/PO block copolymers can be up to and including 10,000 Da. Commercially available forms of such EO-PO block copolymers include any of those under the PLURONIC® brand (available from BASF, Germany) including, but not limited to, PLURONIC® L31; L81; L101; L62; L43; L35; and F38.

UV stabilizers and co-additives. With regard to the UV stabilizer system of the stabilizer composition, the inventors have also surprisingly discovered that only orthohydroxyphenyl triazines are an effective class of triazines for use in combination with the co-active agent of the stabilizer composition. Solubility measurements of various orthohydroxyphenyl triazines in cyclohexane (substitute for polypropylene) conducted at room temperature indicate that such triazines having a solubility greater than 0.04 wt. % can be used in certain embodiments as the UV absorber of the stabilizer compositions described herein. Orthohydroxyphenyl triazines were shown to have a solubility in cyclohexane of greater than 0.04 wt. % as reported by Tables 7A and 7B below.

Orthohydroxyphenyl triazines are well known in the art and in the field of stabilizer additive technology. They have been disclosed and treated in many references and patents including U.S. Pat. Nos. 6,051,164; and 6,843,939, the orthohydroxyphenyl triazines compounds of which are incorporated herein by reference. Particularly preferred orthohydroxyphenyl triazines include 2-(2'-hydroxyphenyl)-1,3,5-triazine compounds according to Formula (I):

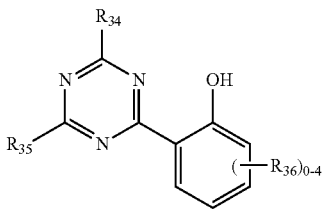

(I)

wherein $R_{34}$ and $R_{35}$ are the same or different and are independently chosen from a $C_6$-$C_{10}$ aryl group, wherein the $C_6$-$C_{10}$ aryl group is optionally substituted at from 1 to 3 substitutable positions with one or more group chosen from OH, halogen, $C_1$-$C_{12}$ alkyl, $C_1$-$C_{12}$ alkoxy, $C_{1-12}$ alkoxyester, $C_{2-12}$ alkanoyl, or phenyl, wherein the phenyl is optionally substituted at from 1 to 3 substitutable positions with one or more group chosen from: hydroxyl, halogen, $C_{1-12}$ alkyl, $C_{1-12}$ alkoxy, $C_{1-12}$ alkoxyester, or $C_{2-12}$ alkanoyl;

mono- or di-$C_1$-$C_{12}$ hydrocarbyl-substituted amino;

$C_2$-$C_{12}$ alkanoyl;

$C_1$-$C_{12}$ alkyl;

$C_1$-$C_{10}$ acyl; or $C_1$-$C_{10}$ alkoxyl; and $R_{36}$ is a substituent that is the same or different at from 0 to 4 positions of the phenoxy portion of Formula (I) and is independently chosen from hydroxyl, halogen, $C_1$-$C_{12}$ alkyl, $C_1$-$C_{12}$ alkoxy, $C_1$-$C_{12}$ alkoxyester, $C_2$-$C_{12}$ alkanoyl; phenyl; or $C_1$-$C_{12}$ acyl.

Commercially available orthohydroxyphenyl triazines include, but are not limited to, those under the trade names CYASORB® UV-1164 (available from Cytec Industries Inc., Woodland Park, NJ); TINUVIN® 1577FF or TINUVIN® 400 (available from BASF, Ludwigshafen, Germany). In certain embodiments the orthohydroxyphenyl triazine compound of the stabilizer composition includes, but is not limited to, one or more of the following compounds:

4,6-bis-(2,4-dimethylphenyl)-2-(2-hydroxy-4-octyloxyphenyl)-s-triazine;

2-(4,6-diphenyl-1,3,5-triazin-2-yl-)-5-((hexyl)oxyl-phenol;

4,6-bis-(2,4-dimethylphenyl)-2-(2,4-dihydroxyphenyl)-s-triazine;

2,4-bis(2,4-dihydroxyphenyl)-6-(4-chlorophenyl)-s-triazine;

2,4-bis[2-hydroxy-4-(2-hydroxy-ethoxy)phenyl]-6-(4-chlorophenyl)-s-triazine;

2,4-bis[2-hydroxy-4-(2-hydroxy-4-(2-hydroxy-ethoxy)phenyl]-6-(2,4-dimethylphenyl)-s-triazine;

2,4-bis[2-hydroxy-4-(2-hydroxyethoxy)phenyl]-6-(4-bromophenyl)-s-triazine;

2,4-bis[2-hydroxy-4-(2-acetoxyethoxy)phenyl]-6-(4-chlorophenyl)-s-triazine;

2,4-bis(2,4-dihydroxyphenyl)-6-(2,4-dimethylphenyl)-s-triazine;

2,4-bis(4-biphenylyl)-6-[2-hydroxy-4-[(octyloxycarbonyl)ethylideneoxy]phenyl]-s-triazine;

2,4-bis(4-biphenylyl)-6-[2-hydroxy-4-(2-ethylhexyloxy)phenyl]-s-triazine;

2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;

2,4-bis(2,4-dimethylphenyl)-6-[2-hydroxy-4-(-3-benzyloxy-2-hydroxypropyloxy)phenyl]-s-triazine;

2,4-bis(2-hydroxy-4-n-butyloxyphenyl)-6-(2,4-di-n-butyloxyphenyl)-s-triazine;

2,4-bis(2,4-dimethylphenyl)-6-[2-hydroxy-4-(3-nonyloxy-2-hydroxypropyloxy)-5-α-cumylphenyl]-s-triazine;

methylenebis-{2,4-bis(2,4-dimethylphenyl)-6-[2-hydroxy-4-(3-butyloxy-2-hydroxypropoxy)phenyl]-s-triazine;

methylene bridged dimer mixture bridged in the 3:5', 5:5' and 3:3' positions in a 5:4:1 ratio;

2,4,6-tris(2-hydroxy-4-isooctyloxycarbonyliso-propylideneoxy-phenyl)-s-triazine;

2,4,6,-tris(2-hydroxy-4-octyloxy-phenyl)-1,3,5-triazine;

2,4-bis(2,4-dimethylphenyl)-6-(2-hydroxy-4-hexyloxy-5-α-cumylphenyl)-s-triazine;

2-(2,4,6-trimethylphenyl)-4,6-bis[2-hydroxy-4-(3-butyloxy-2-hydroxypropyloxy)phenyl]-s-triazine;

2,4,6-tris[2-hydroxy-4-(3-sec-butyloxy-2-hydroxypropyloxy)-phenyl]-s-triazine;

mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine;

4,6-bis-(2,4-dimethylphenyl)-2-(2-hydroxy-4(3-(2-ethylhexyloxy)-2-hydroxypropoxy)-phenyl)-s-triazine; or 4,6-diphenyl-2-(4-hexyloxy-2-hydroxyphenyl)-s-triazine.

Other UVAs that are suitable for use with the co-active agents described herein include one or more of orthohydroxybenzophenones, orthohydroxyphenylbenzotriazoles, or benzoxazinone compounds. In some embodiments, the UVA component of the stabilizer composition includes orthohydroxytriazines, orthohydroxybenzophenones, orthohydroxyphenyl benzotriazoles, or benzoxazinones individually. In other embodiments, the UVA component includes a combination of two or more of such UVA compounds. Orthohydroxybenzophenones, orthohydroxybenzotriazles, and benzoxazinones are also well known to those skilled in the art of stabilizer additive technology. Their suitability for use as a component of stabilizer compositions has been previously disclosed and treated in at least U.S. Pat. Nos. 2,976,259; 3,049,443; 3,399,169; 4,322,455; 4,446,262; 5,264,539; 6,051,164; 6,677,392; and 6,774,232, as well as U.S. Publication No. 2006/0052491, the benzophenones, benzotriazoles, and benzoxazinones of which are incorporated herein by reference as suitable for use with the stabilizer compositions of the instant invention.

Some other non-limiting examples of orthohydroxybenzophenones for use with the stabilizer compositions contemplated herein include any one or more of 2-hydroxy-4-methoxybenzophenone (commercially available from Cytec Industries Inc. as CYASORB® UV-9); 2,2'-dihydroxy-4-methoxybenzophenone (commercially available from Cytec Industries Inc. as CYASORB® UV-24); 2-hydroxy-4-octyloxybenzophenone (commercially available from Cytec Industries Inc. as CYASORB® UV-531); 2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'- trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; or 2-hydroxy-4-ethoxy-4'-bromobenzophenone.

Some other non-limiting examples of orthohydroxyphenyl benzotriazoles useful in the UVA component of the stabilizer compositions described herein include any one or more of those commercially available from Cytec Industries Inc. (e.g., CYASORB® UV-5411), or 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3',5'-di-tert-amyl-2'-hydroxyphenyl)benzotriazole (commercially available from Cytec Industries Inc. as CYASORB® UV-2337); 2-(3',5'-bis(α,α-dimethylbenzyl)-2'-hydroxyphenyl)benzotriazole; 2-(3'-tert-butyl-2'-hydroxy-5'-(2-octyloxycarbonylethyl)phenyl)benzotriazole; 2,2'-methylene-bis [4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-(α,α-dimethylbenzyl)-5'-(1,1,3,3-tetramethyl-butyl)phenyl] benzotriazole; 5-trifluoromethyl-2-(2-hydroxy-3-α-cumyl-5-tert-octylphenyl)-2H-benzotriazole; 2-(2'-hydroxy-5'-(2-hydroxyethyl)phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; or 2-(2'-hydroxy-3'-di-tert-butylphenyl)-benzotriazole.

Non-limiting examples of benzoxazinones useful in the UVA portion of the stabilizer compositions described herein include any one or more chosen from 2-methyl-3,1-benzoxazin-4-one; 2-butyl-3,1-benzoxazin-4-one; 2-phenyl-3,1-benzoxazin-4-one; 2-(1- or 2-naphthyl)-3,1-benzoxazin-4-one; 2-(4-biphenyl)-3,1-benzoxazin-4-one; 2-p-nitrophenyl-3,1-benzoxazin-4-one; 2-m-nitrophenyl-3,1-benzoxazin-4-one; 2-p-benzoylphenyl-3,1-benzoxazin-4-one; 2-p-methoxyphenyl-3,1-benzoxazin-4-one; 2-O-methoxyphenyl-3,1-benzoxazin-4-one; 2-cyclohexyl-3,1-benzoxazin-4-one; 2-p-(or m-)phthalimidephenyl-3,1-benzoxazin-4-one; N-phenyl-4-(3,1-benzoxazin-4-one-2-yl) phthalimide; N-benzoyl-4-(3,1-benzoxazine-4-one-2-yl) aniline; N-benzoyl-N-methyl-4-(3,1-benzoxazin-4-one-2-yl)-aniline; 2-[p-(N-phenylcarbamonyl)phenyl]-3,1-benzoxazin-4-one; 2-[p-(N-phenyl N-methylcarbamoyl) phenyl]-3,1-benzoxazin-4-one; 2,2'-bis(3,1-benzoxazin-4-one); 2,2'-ethylenebis(3,1-benzoxazin-4-one); 2,2'-tetramethylenebis(3,1-benzoxazin-4-one); 2,2'-hexamethylenebis(3,1-benzoxazin-4-one); 2,2'-decamethylenebis(3,1-benzoxazin-4-one); 2,2'-p-phenylenebis(3,1-benzoxazin-4-one); 2,2'-m-phenylenebis (3,1-benzoxazin-4-one); 2,2'-(4,4'-diphenylene)bis(3,1-benzoxazin-4-one); 2,2'-(2,6- or 1,5-naphthalene)bis(3,1-benzoxazin-4-one); 2,2'-(2-methyl-p-phenylene)bis(3,1-benzoxazin-4-one); 2,2'-(2-nitro-p-phenylene)bis(3,1-benzoxazin-4-one); 2,2'-(2-chloro-p-phenylene)bis(3,1-benzoxazin-4-one); 2,2'-(1,4-cyclohexylene)bis(3,1-benzoxazin-4-one); N-p-(3,1-benzoxazin-4-on-2-yl)phenyl; 4-(3,1-benzoxazin-4-on-2-yl)phthalimide; N-p-(3,1-benzoxazin-4-on-2-yl)benzoyl; 4-(3,1-benzoxazin-4-on-2-yl)aniline; 1,3,5-tri(3,1-benzoxazin-4-on-2-yl)benzene; 1,3,5-tri (3,1-benzoxazin-4-on-2-yl)naphthalene; or 2,4,6-tri(3,1-benzoxazin-4-on-2-yl)naphthalene.

As previously discussed HALS compounds scavenge free radicals formed in polymeric materials when exposed to UV light, and are more effective than when certain UVAs are used alone. The benefits imparted by various HALS compounds in combination with UVAs have been demonstrated in at least U.S. Pat. Nos. 6,051,164 and 6,843,939, which teachings are incorporated herein by reference. Accordingly, in certain embodiments the stabilizer compositions described herein can further include a stabilizing amount of one or more HALS compound that includes a functional group according to Formula (II):

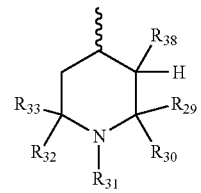

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy;

$R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or a functional group according to Formula (IIa):

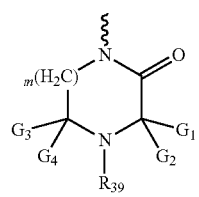

wherein m is an integer from 1 to 2;

$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ is independently chosen from $C_1$-$C_{20}$ hydrocarbyl.

Exemplary HALS compounds contemplated for use as a component of the stabilizer compositions described herein can include one or more of those commercially available from Cytec Industries Inc. such as mixture of 4-hexadecyloxy- and 4-stearyloxy-2,2,6,6-tetramethylpiperidine (e.g., CYASORB® UV-3853), or bis(2,2,6,6-tetramethylpiperidin-4-yl) sebacate; bis(2,2,6,6-tetramethylpiperidin-4-yl) succinate; bis(1,2,2,6,6-pentamethylpiperidin-4-yl)sebacate; bis(1-octyloxy-2,2,6,6-tetramethylpiperidin-4-yl) sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine (commercially available from Cytec Industries Inc. as CYASORB® UV-3346); a condensate of N,N'-bis(2,2,6,6-tetramethylpiperidin-4-yl)hexamethylenediamine and 4-morpholino-2,6-dichloro-1,3,5-triazine, methylated (commercially available from Cytec Industries Inc. as CYASORB® UV-3529); a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino)ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino) ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol,1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperidinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl)pyrrolidine-2,5-dione; 1H-pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyltris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl) pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl)3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5)pentamethylene-1,5-diazepin-2-one; TINUVIN® XT 200 (available from BASF); or 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated (TINUVIN® NOR 371, available from BASF).

The UVA portion of the stabilizer composition as described herein is specifically contemplated to include in various embodiments a combination of one or more orthohydroxyphenyl triazines and one or more HALS compounds. The weight ratio of HALS compound(s) to triazine compound(s) in such embodiments can be from 1:5 to 30:1, and preferably from 3:1 to 20:1. In some embodiments, it may be advantageous to replace the orthohydroxyphenyl triazines in the UVA portion of the stabilizer composition with an orthohydroxybenzophenone compound, an orthohydroxyphenyl benzotriazole compound, and/or a benzoxazinone compound in combination with a HALS compound in various suitable ratios to achieve a desired performance property of an organic material to be stabilized.

Similarly, in some embodiments the stabilizer compositions as heretofore described can include any one or more further class of conventional co-stabilizers that include, but are not limited to, hindered benzoates, thioesters, hydroxylamines, antioxidants, hindered phenols, phosphites, phosphonites, benzofuranones, or nitrones. One or more conventional co-additive known to those skilled in the art can also be included, such as, but not limited to, nucleating agents, fillers, metallic stearates, metal oxides, reinforcing agents, plasticizers, lubricants, rheology agents, catalysts, leveling agents, optical brighteners, anti-static agents, blowing agents, flame retardants, dyes, or pigments. Such conventional co-stabilizers and co-additives are well known to those skilled in the art and can include, for example, any of those described in at least U.S. Pat. Nos. 7,642,320 and 8,207,070.

Suitable hindered benzoates or benzamides for use with the UVA portion of the stabilizer composition include those according to Formula (VI):

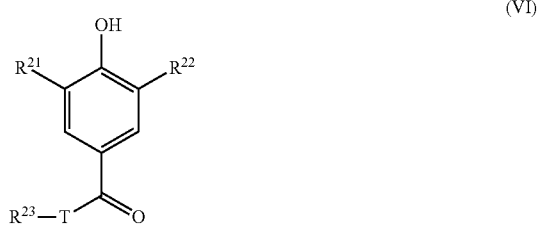

wherein each of $R^{21}$ and $R^{22}$ is independently chosen from a $C_{1-12}$ alkyl;

T is chosen from O or $NR^{24}$, where $R^{24}$ is H or a $C_{1-30}$ hydrocarbyl; and $R^{23}$ is H or a $C_{1-30}$ hydrocarbyl.

Preferred hindered benzoates can include any one or more of those commercially available from Cytec Industries Inc. such as hexadecyl-3,5-di-tert-butyl-4-hydroxybenzoate (e.g., CYASORB® UV-2908), or 2,4-di-tert-butylphenyl-3,5-di-tert-butyl-4-hydroxybenzoate; octadecyl-3,5-di-tert-butyl-4-hydroxybenzoate; octyl-3,5-di-tert-butyl-4-hydroxybenzoate; decyl-3,5-di-tert-butyl-4-hydroxybenzoate; dodecyl-3,5-di-tert-butyl-4-hydroxybenzoate; tetradecyl-3,5-di-tert-butyl-4-hydroxybenzoate; behenylyl-3,5-di-tert-butyl-4-hydroxybenzoate; 2-methyl-4,6-di-tert-butylphenyl-3,5-di-tert-butyl-4-hydroxybenzoate; or butyl-3-[3-t-butyl-4-(3,5-di-t-butyl-4-hydroxybenzoyloxy)phenyl]propionate.

Suitable thioesters, hydroxylamines, antioxidants, hindered phenols, phosphites, phosphonites, benzofuranones, nitrones, and co-additives include any of those disclosed in U.S. Publication Nos. 2004/0152807; 2009/0085252; 2012/0146257; and 2013/0145962, which are expressly incorporated herein by reference, or known to those skilled in the art.

Preferred hydroxylamines include, but are not limited to, any one or more of N,N-dihydrocarbylhydroxylamine chosen from: N,N-dibenzylhydroxylamine; N,N-diethylhydroxylamine; N,N-dioctylhydroxylamine; N,N-dilaurylhydroxylamine; N,N-didodecylhydroxylamine; N,N-ditetradecylhydroxylaamine; N,N-dihexadecylhydroxylamine; N,N-dioctadecylhydroxylamine; N-hexadecyl-N-tetradecylhydroxylamine; N-hexadecyl-N-heptadecylhydroxylamine; N-hexadecyl-N-octadecylhydroxyl amine; N-heptadecyl-N-octadecylhydroxylamine; and N,N-di(hydrogenated tallow)hydroxylamine.

The weight ratio of the co-active agent to the UV stabilizer portion of the stabilizer composition can vary depending on the components within the UV stabilizer portion, the type of material to be stabilized, and/or the application of the stabilized material. In general, the ratio of the co-active agent to the UVA can be present at a weight ratio from 1:50 to 200:1; 1:40 to 100:1; or 1:30 to 50:1. In certain embodiments, the weight ratio of the co-active agent to the UVA+HALS of the stabilizer composition can be from 1:20 to 50:1. In other embodiments, the ratio of the co-active agent to the UVA+HALS portion is suitable from 1:10 to 40:1; or from 1:5 to 20:1.

Processes/Articles of manufacture. Reference has also been made to use of the stabilizer compositions according to the present invention for stabilizing an organic material. Accordingly, another aspect of the present invention provides processes for stabilizing an organic material subject to degradation and/or discoloration due to effects from light, oxygen, and/or heat, as well as the articles of manufacture thereby obtained. These processes are each achieved by adding before, during, or after processing a stabilizing amount of a stabilizer composition according to the invention as described throughout the specification and claims to the organic material to be stabilized. In certain embodiments, the stabilizer composition can be added to the organic material to be stabilized as a neat composition. In other embodiments, a masterbatch concentrate as described herein can be added to the organic material to be stabilized.

In certain aspects, the invention also provides processes for forming a stabilized article of manufacture, or for protecting an organic material from degradation due to the effects of light and/or heat from UV irradiation, by combining an organic material with a stabilizer composition as herein described. The process can further include shaping the organic material into an article of manufacture by extruding, molding, blowing, casting, thermoforming, or compacting the organic material into an article of manufacture, thereby forming a stabilized article of manufacture. In some embodiments, the process can include combining the organic material with a masterbatch concentrate as herein described.

Those of skill in the art will appreciate that the stabilizer compositions and processes are suitable for use with, and readily adapted to, any industrial polymeric molding process including, but not limited to, injection molding, rotomolding, blow molding, reel-to-reel molding, metal injection molding, compression molding, transfer molding, dip molding, gas assist molding, insert injection molding, micro molding, reaction injection molding, two shot injection molding, as well as any variations or combinations thereof.

In certain embodiments, the stabilizer composition can be present in the stabilized organic material (e.g., in an article of manufacture) from 0.01 wt. % to 15.0 wt. % (i.e., any value from 0.01 wt. % to 15.0 wt. %, including any value therebetween such as 0.01 wt. %; 0.02 wt. %; 0.03 wt. %; 0.04 wt. %; 0.05 wt. %; 0.075 wt. %; 0.10 wt. %; 0.15 wt. %; 0.20 wt. %; 0.25 wt. %; 0.30 wt. %; 0.35 wt. %; 0.50 wt. %; 0.75 wt. %; 1.0 wt. %; 1.5 wt. %; 2.0 wt. %; 2.5 wt. %; 3.0 wt. %; 3.5 wt. %; 5.0 wt. %; 7.5 wt. %; 10.0 wt. %; 12.0 wt. %; 14.0 wt. %; or 15.0 wt. %) based on the total weight of the stabilized organic material, and in some cases based on the number and type of stabilizing additives being added and/or the characteristics of the material to be stabilized.

Accordingly, another aspect of the invention also includes an article of manufacture having an organic material to be stabilized; and a) from 0.01 wt. % to 15 wt. %, based on the total weight of the article of manufacture, of a stabilizer composition including i) a stabilizing amount of an ultraviolet light absorber (UVA) selected from the group consisting of: orthohydroxyphenyl triazine compounds; orthohydroxybenzophenone compounds; orthohydroxyphenyl benzotriazole compounds; benzoxazinone compounds; and mixtures thereof;

ii) from 1 wt. % to 99 wt. % based on the total weight of the stabilizer composition of a co-active agent; and iii) a stabilizing amount of a hindered amine light stabilizer compound (HALS) comprising a functional group according to Formula (II):

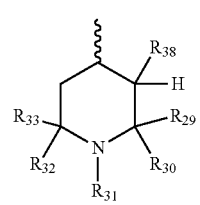

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or R₃₂ and R₃₃ taken together with the carbon to which they are attached form a $C_5$-$C_{10}$ cycloalkyl; or a functional group according to Formula (IIa):

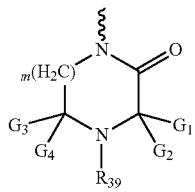

(IIa)

wherein
m is an integer from 1 to 2;
$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and
each of $G_1$-$G_4$ is independently chosen from $C_1$-$C_{20}$ hydrocarbyl; or
mixtures of HALS compounds having functional groups according to Formula (II) and Formula (IIa); or
b) a masterbatch concentrate as described herein;
such that the final concentration of the co-active agent in the article of manufacture is from 0.01 wt. % to 5 wt. %, based on the weight of the article of manufacture.

In some embodiments, the stabilizer composition or masterbatch concentrate can be present from 0.02 wt. % to 20 wt. % based on the total weight of the stabilized organic material, or from 0.05 wt. % to 10 wt. % based on the total weight of the stabilized organic material. In the same or other embodiments, the final concentration of the co-active agent in the article of manufacture can be from 0.01 wt. % to 2 wt. %; from 0.01 wt. % to 1 wt. %; or from 0.05 wt. % to 0.50 wt. %, based on the weight of the article of manufacture. Those of ordinary skill in the art will be able to readily determine the amount and type of stabilizing additive(s) that should be added based on preparations as known and/or described in the literature, or through no more than routine experimentation.

In certain embodiments, articles of manufacture formed with stabilizer compositions as herein described or claimed can be further characterized and distinguished in that the contact angle of water droplets at the surface of the stabilized material can be from 10° to 100°; preferably greater than 20°; more preferably greater than 50°; more preferably still greater than 75°.

Organic materials for stabilization. Various nonliving organic materials suitable for stabilizing include, but are not limited to, polyolefins, poly(ethylene-vinyl acetate) (EVA); polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins (TPO), aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, coating compositions, radiation curable compositions, epoxymelamine resins, organic dyes, cosmetic products, cellulose-based paper formulations, photographic film paper, fibers, waxes, and inks.

In certain embodiments, the nonliving organic material to be stabilized is a polyolefin. Polyolefins suitable for use with the stabilizer composition according to the invention include, but are not limited to:

(A) Polymers of monoolefins, for example polypropylene, polyisobutylene, polybut-1-ene, and poly-4-methylpent-1-ene, polymers of diolefins such as polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE);

(B) Polyolefins, i.e. the polymers of monoolefins exemplified in (A), preferably polyethylene and polypropylene, can be prepared by different, and especially by the following, methods: i) radical polymerisation (normally under high pressure and at elevated temperature); or ii) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC);

(C) Mixtures of the polymers mentioned under (A), for example mixtures of polypropylene with polyisobutylene, polypropylene with polyethylene (for example PP/HDPE, PP/LDPE) and mixtures of different types of polyethylene (for example LDPE/HDPE); and (D) Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in (A) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Particularly preferred organic materials for stabilizing and providing articles of manufacture include polyolefin polymers such as i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) thermoplastic olefins (TPO); vi) copolymers thereof; and vii) mixtures thereof.

In a particular embodiment, the organic material can be polyethylene or polypropylene and can be combined with a stabilizing amount of a stabilizer composition having from 0.01 wt. % to 5 wt. %, based on the weight of the stabilized material, of co-active agent in the form of diethylene glycol octadecyl ether, and from 0.001 wt. % to 5 wt. %, based on the weight of the stabilized material, of orthohydroxyphenyl triazine in the form of 4,6-bis-(2,4-dimethylphenyl)-2-(2-hydroxy-4-octyloxyphenyl)-s-triazine. In the same or further embodiments, the amount of co-active agent can be from 0.01 wt. % to 1 wt. %, and the stabilizer composition can also include from 0.01 wt. % to 5 wt. %, based on the weight of the stabilized material, of hindered amine light stabilizer in the form of a condensate of N,N'-bis(2,2,6,6-tetramethyl-4-piperidinyl)-1,6-hexanediamine polymers with morpholine-2,4-dichloro-1,3,5-triazine reaction products, methylated, or non-methylated. In the same or further embodiments, the orthohydroxyphenyl triazine can be replaced, either in whole or in any part, by an equivalent amount of orthohydroxybenzophenone in the form of 2-hydroxy-4-octyloxybenzophenone, and/or by an equivalent amount of orthohydroxyphenyl benzotriazole in the form of 2-(2'-hydroxy-5'-octylphenyl)-benzotriazole. In the same or further embodiments, the stabilizer composition can also include from 0.01 wt. % to 5 wt. %, based on the weight of the stabilized material, of a hindered benzoate in the form of hexadecyl-3,5-di-tert-butyl-4-hydroxybenzoate.

Various Embodiments. As described herein, the present invention includes at least the following embodiments:

Embodiment 1. A stabilizer composition comprising:

i) a stabilizing amount of an ultraviolet light absorber (UVA) selected from the group consisting of: orthohydroxyphenyl triazine compounds; orthohydroxybenzophenone compounds; orthohydroxyphenyl benzotriazole compounds; benzoxazinone compounds; and mixtures thereof;

ii) a stabilizing amount of a co-active agent selected from the group consisting of $C_{12}$-$C_{60}$ alcohols; alkoxylated alcohols or monoalkyl ethers thereof; alkoxylated esters of fatty acids; sorbitan esters or ethoxylates thereof; mono- or polyglycerol esters having from 1 to 20 glycerol units or alkoxylates thereof; alkoxylated fatty amines, esters thereof, or salts thereof; sugar esters; alkoxylated fatty amides; ethylene oxide/propylene oxide copolymers; and mixtures thereof, wherein the co-active agent is present at from 1 wt. % to 99 wt. % based on the total weight of the stabilizer composition; and iii) a stabilizing amount of a hindered amine light stabilizer compound (HALS) comprising a functional group according to Formula (II):

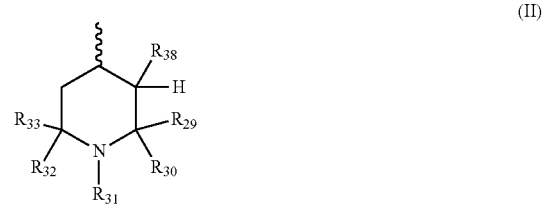

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or a functional group according to Formula (IIa):

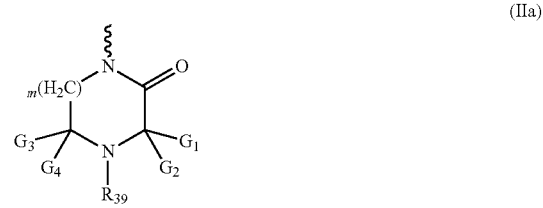

(IIa)

wherein m is an integer from 1 to 2;

$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ is independently chosen from $C_1$-$C_{20}$ hydrocarbyl; or mixtures of HALS compounds having functional groups according to Formula (II) and Formula (IIa).

Embodiment 2. A stabilizer composition according to embodiment 1, wherein the UV absorber is an orthohydroxyphenyl triazine compound having a solubility in cyclohexane of greater than 0.04 wt. %.

Embodiment 3. A stabilizer composition according to embodiment 1 or embodiment 2, wherein the orthohydroxyphenyl triazine compound is a 2-(2'-hydroxyphenyl)-1,3,5-triazine compound according to Formula (I):

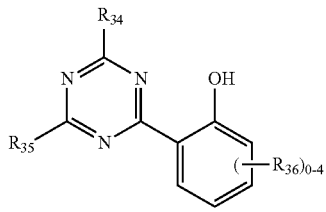

wherein

R$_{34}$ and R$_{35}$ are the same or different and are independently chosen from a C$_6$-C$_{10}$ aryl group, wherein the C$_6$-C$_{10}$ aryl group is optionally substituted at from 1 to 3 substitutable positions with one or more group chosen from OH, halogen, C$_1$-C$_{12}$ alkyl, C$_1$-C$_{12}$ alkoxy, C$_{1-12}$ alkoxyester, C$_{2-12}$ alkanoyl, or phenyl, wherein the phenyl is optionally substituted at from 1 to 3 substitutable positions with one or more group chosen from: hydroxyl, halogen, C$_{1-12}$ alkyl, C$_{1-12}$ alkoxy, C$_{1-12}$ alkoxyester, or C$_{2-12}$ alkanoyl;

mono- or di-C$_1$-C$_{12}$ hydrocarbyl-substituted amino;

C$_2$-C$_{12}$ alkanoyl;

C$_1$-C$_{12}$ alkyl;

C$_1$-C$_{10}$ acyl; or

C$_1$-C$_{10}$ alkoxyl; and

R$_{36}$ is a substituent that is the same or different at from 0 to 4 positions of the phenoxy portion of Formula (I) and is independently chosen from hydroxyl, halogen, C$_1$-C$_{12}$ alkyl, C$_1$-C$_{12}$ alkoxy, C$_1$-C$_{12}$ alkoxyester, C$_2$-C$_{12}$ alkanoyl; phenyl; or C$_1$-C$_{12}$ acyl.

Embodiment 4. A stabilizer composition according to embodiment 3, wherein the 2-(2'-hydroxyphenyl)-1,3,5-triazine compound is selected from the group consisting of 4,6-bis-(2,4-dimethylphenyl)-2-(2-hydroxy-4-octyloxyphenyl)-s-triazine;

2-(4,6-diphenyl-1,3,5-triazin-2-yl-)-5-((hexyl)oxyl-phenol;

4,6-bis-(2,4-dimethylphenyl)-2-(2,4-dihydroxyphenyl)-s-triazine;

2,4-bis(2,4-dihydroxyphenyl)-6-(4-chlorophenyl)-s-triazine;

2,4-bis[2-hydroxy-4-(2-hydroxy-ethoxy)phenyl]-6-(4-chlorophenyl)-s-triazine;

2,4-bis[2-hydroxy-4-(2-hydroxy-4-(2-hydroxy-ethoxy)phenyl]-6-(2,4-dimethylphenyl)-s-triazine;

2,4-bis[2-hydroxy-4-(2-hydroxyethoxy)phenyl]-6-(4-bromophenyl)-s-triazine;

2,4-bis[2-hydroxy-4-(2-acetoxyethoxy)phenyl]-6-(4-chlorophenyl)-s-triazine;

2,4-bis(2,4-dihydroxyphenyl)-6-(2,4-dimethylphenyl)-s-triazine;

2,4-bis(4-biphenylyl)-6-[2-hydroxy-4-[(octyloxycarbonyl)ethylideneoxy]phenyl]-s-triazine;

2,4-bis(4-biphenylyl)-6-[2-hydroxy-4-(2-ethylhexyloxy)phenyl]-s-triazine;

2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine;

2,4-bis(2,4-dimethylphenyl)-6-[2-hydroxy-4(-3-benzyloxy-2-hydroxypropyloxy)phenyl]-s-triazine;

2,4-bis(2-hydroxy-4-n-butyloxyphenyl)-6-(2,4-di-n-butyloxyphenyl)-s-triazine;

2,4-bis(2,4-dimethylphenyl)-6-[2-hydroxy-4-(3-nonyloxy-2-hydroxypropyloxy)-5-α-cumylphenyl]-s-triazine;

methylenebis-{2,4-bis(2,4-dimethylphenyl)-6-[2-hydroxy-4-(3-butyloxy-2-hydroxypropoxy)phenyl]-s-triazine};

methylene bridged dimer mixture bridged in the 3:5', 5:5' and 3:3' positions in a 5:4:1 ratio;

2,4,6-tris(2-hydroxy-4-isooctyloxycarbonyliso-propylideneoxy-phenyl)-s-triazine;

2,4,6,-tris(2-hydroxy-4-octyloxy-phenyl)-1,3,5-triazine;

2,4-bis(2,4-dimethylphenyl)-6-(2-hydroxy-4-hexyloxy-5-α-cumylphenyl)-s-triazine;

2-(2,4,6-trimethylphenyl)-4,6-bis[2-hydroxy-4-(3-butyloxy-2-hydroxypropyloxy)phenyl]-s-triazine;

2,4,6-tris[2-hydroxy-4-(3-sec-butyloxy-2-hydroxypropyloxy)-phenyl]-s-triazine;

mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine;

4,6-bis-(2,4-dimethylphenyl)-2-(2-hydroxy-4(3-(2-ethylhexyloxy)-2-hydroxypropoxy)-phenyl)-s-triazine;

4,6-diphenyl-2-(4-hexyloxy-2-hydroxyphenyl)-s-triazine; and mixtures thereof.

Embodiment 5. A stabilizer composition according to any one of embodiments 1 to 4, wherein the UV absorber includes a orthohydroxybenzophenone compound selected from the group consisting of 2-hydroxy-4-methoxybenzophenone; 2,2'-dihydroxy-4-methoxybenzophenone; 2-hydroxy-4-octyloxybenzophenone; 2,2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone; 2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4- ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; and mixtures thereof.

Embodiment 6. A stabilizer composition according to any one of embodiments 1 to 5, wherein the UV absorber includes an orthohydroxyphenyl benzotriazole compound selected from the group consisting of 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3'-tert-butyl-5'-methyl-butyl-2'hydroxyphenyl)-5-chlorobenzotriazole; 2-(3',5'-di-tert-amyl-2'-hydroxyphenyl)benzotriazole; 2-(3',5'-bis(α,α-dimethylbenzyl)-2'-hydroxyphenyl)benzotriazole; 2-(3'-tert-butyl-2'-hydroxy-5'-(2-octyloxycarbonyl-ethyl)phenyl)benzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-(α,α-dimethylbenzyl)-5'-(1,1,3,3-tetramethyl-butyl) phenyl]benzotriazole; 5-trifluoromethyl-2-(2-hydroxy-3-α-cumyl-5-tert-octylphenyl)-2H-benzotriazole; 2-(2'-hydroxy-5'-(2-hydroxyethyl)phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; 2-(2'-hydroxy-3'-di-tert-butylphenyl)-benzotriazole; and mixtures thereof.

Embodiment 7. A stabilizer composition according to any one of embodiments 1 to 6, wherein the UV absorber includes a benzoxazinone compound selected from the group consisting of 2-methyl-3,1-benzoxazin-4-one; 2-butyl-3,1-benzoxazin-4-one; 2-phenyl-3,1-benzoxazin-4-one; 2-(1- or 2-naphthyl)-3,1-benzoxazin-4-one; 2-(4-biphenyl)-3,1-benzoxazin-4-one; 2-p-nitrophenyl-3,1-benzoxazin-4-one; 2-m-nitrophenyl-3,1-benzoxazin-4-one; 2-p-benzoylphenyl-3,1-benzoxazin-4-one; 2-p-methoxyphenyl-3,1-benzoxazin-4-one; 2-O-methoxyphenyl-3,1-benzoxazin-4-one; 2-cyclohexyl-3,1-benzoxazin-4-one; 2-p-(or m-)phthalimidephenyl-3,1-benzoxazin-4-one; N-phenyl-4-(3,1-benzoxazin-4-one-2-yl)phthalimide; N-benzoyl-4-(3,1-benzoxazine-4-one-2-yl)aniline; N-benzoyl-N-methyl-4-(3,1-benzoxazin-4-one-2-yl)-aniline; 2-[p-(N-phenylcarbamonyl)phenyl]-3,1-benzoxazin-4-one; 2-[p-(N-phenyl N-methylcarbamoyl)phenyl]-3,1-benzoxazin-4-one; 2,2'-bis(3,1-benzoxazin-4-one); 2,2'-ethylenebis(3,1-benzoxazin-4-one); 2,2'-tetramethylenebis(3,1-benzoxazin-4-one); 2,2'-hexamethylenebis(3,1-benzoxazin-4-one); 2,2'-decamethylenebis(3,1-benzoxazin-4-one); 2,2'-p-phenylenebis(3,1-benzoxazin-4-one); 2,2'-m-phenylenebis(3,1-benzoxazin-4-one); 2,2'-(4,4'-diphenylene)bis(3,1-benzoxazin-4-one); 2,2'-(2,6- or 1,5-naphthalene)bis(3,1-benzoxazin-4-one); 2,2'-(2-methyl-p-phenylene)bis(3,1-benzoxazin-4-one); 2,2'-(2-nitro-p-phenylene)bis(3,1-benzoxazin-4-one); 2,2'-(2-chloro-p-phenylene)bis(3,1-benzoxazin-4-one); 2,2'-(1,4-cyclohexylene)bis(3,1-benzoxazin-4-one); N-p-(3,1-benzoxazin-4-on-2-yl)phenyl; 4-(3,1-benzoxazin-4-on-2-yl)phthalimide; N-p-(3,1-benzoxazin-4-on-2-yl)benzoyl; 4-(3,1-benzoxazin-4-on-2-yl)aniline; 1,3,5-tri(3,1-benzoxazin-4-on-2-yl)benzene; 1,3,5-tri(3,1-benzoxazin-4-on-2-yl) naphthalene; and 2,4,6-tri(3,1-benzoxazin-4-on-2-yl) naphthalene.

Embodiment 8. A stabilizer composition according to any one of embodiments 1 to 7, wherein the hindered amine light stabilizer is selected from the group consisting of bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl)sebacate; bis(1-octyloxy-2,2,6,6-tetramethylpiperidin-4-yl)sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl) malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; a condensate of N,N'-bis(2,2,6,6-tetramethylpiperidin-4-yl)hexamethylenediamine and 4-morpholino-2,6-dichloro-1,3,5-triazine; a condensate of N,N'-bis(2,2,6,6-tetramethylpiperidin-4-yl)hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1,3,5-triazine and 1,2-bis-(3-aminopropylamino) ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol,1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl) pyrrolidine-2,5-dione; 1H-pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"-[1,3,5-triazine-2,4,6-triyl]tris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl) butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl); 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2',2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl) succinimide; 1,2,3,4-butanetetracarboxylic acid, polymer with β,β,β',β'-tetramethyl-2,4,8,10-tetraoxaspiro[5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2] heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2] heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butyl-benzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6, 6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl) 3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5)pentamethylene-1,5-diazepin-2-one; TINUVIN® XT 200; 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated (TINUVIN® NOR HALS 371); and mixtures thereof.

Embodiment 9. A stabilizer composition according to any one of embodiments 1 to 8, wherein the co-active agent is an alcohol selected from the group consisting of octanol; nonanol; 1-decanol; 1-undecanol; 1-dodecanol; 1-tridecanol; 1-tetradecanol; 1-pentadecanol; 1-hexadecanol; 1-heptadecanol; 1-octadecanol; 1-nonadecanol; 1-eicosanol; 1-docosanol; 1-tetracosanol; 1-hexacosanol; 1-octacosanol; 1-triacontanol; 2-methyl-1-undecanol; 2-propyl-1-nonanol; 2-butyl-1-octanol; 2-methyl-1-tridecanol; 2-ethyl-1-dodecanol; 2-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-heptyl-1-decanol; 2-hexyl-1-nonanol; 2-octyl-1-octanol; 2-methyl-1-heptadecanol; 2-ethyl-1-hexadecanol; 2-propyl-1-pentadecanol; 2-butyl-1-tetradecanol; 1-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetradecanol; 3-tetradecanol; 4-tetradecanol; 5-tetradecanol; 6-tetradecanol; tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol; 9-octadecanol; 9-octadedcanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol; and mixtures thereof.

Embodiment 10. A stabilizer composition according to any one of embodiments 1 to 8, wherein the co-active agent is an alkoxylated alcohol, or monoalkyl ether thereof, according to Formula (III):

$$R—(OCHR'CH_2)_y—OR'' \quad (III)$$

wherein R is a hydrocarbyl group having from 12 to 60 carbon atoms; R' is chosen from H or $C_1$-$C_4$ alkyl; R" is chosen from H or a hydrocarbyl group having from 1 to 10 carbon atoms; and y is an integer from 1 to 100.

Embodiment 11. A stabilizer composition according to embodiment 10, wherein R is a $C_{12}$ to $C_{30}$ alkyl.

Embodiment 12. A stabilizer composition according to embodiment 11, wherein the alkyl group contains from 12 to 22 carbons.

Embodiment 13. A stabilizer composition according to any one of embodiments 10 to 12, wherein R" is H.

Embodiment 14. A stabilizer composition according to any one of embodiments 10 to 13, wherein y is from 1 to 75.

Embodiment 15. A stabilizer composition according to any one of embodiments 1 to 14, wherein the co-active agent comprises an ethoxylated and/or propoxylated alcohol, wherein the alcohol is selected from the group consisting of docosyl alcohol; stearyl alcohol; oleyl alcohol; cetyl alcohol; isotridecyl alcohol; lauryl alcohol; $C_{12}$-$C_{15}$ alcohols; $C_{16}$/$C_{18}$ alcohols; and $C_{20}$-$C_{50}$ alcohols.

Embodiment 16. A stabilizer composition according to embodiment 15, wherein the co-active agent comprises a mixture of ethoxylated alcohol and propoxylated alcohol.

Embodiment 17. A stabilizer composition according to embodiment 16, wherein the alcohol comprises $C_{12}$-$C_{30}$ alcohols.

Embodiment 18. A stabilizer composition according to any one of embodiments 15 to 17, wherein the co-active agent is selected from the group consisting of $C_{12}$-$C_{15}$ oxo alcohols having 2 ethylene oxide and 5 propylene oxide groups; and $C_{12}$-$C_{15}$ oxo alcohols having 5 ethylene oxide and 2 propylene oxide groups.

Embodiment 19. A stabilizer composition according to any one of embodiment 10 to 14, wherein R" is methyl and the co-active agent comprises a monoalkyl ether of an ethoxylated and/or propoxylated alcohol, wherein the alcohol is selected from the group consisting of docosyl alcohol; stearyl alcohol; oleyl alcohol; cetyl alcohol; isotridecyl alcohol; lauryl alcohol; $C_{12}$-$C_{15}$ alcohols; $C_{16}$/$C_{18}$ alcohols; and $C_{20}$-$C_{50}$ alcohols.

Embodiment 20. A stabilizer composition according to any one of embodiments 1 to 8, wherein the co-active agent comprises an alkoxylated fatty amine according to Formula (IV)

$$R^4—NR^2R^3 \quad (IV),$$

esters thereof, or salts thereof, or an alkoxylated fatty amide according to Formula (V):

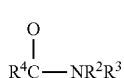

wherein $R^4$ of Formula (IV) and Formula (V) is independently chosen from a $C_8$-$C_{60}$ hydrocarbyl group, optionally interrupted with one or more hetero atoms; and each of $R^2$ and $R^3$ of Formula (IV) and Formula (V) is independently chosen from H, a $C_1$-$C_{30}$ alkyl, or (—$CH_2CHR^5O$-)n-H, wherein $R^5$ is chosen from H or methyl, and n is an integer from 1 to 100; and wherein at least one of $R^2$ or $R^3$ of Formula (IV) and Formula (V) is chosen from (—$CH_2CHR^5O$-)n-H.

Embodiment 21. A stabilizer composition according to embodiment 20, wherein $R^4$ of Formula (IV) and Formula (V) is a $C_8$-$C_{30}$ alkyl group, optionally interrupted by one of more hetero atom.

Embodiment 22. A stabilizer composition according to embodiment 21, wherein $R^4$ of Formula (IV) and Formula (V) is a $C_{12}$-$C_{22}$ alkyl group, optionally interrupted with one or more hetero atom.

Embodiment 23. A stabilizer composition according to any one of embodiments 20 to 22, wherein $R^4$ of Formula (IV) and Formula (V) is interrupted by an oxygen atom.

Embodiment 24. A stabilizer composition according to any one of embodiments 20 to 23, wherein the total value of n is an integer from 1 to 20.

Embodiment 25. A stabilizer composition according to any one of embodiments 20 to 24, wherein the co-active agent is an alkoxylated fatty amine according to Formula (IV) and is selected from the group consisting of: ethoxylated and/or propoxylated stearyl amines; oleyl amines; tallow amines; cetyl amines; capryl amines; hydrogenated tallow amines; and cocoamines.

Embodiment 26. A stabilizer composition according to any one of embodiments 20 to 25, wherein the co-active agent is a carboxylic acid salt of the alkoxylated fatty amine species according to Formula (IV).

Embodiment 27. A stabilizer composition according to embodiment 26, wherein the carboxylic acid salt is derived from a $C_2$-$C_{30}$ carboxylic acid.

Embodiment 28. A stabilizer composition according to embodiment 27, wherein the carboxylic acid salt is derived from a $C_{12}$-$C_{24}$ carboxylic acid.

Embodiment 29. A stabilizer composition according to any one of embodiments 20 to 24, wherein the co-active agent is an alkoxylated fatty amide according to Formula (V) and is selected from the group consisting of cocoamide monoethanolamine; cocoamide diethanolamine; lauramide diethanolamine; oleamide monoethanolamine; oleamide diethanolamine; and ethoxylated and/or propoxylated forms thereof.

Embodiment 30. A stabilizer composition according to embodiment 29, wherein the alkoxylated fatty amides according to Formula (V) further include from 1 to 50 ethoxylates and/or propoxylates.

Embodiment 31. A stabilizer composition according to any one of embodiments 1 to 8, wherein the co-active agent comprises sorbitan esters, or ethoxylates thereof Embodiment 32. A stabilizer composition according to embodiment 31, wherein the co-active agent is selected from the group consisting of sorbitan monolaurate; sorbitan monopalmitate; sorbitan monostearate; sorbitan monooleate; sorbitan monotallate; sorbitan sesquioleate; sorbitan tristearate; polysorbate 20; polysorbate 21; polysorbate 40; polysorbate 60; polysorbate 61; polysorbate 80; polysorbate 81; and mixtures thereof.

Embodiment 33. A stabilizer composition according to any one of embodiments 1 to 8, wherein the co-active agent comprises a monoglycerol or polyglycerol ester, or ethoxylates thereof, wherein the polyglycerol ester includes up to 20 glycerol units.

Embodiment 34. A stabilizer composition according to embodiment 33, wherein the polyglycerol ester includes up to 10 glycerol units.

Embodiment 35. A stabilizer composition according to embodiment 33 or embodiment 34, wherein one or more ester group is independently chosen from a $C_{12}$-$C_{30}$ alkyl.

Embodiment 36. A stabilizer composition according to any one of embodiments 33 to 35, wherein the co-active agent is selected from the group consisting of glycerol monostearate; glycerol distearate; glycerol oleate; glycerol triisostearate; diglycerol monostearate; diglycerol diisostearate; diglycerol monooleate; triglycerol monostearate; hexaglycerol distearate; polyglyceryl-10 monostearate; polyglyceryl-10 monooleate; polyglycerol-10-dipalmitate; polyglycerol-10 decaoleate; polyglycerol-3 polyricinoleate; polyglycerol ester of vegetable-based fatty acids; polyglycerol-4 caprate; polyglycerol-3 caprate; polyglycerol-4 isostearate; polyglycerol-3 oleate; polyglycerol-6 distearate; polyglyceryl-9 stearate; polyglycerol-4 oleate; diglycerol distearate ethoxylates; glycerol stearate ethoxylates; glycerol oleate ethoxylates; glycerol laurate ethoxylates; glycerol cocoate ethoxylates; diglycerol distearate ethoxylates; diglycerol laurate ethoxylates; ethoxylated castor oil; and ethoxylated hydrogenated castor oil.

Embodiment 37. A stabilizer composition according to any one of embodiments 1 to 8, wherein the co-active agent is a copolymer comprising ethylene oxide/propylene oxide (EO/PO) monomers.

Embodiment 38. A stabilizer composition according to embodiment 37, wherein the ratio of EO/PO monomers is from 1:99 to 99:1.

Embodiment 39. A stabilizer composition according to embodiment 37 or embodiment 38, wherein the ratio of EO/PO is from 1:9 to 9:1.

Embodiment 40. A stabilizer composition according to any one of embodiments 37 to 39, wherein the weight average molecular weight of the copolymer is up to and including 15,000 Da.

Embodiment 41. A stabilizer composition according to embodiment 40, wherein the weight average molecular weight of the copolymer is up to and including 10,000 Da.

Embodiment 42. A stabilizer composition according to any one of embodiments 37 to 41, wherein the co-active agent is selected from the group consisting of poly(ethylene glycol)-block-poly(propylene glycol)-block-poly(ethylene glycol) copolymers, wherein the EO portion is from 10 wt. % to 90 wt. %, based on the total weight of the copolymer.

Embodiment 43. A stabilizer composition according to any one of embodiments 1 to 8, wherein the co-active agent comprises alkoxylated esters of fatty acids.

Embodiment 44. A stabilizer composition according to embodiment 43, wherein the ester portion includes a $C_{12}$-$C_{30}$ alkyl.

Embodiment 45. A stabilizer composition according to embodiment 43 or embodiment 44, wherein the co-active agent is an ethoxylated and/or propoxylated ester of fatty acid selected from the group consisting of ethylene glycol monostearate, ethylene glycol distearate, diethylene glycol monostearate, diethylene glycol distearate, diethylene glycol monooleate, diethylene glycol monolaurate, polyethylene glycol monostearate, polyethylene glycol distearate, polyethylene glycol monooleate, polyethylene glycol dioleate, polyethylene glycol monotallate, polyethylene glycol ditallate, polyethylene glycol monocaprylate/caprate, polyethylene glycol monolaurate, polyethylene glycol dilaurate, polyethylene glycol beeswax, mannitol monooleate, natural oil ethoxylates/propoxylates, ricinoleic acid ethoxylates; pentaerythrityl dioleate; and mixtures thereof.

Embodiment 46. A stabilizer composition according to any one of embodiments 1 to 8, wherein the co-active agent comprises sugar esters.

Embodiment 47. A stabilizer composition according to embodiment 46, wherein the sugar ester is selected from the group consisting of sucrose stearate; sucrose distearate; sucrose polystearate; sucrose monopalmitate; sucrose laurate; and sucrose polypalmitate.

Embodiment 48. A stabilizer composition according to any one of embodiments 1 to 47 further comprising a stabilizing amount of a co-stabilizer selected from the group consisting of hindered benzoates; thioesters; hydroxylamines; antioxidants; hindered phenols; phosphites; phosphonites; benzofuranones; nitrones; and mixtures thereof.

Embodiment 49. A stabilizer composition according to embodiment 48, wherein the co-stabilizer is a hindered benzoate or benzamide compound according to Formula (VI):

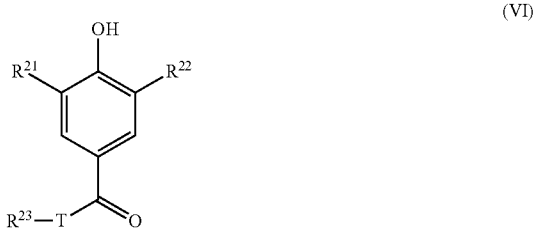

wherein
each of $R^{21}$ and $R^{22}$ is independently chosen from a $C_1$-$C_{12}$ alkyl;
T is chosen from O or $NR^{24}$, where $R^{24}$ is H or a $C_1$-$C_{30}$ hydrocarbyl; and
$R^{23}$ is H or a $C_1$-$C_{30}$ hydrocarbyl.

Embodiment 50. A stabilizer composition according to embodiment 48 or embodiment 49, wherein the hindered benzoate compound is selected from the group consisting of 2,4-di-tert-butylphenyl-3,5-di-tert-butyl-4-hydroxybenzoate; hexadecyl-3,5-di-tert-butyl-4-hydroxybenzoate; octadecyl-3,5-di-tert-butyl-4-hydroxybenzoate; octyl-3,5-di-tert-butyl-4-hydroxybenzoate; decyl-3,5-di-tert-butyl-4-hydroxybenzoate; dodecyl-3,5-di-tert-butyl-4-hydroxybenzoate; tetradecyl-3,5-di-tert-butyl-4-hydroxybenzoate; behenylyl-3,5-di-tert-butyl-4-hydroxybenzoate; 2-methyl-4,6-di-tert-butylphenyl-3,5-di-tert-butyl-4-hydroxybenzoate; butyl-3-[3-t-butyl-4-(3,5-di-t-butyl-4-hydroxybenzoyloxy)phenyl]propionate; and mixtures thereof.

Embodiment 51. A stabilizer composition according to any one of embodiments 1 to 50 further comprising a stabilizing amount of a co-additive compound selected from the group consisting of nucleating agents; fillers; metallic stearates; metal oxides; reinforcing agents; plasticizers; lubricants; rheology agents; catalysts; leveling agents; optical brighteners; anti-static agents; blowing agents; flame retardants; dyes; pigments; and mixtures thereof.

Embodiment 52. A stabilizer composition according to any one of embodiments 1 to 51, wherein the co-active agent and the UV absorber are present at a ratio from 1:50 to 200:1.

Embodiment 53. A stabilizer composition according to any one of embodiments 1 to 52, wherein the co-active agent and the UV absorber and HALS combined (UVA+HALS) are present at a ratio from 1:20 to 50:1, or from 1:10 to 40:1 or from 1:5 to 20:1.

Embodiment 54. A stabilizer composition according to any one of embodiments 1 to 53, wherein the weight ratio of hindered amine light stabilizer to orthohydroxyphenyl triazine is from 1:3 to 20:1.

Embodiment 55. A masterbatch concentrate comprising a stabilizer composition as defined in any one of embodiments 1 to 54; and at least one organic material identical to or compatible with an organic material to be stabilized, wherein the stabilizer composition is present in an amount from 10 wt. % to 90 wt. %, based on the total weight of the masterbatch concentrate.

Embodiment 56. A masterbatch concentrate according to embodiment 55, wherein the stabilizer composition is present in an amount from 30 wt. % to 80 wt. %, based on the total weight of the masterbatch concentrate.

Embodiment 57. A masterbatch concentrate according to embodiment 55 or embodiment 56, wherein the stabilizer composition is present in an amount from 40 wt. % to 75 wt. %, based on the total weight of the masterbatch concentrate.

Embodiment 58. A kit for stabilizing an organic material comprising in one or more containers a stabilizer composition according to any one of embodiments 1 to 54, or a masterbatch concentrate according to any one of embodiments 55 to 57.

Embodiment 59. A kit according to embodiment 58 further comprising in the same or additional container a co-stabilizer or a co-additive according to any one of embodiments 48 to 51.

Embodiment 60. An article of manufacture comprising an organic material to be stabilized; and
a) from 0.01 wt. % to 15 wt. %, based on the total weight of the article of manufacture, of a stabilizer composition comprising
  i) a stabilizing amount of an ultraviolet light absorber (UVA) selected from the group consisting of: orthohydroxyphenyl triazine compounds; orthohydroxybenzophenone compounds; orthohydroxyphenyl benzotriazole compounds; benzoxazinone compounds; and mixtures thereof;
  ii) from 1 wt. % to 99 wt. % based on the total weight of the stabilizer composition of a co-active agent; and iii) a stabilizing amount of a hindered amine light stabilizer compound (HALS) comprising a functional group according to Formula (II):

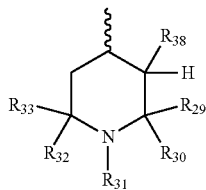

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or a functional group according to Formula (IIa):

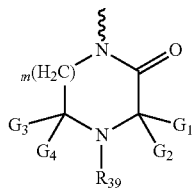

(IIa)

wherein m is an integer from 1 to 2;

$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and each of $G_1$-$G_4$ is independently chosen from $C_1$-$C_{20}$ hydrocarbyl; or mixtures of HALS compounds having functional groups according to Formula (II) and Formula (IIa); or b) a masterbatch concentrate as defined in any one of embodiments 55 to 57, such that the final concentration of the co-active agent in the article of manufacture is from 0.01 wt. % to 5 wt. %, based on the weight of the article of manufacture.

Embodiment 61. An article of manufacture according to embodiment 60, wherein the concentration of co-active agent in the article of manufacture is from 0.01 wt. % to 2 wt. %, based on the weight of the article of manufacture.

Embodiment 62. An article of manufacture according to embodiment 61, wherein the concentration of co-active agent in the article of manufacture is from 0.01 wt. % to 1 wt. %, based on the weight of the article of manufacture.

Embodiment 63. An article of manufacture according to embodiment 62, wherein the concentration of co-active agent in the article of manufacture is from 0.05 wt. % to 0.50 wt. %, based on the weight of the article of manufacture.

Embodiment 64. An article of manufacture according to embodiment 60, wherein the stabilizer composition or masterbatch concentrate is present in a final concentration from 0.02 wt. % to 20 wt. %, based on the total weight of the article of manufacture.

Embodiment 65. An article of manufacture according to embodiment 64, wherein the stabilizer composition or masterbatch concentrate is present in a final concentration from 0.05 wt. % to 10 wt. %, based on the total weight of the article of manufacture.

Embodiment 66. An article of manufacture according to any one of embodiments 60 to 65 further characterized by having a contact angle with water at a surface of the article of greater than 20°.

Embodiment 67. An article of manufacture according to embodiment 66, wherein the contact angle is greater than 50°.

Embodiment 68. An article of manufacture according to embodiment 67, wherein the contact angle is greater than 75°.

Embodiment 69. An article of manufacture according to any one of embodiments 60 to 68, wherein the organic material to be stabilized is selected from the group consisting of polyolefins, poly(ethylene-vinyl acetate) (EVA), polyesters, polyethers, polyketones, polyamides, natural and synthetic rubbers, polyurethanes, polystyrenes, high-impact polystyrenes, polyacrylates, polymethacrylates, polybutyl acrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins (TPO), aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, coating compositions, radiation curable compositions, epoxymelamine resins, organic dyes, cosmetic products, cellulose-based paper formulations, photographic film paper, fibers, waxes, and inks.

Embodiment 70. An article of manufacture according to embodiment 69, wherein the organic material to be stabilized is a polyolefin polymer selected from the group consisting of i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) thermoplastic olefins (TPO); vi) copolymers thereof; and vii) mixtures thereof.

Embodiment 71. An article of manufacture according to any one of embodiments 60 to 70, wherein the stabilizer composition is as defined in any one of embodiments 1 to 54.

Embodiment 72. An article of manufacture according to any one of embodiments 60 to 71, wherein the ratio of co-active agent to UVA in the article of manufacture is from 200:1 to 1:50.

Embodiment 73. An article of manufacture according to embodiment 72, wherein the ratio of co-active agent to UVA in the article of manufacture is from 100:1 to 1:40.

Embodiment 74. An article of manufacture according to embodiment 73, wherein the ratio of co-active agent to UVA in the article of manufacture is from 50:1 to 1:30.

Embodiment 75. A process of forming a stabilized article of manufacture made from an organic material subject to degradation and/or discoloration due to the effects from exposure to light, oxygen, and/or heat, the process comprising: combining at least one organic material with a stabilizer composition as defined in any one of embodiments 1 to 54, or a masterbatch concentrate as defined by any one of embodiments 55 to 57, or a kit as defined by embodiment 58 or embodiment 59; and extruding, molding, blowing, rotomolding, casting, thermoforming, or compacting the organic material into an article of manufacture.

Embodiment 76. A process according to embodiment 75, wherein the organic material is a polyolefin polymer selected from the group consisting of i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) thermoplastic olefins (TPO); vi) copolymers thereof and vii) mixtures thereof.

Embodiment 77. A process according to embodiment 75 or embodiment 76, wherein the organic material is polyethylene or polypropylene and is blended with a stabilizing amount of a stabilizer composition comprising i) from 0.01 wt. % to 5 wt. % of hindered amine light stabilizer in the form of a condensate of N,N'-bis (2,2,6,6-tetramethyl-4-piperidinyl)-1,6-hexanediamine polymers with morpholine-2,4-dichloro-1,3,5-triazine reaction products, methylated, or non-methylated; ii) from 0.001 wt. % to 5 wt. % of orthohydroxyphenyl triazine in the form of 4,6-bis-(2,4-dimethylphenyl)-2-(2-hydroxy-4-octyloxyphenyl)-s-triazine; and iii) from 0.01 wt. % to 5 wt. % of a co-active agent in the form of diethylene glycol octadecyl ether.

Embodiment 78. A process according to embodiment 77, wherein the stabilizing amount of co-active agent is from 0.01 wt. % to 1 wt. %, based on the total weight of the stabilizer composition.

Embodiment 79. A process according to embodiment 77 or embodiment 78, wherein the orthohydroxyphenyl triazine is replaced by an orthohydroxybenzophenone in the form of 2-hydroxy-4-octyloxybenzophenone and/or an orthohydroxyphenyl benzotriazole in the form of 2-(2'-hydroxy-5'-octylphenyl)-benzotriazole.

Embodiment 80. A process according to embodiment 77 or embodiment 78, wherein the stabilizing amount of orthohydroxyphenyl triazine is reduced and replaced by an equivalent amount of an orthohydroxybenzophenone in the form of 2-hydroxy-4-octyloxybenzophenone and/or an orthohydroxyphenyl benzotriazole in the form of 2-(2'-hydroxy-5'-octylphenyl)-benzotriazole.

Embodiment 81. A process according to any one of embodiments 77 to 80, wherein the stabilizer composition further includes iv) from 0.01 wt. % to 5 wt. % of a hindered benzoate in the form of hexadecyl-3,5-di-tert-butyl-4-hydroxybenzoate.

EXAMPLES

The following examples are provided to assist one skilled in the art to further understand certain embodiments of the present invention. These examples are intended for illustration purposes and are not to be construed as limiting the scope of the various embodiments of the present invention.

Example 1

UV Weathering Performance of Polypropylene/(60° Gloss Data)

Processes/Methods of Use:

Sample Preparation The various additive materials are compounded with polypropylene (Pro-fax 6301) polymer from Lyondell Basell Industries and extruded using conventional single-screw extrusion parameters. After extrusion, standard 2×2×0.125 inch plaques and tensile bars (1 inch) are injection molded using an Arburg injection molding machine. The conditions during injection molding are as follows: nozzle temperature: 230° C.; injection pressure: 60, shot size: 14.5. The additives are used as received, except that certain ethoxylated alcohols are methylated according to the methods below.

For UV weathering, samples are exposed to QUV-313 under ASTM G-154 testing conditions. Gloss (60°) values are measured at set exposure intervals. High gloss value indicates smooth surface without surface crazing or blooming effects. Samples are considered failed when they start to show surface crazing.

For physical properties, 5 tensile bars per each data point are tested on an Instron Engineering Company Tensile Tester (Model TTB). The average physical properties of the five test samples are measured using ASTM D638 Type-5 method. The cross-head speed of the tensile tester is 2 inch (0.508 cm.) per minute. Samples are considered failed when they retain less than 50% the original physical properties.

Preparation of Methylated Ethoxylated Alcohols

Synthesis of Methylated BRIJ® S2—Sodium hydride (4.35 g) is charged to a 500 ml round bottom flask followed by the addition of 75 ml n-heptane. It is stirred using a magnetic stir bar for ~20 minutes under nitrogen blanket and then allowed NaH to settle. The n-heptane is removed with the help of a pipette. The n-heptane washing is repeated. Then, fresh 200 ml n-heptane is added. To it is added BRIJ® S2 (27 g) dissolved in 50 ml tetrahydrofuran (THF). A slight exotherm is observed during the BRIJ® S2 addition and the contents are stirred under nitrogen for about 30 minutes at room temperature. Methyl iodide (10.5 g) is then slowly added to the mixture and the contents stirred first at room temperature for 1 hr and then heated to about 50° C. for about 3 hr. The reaction is then cooled and diluted with 100 ml methanol. The mixture is then concentrated under reduced pressure and the residue is treated with a methylene chloride/water mixture. The organic layer is separated and washed with water, concentrated under reduced pressure and dried under vacuum to give the desired methylated BRIJ® S2 characterized by LC/MS and NMR analytical techniques.

Synthesis of Methylated HETOXOL® OL-4—Sodium hydride (4.8 g) is charged to a 500 ml round bottom flask followed by the addition of 75 ml n-heptane. It is stirred using a magnetic stir bar for ~20 minutes under nitrogen blanket and then allowed NaH to settle. The n-heptane is removed with the help of a pipette. The n-heptane washing is repeated. Then, fresh 200 ml n-heptane is added. To it is added HETOXOL® OL-4 (44.4 g) dissolved in 50 ml tetrahydrofuran (THF). A slight exotherm is observed during the HETOXOL® OL-4 addition and the contents stirred under nitrogen for about 30 minutes at room temperature. Methyl iodide (15.6 g) is then slowly added to the mixture and the contents stirred first at room temperature for 1 hr and then heated to about 50° C. for about 3 hr. The reaction is then cooled and diluted with 100 ml methanol. The mixture is then concentrated under reduced pressure and the residue is treated with a methylene chloride/water mixture. The organic layer is separated and washed with water, concentrated under reduced pressure. A slight yellow colored liquid material is obtained. The product is passed through silica gel and treated with activated carbon to remove color bodies. The product thus obtained is characterized to be the desired methylated HETOXOL® OL-4 by LC/MS and NMR analytical techniques.

Figure 1B:
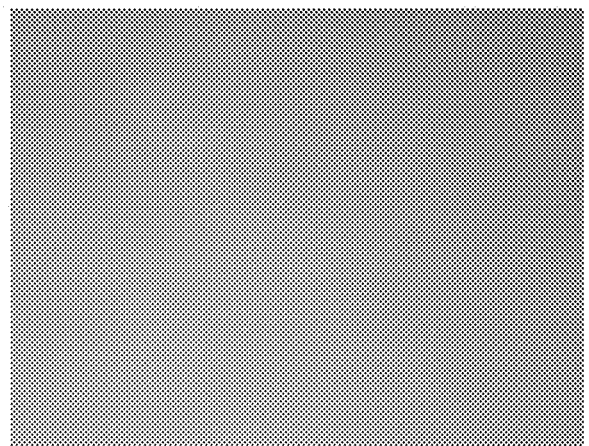

The results are shown in the Tables below and FIGS. 1A-B. The various co-active agents and other additives used in formulating the examples is provided below by trade name, chemical name, and source of supply. In some cases these same chemicals may be available from other suppliers under different trade name.

Table of Chemical Sources

| Sample Name | Chemical Name | Supplier |
| --- | --- | --- |
| Stearyl alcohol | Octadecan-1-ol | Sigma Aldrich |
| BRIJ ® S2 | Polyoxyethylene (2 EO) stearyl ether | Sigma Aldrich |
| Glycerol Monostearate | 2,3-Dihydroxypropyl octadecanoate | TCI Chemicals |
| Sorbitan Monostearate | Octadecanoic acid [2-[(2R,3S,4R)-3,4-dihydroxy 2-tetrahydrofuranyl]-2-hydroxyethyl] ester | Sigma Aldrich |
| TOMAMINE ® E-T-2 | bis-(2-hydroxyethyl) tallow amine | Air Products |
| TOMAMINE ® E-17-5 | Polyoxyethylene (5 EO) isotridecyloxypropylamine | Air Products |
| TWEEN ® 60 | Polyoxyethylene sorbitan monostearate | Sigma Aldrich |
| TWEEN ® 80 | Polyoxyethylene sorbitan monooleate | Sigma Aldrich |
| JEECOL ® SA-10 | Polyoxyethylene (10 EO) stearyl ether | Jeen Int. Corp. |
| JEECOL ® LA-2 | Polyoxyethylene (2 EO) dodecyl ether | Jeen Int. Corp. |
| BRIJ ® 93 | Polyoxyethylene (2 EO) oleyl ether | Sigma Aldrich |
| Steareth-5 | Polyoxyethylene (5 EO) stearyl ether | Venus Goa Chemicals |
| NOVEL ® 22-4 | Polyoxyethylene (4 EO) Docosyl ether | Sasol America |
| NOVEL ® 23E2 | $C_{12}$-$C_{13}$-alcohol polyethylene glycol ether (2 EO) | Sasol America |
| UNITHOX ® 420 | Saturated linear, $C_{20}$ to $C_{50}$, synthetic alcohol (EO represents about 20 wt %) polyethylene glycol ether | Baker Hughes |
| TERGITOL ® 15-S-3 | $C_{12}$-$C_{14}$ secondary alcohol, polyethylene glycol ether (3 EO) | Dow Chemical Co. |
| PEGOSPERSE ® 100-L | 2-(2-hydroxyethoxy)ethyl dodecanoate (PEG-2 laurate) | Lonza |
| PEGOSPERSE ® 100-S | Diethylene glycol stearate (PEG-2 stearate) | Lonza |
| PEGOSPERSE ® 400-MS | Polyethylene glycol monostearate (PEG-8 stearate) | Lonza |
| PEGOSPERSE ® 400-DS | Polyethylene glycol distearate (PEG-8 (PEG-8 stearate) | Lonza |
| PEGOSPERSE ® 400-DO | Polyoxyethylene dioleate (PEG-8 dioleate) | Lonza |
| PEGOSPERSE ® 50-MS | Ethylene glycol monostearate | Lonza |
| PEGOSPERSE ® 50-DS | Ethylene glycol distearate | Lonza |
| POLYALDO ® 10-1-S | Polyglyceryl-10-stearate | Lonza |
| POLYALDO ® 3-1-S | Triglyceryl monostearate | Lonza |
| POLYALDO ® 6-2-S | Hexaglyceryl distearate | Lonza |
| CITHROL ® PG3PR | Polyglyceryl-3-polyricinoleate | Croda |
| CRODESTA ® F-160 | [(2S,3R,4S,5S,6R)-2-[(2S,3S,4S,5R)-3,4-dihydroxy-2,5-bis(hydroxymethyl)oxolan-2-yl]-3,4,5-trihydroxy-6-(hydroxymethyl)oxan-2-yl] octadecanoate (Sucrose Stearate) | Croda |
| PROTACHEM ® SMP | Sorbitan monopalmitate (Sorbitan hexadecanoate) | Protameen Chemicals |
| PROTACHEM ® SMO | Sorbitan monooleate | Protameen Chemicals |

Table of Chemical Sources

| Sample Name | Chemical Name | Supplier |
|---|---|---|
| PROTACHEM ® STS | Sorbitan tristearate | Protameen Chemicals |
| PROTAMIDE ® HCA-A | Cocoamide diethanolamine | Protameen Chemicals |
| PROTAMIDE ® CME | Cocoamide monoethanolamine | Protameen Chemicals |
| PROTAMIDE ® L80-M | Lauramide diethanolamine | Protameen Chemicals |
| SERDOX ® NXC-3 | Oleic acid diethanol amide + 3 EO | Elementis |
| ETOCAS ® 5 | Polyethylene glycol-5-ethoxylated castor oil | Croda |
| CRODURET ® 7 | Polyethylene glycol-7-ethoxylated hydrogenated castor oil | Croda |
| CRODURET ® 25 | Polyethylene glycol-25-ethoxylated hydrogenated castor oil | Croda |
| ETHOMEEN ® C/12 | Polyoxyethylene (2 EO) cocoalkyl amine | Akzo Nobel |
| ETHOMEEN ® C/15 | Polyoxyethylene (3 EO) cocoalkyl amine | Akzo Nobel |
| ETHOMEEN ® C/25 | Polyoxyethylene (5 EO) cocoalkyl amine | Akzo Nobel |
| GENAMIN ® S 020 | Polyoxyethylene (2 EO) stearyl amine | Clariant |
| GENAMIN ® S 080 | Polyoxyethylene (8 EO) stearyl amine | Clariant |
| GENAMIN ® O 020 | Polyoxyethylene (2 EO) oleyl amine | Clariant |
| GENAMIN ® O 080 | Polyoxyethylene (8 EO) oleyl amine | Clariant |
| GENAPOL ® EP 2525 | $C_{12/15}$ oxo alcohol w/ 2 EO and 5 PO | Clariant |
| GENAPOL ® EP 2552 | $C_{12/15}$ oxo alcohol w/ 5 EO and 2 PO | Clariant |
| PLURONIC ® L31 | Ethylene Oxide/Propylene Oxide Block Copolymer (10% EO); Avg. MW = 1100 | BASF |
| PLURONIC ® L81 | Ethylene Oxide/Propylene Oxide Block Copolymer (10% EO); Avg. MW = 2750 | BASF |
| PLURONIC ® L101 | Ethylene Oxide/Propylene Oxide Block Copolymer (10% EO); Avg. MW = 3800 | BASF |
| PLURONIC ® L62 | Ethylene Oxide/Propylene Oxide Block Copolymer (20% EO); Avg. MW = 2500 | BASF |
| PLURONIC ® L43 | Ethylene Oxide/Propylene Oxide Block Copolymer (30% EO); Avg. MW = 1850 | BASF |
| PLURONIC ® L35 | Ethylene Oxide/Propylene Oxide Block Copolymer (50% EO); Avg. MW = 1900 | BASF |
| PLURONIC ® F38 | Ethylene Oxide/Propylene Oxide Block Copolymer (80% EO); Avg. MW = 4700 | BASF |
| BEROL ® 840 | Polyoxyethylene (4 EO) octyl ether | AkzoNobel |
| LUTENSOL ® XP 80 | Polyoxyethylene (8 EO) decyl ether | BASF |
| JEECOL ® LA-4 | Polyoxyethylene (4 EO) dodecyl ether | Jeen Int. Corp. |
| HETOXOL ® OL4 | Polyoxyethylene (4 EO) oleyl ether | Global Steven |
| Methylated BRIJ ® S2 | Polyoxyethylene (2 EO) stearyl ether, methylated | Cytec Industries Inc. |
| Methylated HETOXOL ® OL4 | Polyoxyethylene (4 EO) oleyl ether, methylated | Cytec Industries Inc. |
| CYASORB ® UV-1164 | 2-[4,6-bis(2,4-dimethylphenyl)-1,3,5-triazin-2-yl]-5-(octyloxy) phenol | Cytec Industries Inc. |
| Methylated CYASORB ® UV-1164 | 2-(2-methoxy-4-octyloxyphenyl)-4,6-bis(2,4-dimethylphenyl)-1,3,5-triazine | Cytec Industries Inc. |
| CYASORB ® UV-3346 | Substituted amine oligomer (1,6-hexanediamine, N,N'-bis(2,2,6,6-tetramethyl-4-piperidinyl)-, polymers with morpholine-2,4,6-trichloro-1,3,5-triazine reaction products | Cytec Industries Inc. |
| CYASORB ® UV-3529 | Substituted amine oligomer (1,6-hexanediamine, N,N'-bis(2,2,6,6-tetramethyl-4-piperidinyl)-, polymers with morpholine-2,4,6-trichloro-1,3,5-triazine reaction products, methylated | Cytec Industries Inc. |
| CYASORB ® UV-3853 | mixture of 4-hexadecyloxy- and 4-stearyloxy-2,2,6,6-tetramethylpiperidine | Cytec Industries Inc. |
| CYASORB ® UV-2908 | 3,5-di-[t-butyl]-4-hydroxybenzoic acid hexadecyl ester | Cytec Industries Inc. |
| CYASORB ® UV-531 | 2-hydroxy-4-n-octyloxybenzophenone | Cytec Industries Inc. |
| CYASORB ® UV-5411 | 2-(2-Hydroxy-5-t-octylphenyl) benzotriazole | Cytec Industries Inc. |
| CYASORB ® UV-3638F | (Nitrogen heterocycle) 2,2'-(1,4-Phenylene)-bis-4H-3,1-Benzoxazin-4-one | Cytec Industries Inc. |

| Table of Chemical Sources | | |
|---|---|---|
| Sample Name | Chemical Name | Supplier |
| TINUVIN ® 1577FF | 2-[4,6-bis(2,4-dimethylphenyl)-1,3,5-triazin-2-yl]-5-(hexyloxy) phenol | BASF |
| P-800 | 2,4,6-tris(2-hydroxy-4-octyloxy-phenyl)-1,3,5-triazine | Cytec Industries Inc. |

TABLE 1

UV Weathering Performance of Polypropylene Stabilized with HALS + UV Absorber + Mono-hydroxy Alcohol (60° Gloss Data)

| Description | 60° Gloss (Initial) | 60° Gloss (After 100 hours) | 60° Gloss (After 800 hours) |
|---|---|---|---|
| 1-(1) No additive | 91 | Failed* | — |
| 1-(2) 0.15% Stearyl Alcohol | 90 | Failed* | — |
| 1-(3) 0.09% UV-3346 + 0.01% UV-1164 | 91 | 88 | Failed* |
| 1-(4) 0.09% UV-3346 + 0.01% UV-1164 + 0.15% Stearyl Alcohol | 92 | 89 | 88 |

*Sample failed due to surface crazing.

Formulation 1-(4) demonstrates that stearyl alcohol shows synergistic performance when used in combination with UV-1164 (UV absorber)/UV-3346 (HALS).

TABLE 2

UV Weathering Performance of Polypropylene Stabilized with HALS + UV Absorber + Glycerol Ester (60° Gloss Data)

| Description | 60° Gloss (Initial) | 60° Gloss (After 100 hours) | 60° Gloss (After 600 hours) |
|---|---|---|---|
| 2-(1) No additive | 87 | Failed* | — |
| 2-(2) 0.15% Glycerol Monostearate | 88 | Failed* | — |
| 2-(3) 0.09% UV-3346 + 0.01% UV-1164 | 88 | 88 | Failed* |
| 2-(4) 0.09% UV-3346 + 0.01% UV-1164 + 0.15% Glycerol Monostearate | 87 | 88 | 88 |

*Sample failed due to surface crazing.

Formulation 2-(4) demonstrates that glycerol monostearate shows synergistic performance when used in combination with UV-1164 (UV absorber)/UV-3346 (HALS).

TABLE 3

UV Weathering Performance of Polypropylene Stabilized with HALS + UV Absorber + Sorbitan Ester (60° Gloss Data)

| Description | 60° Gloss (Initial) | 60° Gloss (After 100 hours) | 60° Gloss (After 600 hours) |
|---|---|---|---|
| 3-(1) No additive | 87 | Failed* | — |
| 3-(2) 0.15% Sorbitan Monostearate | 87 | Failed* | — |
| 3-(3) 0.09% UV-3346 + 0.01% UV-1164 | 88 | 88 | Failed* |
| 3-(4) 0.09% UV-3346 + 0.01% UV-1164 + 0.15% Sorbitan Monostearate | 88 | 88 | 89 |

*Sample failed due to surface crazing.

Formulation 3-(4) demonstrates that sorbitan monostearate shows synergistic performance when used in combination with UV-1164 (UV absorber)/UV-3346 (HALS).

TABLE 4

UV Weathering Performance of Polypropylene Stabilized with UV Absorbers + Ethoxylated Alcohol (60° Gloss Data)

| Description | 60° Gloss (Initial) | 60° Gloss (After 100 hours) | 60° Gloss (After 200 hours) |
|---|---|---|---|
| 4-(1) No Additive | 89 | Failed* | — |
| 4-(2) 0.15% BRIJ ® S2 | 89 | Failed* | — |
| 4-(3) 0.1% Me-UV 1164 | 89 | Failed* | — |
| 4-(4) 0.1% Me-UV 1164 + 0.15% BRIJ ® S2 | 89 | Failed* | — |
| 4-(5) 0.1% TINUVIN 1577FF | 89 | 87 | Failed* |
| 4-(6) 0.1% TINUVIN 1577FF + 0.15% BRIJ ® S2 | 89 | 87 | 90 |
| 4-(7) 0.1% UV-1164 | 90 | 87 | Failed* |
| 4-(8) 0.1% UV-1164 + 0.15% BRIJ ® S2 | 89 | 88 | 89 |

*Sample failed due to surface crazing.

Formulations 4-(6) and 4-(8) demonstrate that triazine UV absorbers (TINUVIN® 1577FF and UV-1164) both show synergistic performance when used in combination with BRIJ® S2.

TABLE 5

UV Weathering Performance of Polypropylene Stabilized with UV Absorbers + Ethoxylated Alcohol (60° Gloss Data)

| Description | 60° Gloss (Initial) | 60° Gloss (After 50 hours) | 60° Gloss (After 150 hours) | 60° Gloss (After 350 hours) |
|---|---|---|---|---|
| 5-(1) No Additive | 88 | Failed* | — | — |
| 5-(2) 0.15% BRIJ ® S2 | 86 | Failed* | — | — |
| 5-(3) 0.1% UV-531 | 88 | 88 | 89 | Failed* |
| 5-(4) 0.1% UV-531 + 0.15% BRIJ ® S2 | 87 | 88 | 89 | 83 |
| 5-(5) 0.1% UV-5411 | 86 | 84 | Failed* | — |
| 5-(6) 0.1% UV-5411 + 0.15% BRIJ ® S2 | 87 | 87 | Failed* | — |
| 5-(7) 0.1% UV-1164 | 89 | 89 | Failed* | — |
| 5-(8) 0.1% UV-1164 + 0.15% BRIJ ® S2 | 88 | 88 | 85 | Failed* |

*Sample failed due to surface crazing.

Comparing formulations 5-(4) and 5-(8) in the above table demonstrate that the benzophenone UV absorber (UV-531) shows higher synergistic performance than the triazine UV absorber (UV-1164) when used in combination with BRIJ® S2.

TABLE 6

UV Weathering Performance of Polypropylene Stabilized with HALS Variants + Ethoxylated Alcohol
(60° Gloss Data)

6A

| Description | 60° Gloss (Initial) | 60° Gloss (After 200 hours) | 60° Gloss (After 400 hours) |
|---|---|---|---|
| 6-(1) No additive | 90 | Failed* | — |
| 6-(2) 0.10% BRIJ ® S2 | 90 | Failed* | — |
| 6-(3) 0.10% UV-3529 | 91 | 88 | Failed* |
| 6-(4) 0.10% UV-3529 + 0.10% BRIJ ® S2 | 90 | 87 | Failed* |
| 6-(5) 0.05% UV-3853 | 91 | 87 | Failed* |
| 6-(6) 0.05% UV-3853 + 0.10% BRIJ ® S2 | 90 | 88 | Failed* |

6B

| Description | 60° Gloss (Initial) | 60° Gloss (After 100 hours) | 60° Gloss (After 400 hours) |
|---|---|---|---|
| 6-(7) No additive | 87 | Failed* | — |
| 6-(8) 0.15% BRIJ ® S2 | 89 | Failed* | — |
| 6-(9) 0.09% UV-3346 | 88 | 88 | Failed* |
| 6-(10) 0.09% UV-3346 + 0.15% BRIJ ® S2 | 88 | 90 | Failed* |

*Sample failed due to surface crazing.

Formulations 6-(4), 6-(6), and 6-(10) show that HALS (UV-3529, UV-3853, UV-3346) do not show any synergistic performance when used in combination with BRU® S2.

TABLE 7A

UV Weathering Performance of Polypropylene Stabilized with UV Absorbers + HALS + Ethoxylated Alcohol
(60° Gloss Data)
7A.

| Description | 60° Gloss (Initial) | 60° Gloss (After 200 hours) | 60° Gloss (After 600 hours) | 60° Gloss (After 800 hours) | 60° Gloss (After 1000 hours) |
|---|---|---|---|---|---|
| 7-(1) No additive | 89 | Failed* | — | — | — |
| 7-(2) 0.15% BRIJ ® S2 | 89 | Failed* | — | — | — |
| 7-(3) 0.09% UV-3346 + 0.01% Me UV-1164 | 90 | 88 | Failed* | — | — |
| 7-(4) 0.09% UV-3346 + 0.01% Me UV-1164 + 0.15% BRIJ ® S2 | 90 | 88 | Failed* | — | — |
| 7-(5) 0.09% UV-3346 + 0.01% UV-1164 | 89 | 87 | 89 | Failed* | — |
| 7-(6) 0.09% UV-3346 + 0.01% UV-1164 + 0.15% BRIJ ® S2 | 89 | 89 | 89 | 89 | 88 |
| 7-(7) 0.09% UV-3346 +0.01% TINUVIN 1577FF | 90 | 88 | 89 | Failed* | — |
| 7-(8) 0.09% UV-3346 + 0.01% TINUVIN 1577FF + 0.15% BRIJ ® S2 | 89 | 88 | 89 | 89 | 88 |
| 7-(9) 0.09% UV-3346 + 0.01% P-800 | 90 | 87 | 88 | Failed* | — |
| 7-(10) 0.09% UV-3346 + 0.01% P-800 + 0.15% BRIJ ® S2 | 90 | 87 | 88 | 89 | Failed* |

*Sample failed due to surface crazing.

Formulations 7-(6), 7-(8), and 7-(10) demonstrate that HALS (UV-3346) in combination with triazine UV absorber variants show synergistic performance when used in combination with BRIJ® S2. Formulation 7-(4) indicates lack of synergistic performance when methylated UV-1164 is used.

TABLE 7B

Solubility of Triazine UV absorbers in cyclohexane at room temperature (20° C.).
7B.

| Triazine | Solubility of triazines in Cyclohexane at room temperature |
|---|---|
| UV-1164 | 1.4 ± 0.2 weight % |
| TINUVIN ® 1577FF | >0.04, but <0.1 weight % |
| P-800 | >0.04% weight % |

Tables 7A and 7B show that formulations containing triazines having a higher solubility in cyclohexane are superior to formulations containing triazines having a very low solubility in cyclohexane.

TABLE 8

UV Weathering Performance of Polypropylene Stabilized with HALS + UV Absorber + Ethoxylated Alcohol
(Physical Properties: Percent Retention of Stress at Break)

| Description | % Retention of Stress at Break (Initial) | % Retention of Stress at Break (After 1000 hours) | % Retention of Stress at Break (After 2000 hours) |
|---|---|---|---|
| 8-(1) No additive | 100 | Failed** | — |
| 8-(2) 0.10% BRIJ ® S2 | 100 | Failed** | — |
| 8-(3) 0.09% UV-3346 + 0.01% UV-1164 | 100 | 57 | Failed** |

TABLE 8-continued

UV Weathering Performance of Polypropylene Stabilized
with HALS + UV Absorber + Ethoxylated Alcohol
(Physical Properties: Percent Retention of Stress at Break)

| Description | % Retention of Stress at Break (Initial) | % Retention of Stress at Break (After 1000 hours) | % Retention of Stress at Break (After 2000 hours) |
|---|---|---|---|
| 8-(4) 0.09% UV-3346 + 0.01% UV-1164 + 0.10% BRIJ ® S2 | 100 | 77 | 71 |

**Samples retained less than 50% of the original tensile strength.

Formulation 8-(4) demonstrates that BRIJ® S2 shows synergistic performance when used in combination with UV-1164 (UV absorber)/UV-3346 (HALS) in enhancing physical properties.

TABLE 9

UV Weathering Performance of Polypropylene Stabilized with
HALS + Different Classes of UV Absorbers + Ethoxylated Alcohol
(60° Gloss Data)

| Description | 60° Gloss (Initial) | 60° Gloss (After 500 hours) | 60° Gloss (After 600 hours) |
|---|---|---|---|
| 9-(1) 0.09% UV-3346 + 0.01% UV-531 | 90 | Failed* | — |
| 9-(2) 0.09% UV-3346 + 0.01% UV-531 + 0.15% BRIJ ® S2 | 90 | 90 | 89 |
| 9-(3) 0.09% UV-3346 + 0.01% UV-5411 | 89 | 90 | Failed* |
| 9-(4) 0.09% UV-3346 + 0.01% UV-5411 + 0.15% BRIJ ® S2 | 89 | 90 | 89 |
| 9-(5) 0.09% UV-3346 + 0.01% UV-1164 | 89 | Failed* | — |
| 9-(6) 0.09% UV-3346 + 0.01% UV-1164 + 0.15% BRIJ ® S2 | 90 | 90 | 89 |

*Sample failed due to surface crazing.

Formulations 9-(2), 9-(4), and 9-(6) demonstrate that HALS (UV-3346) in combination with different classes of UV absorbers show synergistic performance when used in combination with BRU® S2.

TABLE 10

UV Weathering Performance of Polypropylene Stabilized with
HALS + UV Absorber + Hindered Benzoate + Ethoxylated
Alcohol (60° Gloss Data)

| Description | 60° Gloss (Initial) | 60° Gloss (After 500 hours) | 60° Gloss (After 600 hours) |
|---|---|---|---|
| 10-(1) 0.045% UV-3346 + 0.01% UV-1164 + 0.045% UV-2908 | 90 | 86 | Failed* |
| 10-(2) 0.045% UV-3346 + 0.01% UV-1164 + 0.045% 2908 + 0.15% BRIJ ® S2 | 90 | 90 | 89 |

*Sample failed due to surface crazing.

Formulation 10-(2) demonstrates that HALS (UV-3346) in combination with UV absorber (UV-1164) and hindered benzoate (UV-2908) shows synergistic performance when used in combination with BRU® S2.

TABLE 11

UV Weathering Performance of Polypropylene Stabilized with HALS + UV
Absorber + Stearyl Alcohol vs. BRIJ ® S2 (60° Gloss Data)

| Description | 60° Gloss (Initial) | 60° Gloss (After 100 hours) | 60° Gloss (After 700 hours) | 60° Gloss (After 800 hours) |
|---|---|---|---|---|
| 11-(1) No additive | 91 | Failed* | — | — |
| 11-(2) 0.09% UV-3346 + 0.01% UV-1164 | 91 | 88 | Failed* | — |
| 11-(3) 0.09% UV-3346 + 0.01% UV-1164 + 0.15% Stearyl Alcohol | 92 | 89 | 88 | Failed* |
| 11-(4) 0.09% UV-3346 + 0.01% UV-1164 + 0.15% BRIJ ® S2 | 93 | 88 | 88 | 87 |

*Sample failed due to surface crazing.

Comparing formulations 11-(3) and 11-(4) demonstrates that HALS (UV-3346) in combination with UV absorber (UV-1164) shows higher synergistic performance when used with BRU® S2 than with stearyl alcohol.

TABLE 12

UV Weathering Performance of Polypropylene Stabilized with HALS +
UV Absorber + Ethoxylated Alcohols with Varying Degree of Ethoxylation
(60° Gloss Data)

| Description | 60° Gloss (Initial) | 60° Gloss (After 100 hours) | 60° Gloss (After 700 hours) |
|---|---|---|---|
| 12-(1) No additive | 91 | Failed* | — |
| 12-(2) 0.09% UV-3346 + 0.01% UV-1164 | 91 | 88 | Failed* |
| 12-(3) 0.09% UV-3346 + 0.01% UV-1164 + 0.15% BRU ® S2 | 93 | 88 | 88 |
| 12-(4) 0.09% UV-3346 + 0.01% UV-1164 + 0.15% Steareth-5 | 91 | 87 | 87 |

TABLE 12-continued

UV Weathering Performance of Polypropylene Stabilized with HALS +
UV Absorber + Ethoxylated Alcohols with Varying Degree of Ethoxylation
(60° Gloss Data)

| Description | 60° Gloss (Initial) | 60° Gloss (After 100 hours) | 60° Gloss (After 700 hours) |
|---|---|---|---|
| 12-(5) 0.09% UV-3346 + 0.01% UV-1164 + 0.15% Steareth-10 | 92 | 84 | 87 |

*Sample failed due to surface crazing.

Formulations 12-(3), 12-(4) and 12-(5) in the above table demonstrates that ethoxylated alcohols with varying degree of ethoxylation all show synergistic performance when used with HALS (UV-3346) and UV absorber (UV-1164).

TABLE 13

UV Weathering Performance of Polypropylene Stabilized with
HALS + UV Absorber + Ethoxylated Alcohols with Alkyl Chain
Variants (60° Gloss Data)

| Description | 60° Gloss (Initial) | 60° Gloss (After 100 hours) | 60° Gloss (After 600 hours) |
|---|---|---|---|
| 13-(1) No UV Stabilizer | 87 | Failed* | |
| 13-(2) 0.09% UV-3346 + 0.01% UV-1164 | 87 | 87 | Failed* |
| 13-(3) 0.09% UV-3346 + 0.01% UV-1164/0.15% BRIJ ® S2 | 88 | 88 | 88 |
| 13-(4) 0.09% UV-3346 + 0.01% UV-1164/0.15% Laureth-2 | 88 | 88 | 90 |
| 13-(5) 0.09% UV-3346 + 0.01% UV-1164/0.15% BRIJ ® 93 | 87 | 86 | 88 |
| 13-(6) 0.09% UV-3346 + 0.01% UV-1164/0.15% NOVEL ® 22-4 | 87 | 87 | 87 |
| 13-(7) 0.09% UV-3346 + 0.01% UV-1164/0.15% UNITHOX ® 420 | 87 | 88 | 88 |

*Sample failed due to surface crazing.

Formulations 13-(3) to 13-(7) demonstrate that ethoxylated alcohols with varying degree of alkyl chain length all show synergistic performance when used with HALS (UV-3346) and UV absorber (UV-1164).

TABLE 14

UV Weathering Performance of Polypropylene Stabilized with HALS + UV Absorber +
Ethoxylated Branched Alcohols (60° Gloss Data)

| Description | 60° Gloss (Initial) | 60° Gloss (After 100 hours) | 60° Gloss (After 700 hours) |
|---|---|---|---|
| 14-(1) No Stabilizer | 88 | Failed* | — |
| 14-(2) 0.15% NOVEL ® 23E2 | 89 | Failed* | — |
| 14-(3) 0.15% TERGITOL ® 15-S-3 | 89 | Failed* | — |
| 14-(4) 0.09% UV-3346 + 0.01% UV-1164 | 89 | 89 | Failed* |
| 14-(5) 0.09% UV-3346 + 0.01% UV-1164 + 0.15% NOVEL ® 23E2 | 89 | 89 | 90 |
| 14-(6) 0.09% UV-3346 + 0.01% UV-1164 + 0.15% TERGITOL ® 15-S-3 | 89 | 90 | 88 |

*Sample failed due to surface crazing.

Formulations 14-(5) and 14-(6) demonstrate that branched ethoxylated alcohols show synergistic performance when used with HALS (UV-3346) and UV absorber (UV-1164).

TABLE 15

UV Weathering Performance of Polypropylene Stabilized with
HALS + UV Absorber + Alkylated Ethoxylated Alcohols
(60° Gloss Data)

| Description | 60° Gloss (Initial) | 60° Gloss (After 100 hours) | 60° Gloss (After 700 hours) |
|---|---|---|---|
| 15-(1) No Stabilizer | 88 | Failed* | — |
| 15-(2) 0.15% Methylated BRIJ ® S2 | 90 | Failed* | — |
| 15-(3) 0.15% Methylated HETOXOL ® OL-4 | 89 | Failed* | — |
| 15-(4) 0.09% UV-3346 + 0.01% UV-1164 | 88 | 88 | Failed* |
| 15-(5) 0.09% UV-3346 + 0.01% UV-1164 + 0.15% Methylated BRIJ ® S2 | 89 | 88 | 85 |
| 15-(6) 0.09% UV-3346 + 0.01% UV-1164+ 0.15% Methylated HETOXOL ® OL-4 | 89 | 88 | 87 |

*Sample failed due to surface crazing.

Formulations 15-(5) and 15-(6) demonstrate that methylated ethoxylated alcohols show synergistic performance when used with HALS (UV-3346) and UV absorber (UV-1164).

TABLE 16

UV Weathering Performance of
Polypropylene Stabilized with HALS Variants +
UV Absorber + Ethoxylated Alcohol
(60° Gloss Data)

16A

| Description | 60° Gloss (Initial) | 60° Gloss (After 800 hours) |
|---|---|---|
| 16-(1) 0.09% UV-3346 + 0.01% UV-1164 | 80 | Failed* |
| 16-(2) 0.09% UV-3346 + 0.01% UV-1164 + 0.15% BRIJ ® S2 | 89 | 90 |
| 16-(3) 0.09% UV-3529 + 0.01% UV-1164 | 89 | Failed* |
| 16-(4) 0.09% UV-3529 + 0.01% UV-1164 + 0.15% BRIJ ® S2 | 89 | 90 |

TABLE 16-continued

UV Weathering Performance of
Polypropylene Stabilized with HALS Variants +
UV Absorber + Ethoxylated Alcohol
(60° Gloss Data)

16B

| Description | 60° Gloss (Initial) | 60° Gloss (After 1000 hours) |
|---|---|---|
| 16-(5) 0.09% UV-3853 + 0.01% UV-1164 | 88 | Failed* |
| 16-(6) 0.09% UV-3853 + 0.01% UV-1164 + 0.15% BRIJ ® S2 | 89 | 90 |

*Sample failed due to surface crazing.

Formulations 16-(2), 16-(4) and 16-(6) demonstrate that all HALS (UV-3346, UV-3529, UV-3853) in combination with UV absorber (UV-1164) show synergistic performance when used in combination with BRIJ® S2.

TABLE 17

UV Weathering Performance of Polypropylene Stabilized
with HALS + UV Absorber + Sorbitan Esters
(60° Gloss Data)

| Description | 60° Gloss (Initial) | 60° Gloss (After 300 hours) | 60° Gloss (After 800 hours) |
|---|---|---|---|
| 17-(1) No stabilizer | 87 | Failed* | — |
| 17-(2) 0.15% PROTACHEM ® SMP | 88 | Failed* | — |
| 17-(3) 0.15% PROTACHEM ® SMO | 89 | Failed* | — |
| 17-(4) 0.15% PROTACHEM ® STS | 89 | Failed* | — |
| 17-(5) 0.09% UV-3346 + 0.01% UV-1164 | 90 | 90 | Failed* |
| 17-(6) 0.09% UV-3346 + 0.01% UV-1164 + 0.15% PROTACHEM ® SMP | 89 | 89 | 79 |
| 17-(7) 0.09% UV-3346 + 0.01% UV-1164 + 0.15% PROTACHEM ® SMO | 90 | 89 | 83 |
| 17-(8) 0.09% UV-3346 + 0.01% UV-1164 + 0.15% PROTACHEM ® STS | 89 | 89 | 82 |

*Sample failed due to surface crazing.

Formulations 17-(6), 17-(7) and 17-(8) demonstrate that HALS (UV-3346) in combination with UV absorber (UV-1164) show synergistic performance when used in combination with different sorbitan esters.

TABLE 18

UV Weathering Performance of Polypropylene Stabilized
with + HALS + UV Absorber + Ethoxylated Sorbitan Esters
(60° Gloss Data)

| Description | 60° Gloss (Initial) | 60° Gloss (After 100 hours) | 60° Gloss (After 700 hours) |
|---|---|---|---|
| 18-(1) No stabilizer | 88 | Failed* | — |
| 18-(2) 0.15% TWEEN ® 60 | 89 | Failed* | — |
| 18-(3) 0.15% TWEEN ® 80 | 92 | Failed* | — |
| 18-(4) 0.09% UV-3346 + 0.01% UV-1164 | 92 | 86 | Failed* |
| 18-(5) 0.09% UV-3346 + 0.01% UV-1164 + 0.15% TWEEN ® 60 | 89 | 88 | 87 |
| 18-(6) 0.09% UV-3346 + 0.01% UV-1164 + 0.15% TWEEN ® 80 | 91 | 87 | 77 |

*Sample failed due to surface crazing

Formulations 18-(5) and 18-(6) demonstrate that HALS (UV-3346) in combination with UV absorber (UV-1164) show synergistic performance when used in combination with different ethoxylated sorbitan esters.

TABLE 19

UV Weathering Performance of Polypropylene Stabilized
with HALS + UV Absorber + Sucrose Esters
(60° Gloss Data)

| Description | 60° Gloss (Initial) | 60° Gloss (After 150 hours) | 60° Gloss (After 800 hours) |
|---|---|---|---|
| 19-(1) 0.15% CRODESTA ® F160 | 88 | Failed* | — |
| 19-(2) 0.09% UV-3346 + 0.01% UV-1164 | 90 | 90 | Failed* |
| 19-(3) 0.09% UV-3346 + 0.01% UV-1164 + 0.15% CRODESTA ® F160 | 91 | 89 | 88 |

*Sample failed due to surface crazing.

Formulation 19-(3) in the above table demonstrates that HALS (UV-3346) in combination with UV absorber (UV-1164) show synergistic performance when used in combination with Sucrose esters.

TABLE 20

UV Weathering Performance of
Polypropylene Stabilized with HALS +
UV Absorber + Ethoxylated Esters of Fatty Acids
(60° Gloss Data)

20A.

| Description | 60° Gloss (Initial) | 60° Gloss (After 200 hours) | 60° Gloss (After 700 hours) |
|---|---|---|---|
| 20-(1) No stabilizer | 88 | Failed* | — |
| 20-(2) 0.15% PEGOSPERSE ® 100-S | 90 | Failed* | — |
| 20-(3) 0.15% PEGOSPERSE ® 400-MS | 88 | Failed* | — |
| 20-(4) 0.15% PEGOSPERSE ® 400-DS | 89 | Failed* | — |
| 20-(5) 0.09% UV-3346 + 0.01% UV-1164 | 90 | 89 | Failed* |
| 20-(6) 0.09% UV-3346 + 0.01% UV-1164 + 0.15% PEGOSPERSE ® 100-S | 88 | 88 | 89 |
| 20-(7) 0.09% UV-3346 + 0.01% UV-1164 + 0.15% PEGOSPERSE ® 400-MS | 88 | 88 | 89 |
| 20-(8) 0.09% UV-3346 + 0.01% UV-1164 + 0.15% PEGOSPERSE ® 400-DS | 89 | 89 | 89 |

TABLE 20-continued

UV Weathering Performance of
Polypropylene Stabilized with HALS +
UV Absorber + Ethoxylated Esters of Fatty Acids
(60° Gloss Data)

| Description | 60° Gloss (Initial) | 60° Gloss (After 200 hours) | 60° Gloss (After 800 hours) |
|---|---|---|---|
| 20B. | | | |
| 20-(9) 0.15% PEGOSPERSE ® 100-L | 89 | Failed* | — |
| 20-(10) 0.09% UV-3346 + 0.01% UV-1164 | 90 | 90 | Failed* |
| 20-(11) 0.09% UV-3346 + 0.01% UV-1164 + 0.15% PEGOSPERSE ® 100-L | 88 | 90 | 90 |
| 20C. | | | |
| 20-(12) 0.15% PEGOSPERSE ® 400-DO | 84 | Failed* | — |
| 20-(13) 0.09% UV-3346 + 0.01% UV-1164 | 90 | 90 | Failed* |
| 20-(14) 0.09% UV-3346 + 0.01% UV-1164 + 0.15% PEGOSPERSE ® 400-DO | 89 | 89 | 88 |

*Sample failed due to surface crazing.

Formulations 20-(6), 20-(7), 20-(8), 20-(11), and 20-(14) demonstrate that HALS (UV-3346) in combination with UV absorber (UV-1164) show synergistic performance when used in combination with ethoxylated esters of fatty acids.

TABLE 21

UV Weathering Performance of
Polypropylene Stabilized with HALS +
UV Absorber + Ethylene Glycol Fatty Acid Esters
(60° Gloss Data)

| Description | 60° Gloss (Initial) | 60° Gloss (After 100 hours) | 60° Gloss (After 700 hours) |
|---|---|---|---|
| 21A. | | | |
| 21-(1) No stabilizer | 88 | Failed* | — |
| 21-(2) 0.15% PEGOSPERSE ® 50-MS | 89 | Failed* | — |
| 21-(3) 0.09% UV-3346 + 0.01% UV-1164 | 90 | 90 | Failed* |
| 21-(4) 0.09% UV-3346 + 0.01% UV-1164 + 0.15% PEGOSPERSE ® 50-MS | 89 | 89 | 90 |

| Description | 60° Gloss (Initial) | 60° Gloss (After 125 hours) | 60° Gloss (After 800 hours) |
|---|---|---|---|
| 21B. | | | |
| 21-(5) 0.15% PEGOSPERSE ® 50-DS | 88 | Failed* | — |
| 21-(6) 0.09% UV-3346 + 0.01% UV-1164 | 90 | 90 | Failed* |
| 21-(7) 0.09% UV-3346 + 0.01% UV-1164 + 0.15% PEGOSPERSE ® 50-DS | 90 | 89 | 80 |

*Sample failed due to surface crazing.

Formulations 21-(4) and 21-(7) demonstrate that HALS (UV-3346) in combination with UV absorber (UV-1164) show synergistic performance when used in combination with ethylene glycol fatty acid esters.

TABLE 22

UV Weathering Performance of Polypropylene Stabilized
with HALS + UV Absorber + Ethoxylated Castor Oils
(60° Gloss Data)

| Description | 60° Gloss (Initial) | 60° Gloss (After 100 hours) | 60° Gloss (After 700 hours) |
|---|---|---|---|
| 22-(1) No stabilizer | 88 | Failed* | — |
| 22-(2) 0.15% ETOCAS ®-5 | 88 | Failed* | — |
| 22-(3) 0.09% UV-3346 + 0.01% UV-1164 | 89 | 89 | Failed* |
| 22-(4) 0.09% UV-3346 + 0.01% UV-1164 + 0.15% ETOCAS ®-5 | 89 | 88 | 89 |

*Sample failed due to surface crazing

Formulation 22-(4) demonstrates that HALS (UV-3346) in combination with UV absorber (UV-1164) show synergistic performance when used in combination with ethoxylated castor oils.

TABLE 23

UV Weathering Performance of
Polypropylene Stabilized with HALS + UV Absorber +
Ethoxylated Hydrogenated Castor Oils
(60° Gloss Data)

| Description | 60° Gloss (Initial) | 60° Gloss (After 100 hours) | 60° Gloss (After 700 hours) |
|---|---|---|---|
| 23A. | | | |
| 23-(1) 0.15% CRODURET ® 7 | 89 | Failed* | — |
| 23-(2) 0.09% UV-3346 + 0.01% UV-1164 | 90 | 90 | Failed* |
| 23-(3) 0.09% UV-3346 + 0.01% UV-1164 + 0.15% CRODURET ® 7 | 89 | 90 | 89 |
| 23B. | | | |
| 23-(4) No stabilizer | 88 | Failed* | — |
| 23-(5) 0.15% CRODURET ® 25 | 88 | Failed* | — |
| 23-(6) 0.09% UV-3346 + 0.01% UV-1164 | 89 | 89 | Failed* |
| 23-(7) 0.09% UV-3346 + 0.01% UV-1164 + 0.15% CRODURET ® 25 | 89 | 88 | 90 |

*Sample failed due to surface crazing.

Formulations 23-(3) and 23-(7) demonstrate that HALS (UV-3346) in combination with UV absorber (UV-1164) show synergistic performance when used in combination with ethoxylated hydrogenated castor oils.

TABLE 24

UV Weathering Performance of Polypropylene
Stabilized with HALS + UV Absorber + Ethylene
Oxide/Propylene Oxide Block Copolymers
(60° Gloss Data)

| Description | 60° Gloss (Initial) | 60° Gloss (After 100 hours) | 60° Gloss (After 650 hours) |
|---|---|---|---|
| 24-(1) 0.15% PLURONIC ® L31 | 88 | Failed* | — |
| 24-(2) 0.15% PLURONIC ® L81 | 88 | Failed* | — |
| 24-(3) 0.15% PLURONIC ® L101 | 88 | Failed* | — |
| 24-(4) 0.15% PLURONIC ® L62 | 88 | Failed* | — |

TABLE 24-continued

UV Weathering Performance of Polypropylene Stabilized with HALS + UV Absorber + Ethylene Oxide/Propylene Oxide Block Copolymers (60° Gloss Data)

| Description | 60° Gloss (Initial) | 60° Gloss (After 100 hours) | 60° Gloss (After 650 hours) |
|---|---|---|---|
| 24-(5) 0.15% PLURONIC ® L43 | 88 | Failed* | — |
| 24-(6) 0.15% PLURONIC ® L35 | 89 | Failed* | — |
| 24-(7) 0.15% PLURONIC ® F38 | 88 | Failed* | — |
| 24-(8) 0.09% UV-3346 + 0.01% UV-1164 | 89 | 89 | Failed* |
| 24-(9) 0.09% UV-3346 + 0.01% UV-1164 + 0.15% PLURONIC ® L31 | 88 | 89 | 90 |
| 24-(10) 0.09% UV-3346 + 0.01% UV-1164 + 0.15% PLURONIC ® L81 | 89 | 88 | 88 |
| 24-(11) 0.09% UV-3346 + 0.01% UV-1164 + 0.15% PLURONIC ® L 101 | 89 | 88 | 89 |
| 24-(12) 0.09% UV-3346 + 0.01% UV-1164 + 0.15% PLURONIC ® L62 | 89 | 88 | 89 |
| 24-(13) 0.09% UV-3346 + 0.01% UV-1164 + 0.15% PLURONIC ® L43 | 89 | 89 | 84 |
| 24-(14) 0.09% UV-3346 + 0.01% UV-1164 + 0.15% PLURONIC ® L35 | 89 | 88 | 84 |
| 24-(15) 0.09% UV-3346 + 0.01% UV-1164 + 0.15% PLURONIC ® F38 | 88 | 88 | 89 |

*Sample failed due to surface crazing.

Formulations 24-(9) to 24-(15) demonstrate that HALS (UV-3346) in combination with UV absorber (UV-1164) show synergistic performance when used in combination with ethylene oxide/propylene oxide block copolymers.

TABLE 25

UV Weathering Performance of Polypropylene Stabilized with HALS + UV Absorber + Fatty Amine Ethoxylates (60° Gloss Data)

| Description | 60° Gloss (Initial) | 60° Gloss (After 100 hours) | 60° Gloss (After 700 hours) |
|---|---|---|---|
| 25A. | | | |
| 25-(1) 0.15% GENAMIN ® S 020 | 89 | Failed* | — |
| 25-(2) 0.15% GENAMIN ® S 080 | 90 | Failed* | — |
| 25-(3) 0.15% GENAMIN ® O 020 | 89 | Failed* | — |
| 25-(4) 0.15% GENAMIN ® O 080 | 90 | Failed* | — |
| 25-(5) 0.15% ETHOMEEN ® C/12 | 90 | Failed* | — |
| 25-(6) 0.15% ETHOMEEN ® C/15 | 90 | Failed* | — |
| 25-(7) 0.09% UV-3346 + 0.01% UV-1164 | 90 | 89 | Failed* |
| 25-(8) 0.09% UV-3346 + 0.01% UV-1164 + 0.15% GENAMIN ® S 020 | 89 | 89 | 89 |
| 25-(9) 0.09% UV-3346 + 0.01% UV-1164 + 0.15% GENAMIN ® S 080 | 89 | 89 | 89 |
| 25-(10) 0.09% UV-3346 + 0.01% UV-1164 + 0.15% GENAMIN ® O 020 | 89 | 88 | 89 |
| 25-(11) 0.09% UV-3346 + 0.01% UV-1164 + 0.15% GENAMIN ® O 080 | 89 | 88 | 72 |
| 25-(12) 0.09% UV-3346 + 0.01% UV-1164 + 0.15% ETHOMEEN ® C/12 | 89 | 88 | 89 |
| 25-(13) 0.09% UV-3346 + 0.01% UV-1164 + 0.15% ETHOMEEN ® C/15 | 90 | 88 | 89 |

| Description | 60° Gloss (Initial) | 60° Gloss (After 100 hours) | 60° Gloss (After 600 hours) |
|---|---|---|---|
| 25B. | | | |
| 25-(14) No Stabilizer | 87 | Failed* | — |
| 25-(15) 0.15% TOMAMINE ® E-T-2 | 88 | Failed* | — |
| 25-(16) 0.15% TOMAMINE ® E-17-5 | 87 | Failed* | — |
| 25-(17) 0.09% UV-3346 + 0.01% UV-1164 | 88 | 88 | Failed* |
| 25-(18) 0.09% UV-3346 + 0.01% UV-1164 + 0.15% TOMAMINE ® E-T-2 | 88 | 88 | 88 |
| 25-(19) 0.09% UV-3346 + 0.01% UV-1164 + 0.15% TOMAMINE ® E-17-5 | 87 | 88 | 88 |

*Sample failed due to surface crazing.

Formulations 25-(8) to 25-(13), 25-(18) and 25-(19) demonstrate that HALS (UV-3346) in combination with UV absorber (UV-1164) show synergistic performance when used in combination with fatty amine ethoxylates.

TABLES 26

UV Weathering Performance of
Polypropylene Stabilized with HALS + UV Absorber +
Fatty Acid Amide Ethoxylates
(60° Gloss Data)

| Description | 60° Gloss (Initial) | 60° Gloss (After 100 hours) | 60° Gloss (After 700 hours) |
|---|---|---|---|
| 26A. | | | |
| 26-(1) No Stabilizer | 88 | Failed* | — |
| 26-(2) 0.15% PROTAMIDE ® HCA-A | 89 | Failed* | — |
| 26-(3) 0.15% PROTAMIDE ® CME | 89 | Failed* | — |
| 26-(4) 0.15% SERDOX ® NXC-3 | 88 | Failed* | — |
| 26-(5) 0.09% UV-3346 + 0.01% UV-1164 | 89 | 89 | Failed* |
| 26-(6) 0.09% UV-3346 + 0.01% UV-1164 + 0.15% PROTAMIDE ® HCA-A | 88 | 88 | 89 |
| 26-(7) 0.09% UV-3346 + 0.01% UV-1164 + 0.15% PROTAMIDE ® CME | 89 | 88 | 88 |
| 26-(8) 0.09% UV-3346 + 0.01% UV-1164 + 0.15% SERDOX ® NXC-3 | 88 | 88 | 89 |
| 26B. | | | |
| 26-(9) 0.15% PROTAMIDE ® L-80M | 89 | Failed* | — |
| 26-(10) 0.09% UV-3346 + 0.01% UV-1164 | 90 | 89 | Failed* |
| 26-(11) 0.09% UV-3346 + 0.01% UV-1164 + 0.15% PROTAMIDE ® L-80M | 88 | 88 | 88 |

*Sample failed due to surface crazing.

Formulations 26-(6) to 26-(8) and 26-(11) demonstrate that HALS (UV-3346) in combination with UV absorber (UV-1164) show synergistic performance when used in combination with fatty acid amide ethoxylates.

TABLE 27

UV Weathering Performance of
Polypropylene Stabilized with HALS + UV Absorber +
Polyglycerol Esters of Fatty Acids
(60° Gloss Data)

| Description | 60° Gloss (Initial) | 60° Gloss (After 100 hours) | 60° Gloss (After 700 hours) |
|---|---|---|---|
| 27A. | | | |
| 27-(1) No stabilizer | 88 | Failed* | — |
| 27-(2) 0.15% POLYALDO ® 3-1-S | 89 | Failed* | — |
| 27-(3) 0.15% POLYALDO ® 6-2-S | 88 | Failed* | — |
| 27-(4) 0.09% UV-3346 + 0.01% UV-1164 | 90 | 90 | Failed* |
| 27-(5) 0.09% UV-3346 + 0.01% UV-1164 + 0.15% POLYALDO ® 3-1-S | 89 | 89 | 90 |
| 27-(6) 0.09% UV-3346 + 0.01% UV-1164 + 0.15% POLYALDO ® 6-2-S | 90 | 91 | 91 |

TABLE 27-continued

UV Weathering Performance of
Polypropylene Stabilized with HALS + UV Absorber +
Polyglycerol Esters of Fatty Acids
(60° Gloss Data)

| Description | 60° Gloss (Initial) | 60° Gloss (After 100 hours) | 60° Gloss (After 800 hours) |
|---|---|---|---|
| 27B. | | | |
| 27-(7) 0.15% CITHROL ® PG3PR | 89 | Failed* | — |
| 27-(8) 0.09% UV-3346 + 0.01% UV-1164 | 90 | 90 | Failed* |
| 27-(9) 0.09% UV-3346 + 0.01% UV-1164 + 0.15% CITHROL ® PG3PR | 90 | 90 | 90 |

*Sample failed due to surface crazing.

Formulations 27-(5), 27-(6) and 27-(9) demonstrate that HALS (UV-3346) in combination with UV absorber (UV-1164) show synergistic performance when used in combination with polyglycerol esters of fatty acids.

TABLE 28

UV Weathering Performance of
Polypropylene Stabilized with HALS +
UV Absorber + Alcohol Ethoxylate/Propoxylate
(60° Gloss Data)

| Description | 60° Gloss (Initial) | 60° Gloss (After 100 hours) | 60° Gloss (After 700 hours) |
|---|---|---|---|
| 28A. | | | |
| 28-(1) 0.15% GENAPOL ® EP2552 | 90 | Failed* | — |
| 28-(2) 0.09% UV-3346 + 0.01% UV-1164 | 90 | 90 | Failed* |
| 28-(3) 0.09% UV-3346 + 0.01% UV-1164 + 0.15% GENAPOL ® EP2552 | 89 | 89 | 89 |

| Description | 60° Gloss (Initial) | 60° Gloss (After 100 hours) | 60° Gloss (After 800 hours) |
|---|---|---|---|
| 28B. | | | |
| 28-(4) No stabilizer | 88 | Failed* | — |
| 28-(5) 0.15% GENAPOL ® EP2525 | 88 | Failed* | — |
| 28-(6) 0.09% UV-3346 + 0.01% UV-1164 | 89 | 89 | Failed* |
| 28-(7) 0.09% UV-3346 + 0.01% UV-1164 + 0.15% GENAPOL ®EP2525 | 89 | 89 | 90 |

*Sample failed due to surface crazing.

Formulations 28-(3) and 28-(7) demonstrate that HALS (UV-3346) in combination with UV absorber (UV-1164) show synergistic performance when used in combination with alcohol ethoxylate/propoxylate.

TABLE 29

UV Weathering Performance of Polypropylene Stabilized
with HALS + UV absorber + Ethoxylated Alcohols
(60° Gloss Data)

| Description | 60° Gloss (Initial) | 60° Gloss (After 300 hours) | 60° Gloss (After 800 hours) |
|---|---|---|---|
| 29-(1) No stabilizer | 88 | Failed* | — |
| 29-(2) 0.09% UV-3346 + 0.01% UV-1164 | 88 | 88 | Failed* |
| 29-(3) 0.09% UV-3346 + 0.01% UV-1164 + 0.15% BEROL ® 840 | 90 | 88 | Failed* |
| 29-(4) 0.09% UV-3346 + 0.01% UV-1164 + 0.15% LUTENSOL ® XP 80 | 89 | 88 | Failed* |
| 29-(5) 0.09% UV-3346 + 0.01% UV-1164 + 0.15% JEECOL ® LA-4 | 88 | 87 | 79 |
| 29-(6) 0.09% UV-3346 + 0.01% UV-1164 + 0.15% BRIJ ®-S2 | 89 | 88 | 89 |
| 29-(7) 0.09% UV-3346 + 0.01% UV-1164 + 0.15% HETOXOL ® OL4 | 90 | 89 | 89 |

*Sample failed due to surface crazing.

Table 29 shows that a range of ethoxylated alcohols can be used in the invention and that stabilizer formulations containing ethoxylated $C_{12}$ alcohols (or higher carbon number) provide the best stabilization. The ethoxylated alcohol can also be alkylated at the terminal hydroxyl group.

Example 2

UV Weathering Performance of Other Resin Types/(60° Gloss Data)

Similar to Example 1, various additive compounds are compounded with high-density polyethylene polymer (available as SCLAIR® 2909 from Nova Chemicals), or with polyamide Nylon 66 polymer (available as TORZEN® U4800 NC01 from M. Holland), and extruded using conventional twin-screw extrusion parameters. After extrusion, standard 2×2×0.125 inch plaques and tensile bars (1 inch) are injection molded using an Arburg injection molding machine. The results are provided in the Tables below.

TABLE 30

UV Weathering Performance of High-Density
Polyethylene Stabilized with HALS +
UV Absorber + Ethoxylated Alcohol
(60° Gloss Data)

| Description | 60° Gloss (Initial) | 60° Gloss (After 250 hours) | 60° Gloss (After 2000 hours) |
|---|---|---|---|
| 30-(1) No additive | 93 | Failed* | — |
| 30-(2) 0.09% UV-3346 + 0.01% UV-1164 | 93 | 97 | Failed* |
| 30-(3) 0.09% UV-3346 + 0.01% UV-1164 + 0.15% BRIJ ® S2 | 95 | 95 | 94 |

*Sample failed due to surface crazing.

In high-density polyethylene polymer, formulation 30-(3) demonstrates that HALS (UV-3346) in combination with UV absorber (UV-1164) show synergistic performance when used in combination with BRU® S2.

TABLE 31

UV Weathering Performance of High-Density Polyethylene
Stabilized with HALS + UV Absorber + Ethoxylated Alcohol
(Physical Properties: Percent Retention of Strain at Break)

| Description | % Retention of Strain at Break (Initial) | % Retention of Strain at Break (After 500 hours) | % Retention of Strain at Break (After 1250 hours) |
|---|---|---|---|
| 31-(1) No additive | 100 | Failed*** | — |
| 31-(2) 0.09% UV-3346 + 0.01% UV-1164 | 100 | 72 | Failed*** |
| 31-(3) 0.09% UV-3346 + 0.01% UV-1164 + 0.15% BRIJ ® S2 | 100 | 71 | 64 |

***Samples retained less than 50% of the original elongation at break.

In high-density polyethylene polymer, formulation 31-(3) demonstrates that HALS (UV-3346) in combination with UV absorber (UV-1164) show synergistic performance when used in combination with BRU® S2 in enhancing physical properties.

TABLE 32

UV Weathering Performance of Polyamide (Nylon 66)
Stabilized with HALS + UV Absorber + Ethoxylated Alcohol
(60° Gloss Data)

| Description | 60° Gloss (Initial) | 60° Gloss (After 200 hours) |
|---|---|---|
| 32-(1) 0.09% UV-3346 + 0.01% UV-1164 | 93 | Failed* |
| 32-(2) 0.09% UV-3346 + 0.01% UV-1164 + 0.10% BRIJ ® S2 | 96 | 97 |

*Sample failed due to surface crazing.

In nylon, formulation 32-(2) demonstrates that HALS (UV-3346) in combination with UV absorber (UV-1164) show synergistic performance when used in combination with BRU® S2.

Example 3

Contact Angle Measurements (Water on Polypropylene Plaques)

Contact angles are measured using the sessile drop method which is an optical contact angle method using a KSV Model 200 CAM. Measurements are made on several droplets on injection molded plaques. The instrument software measures the left and right angles using the Young/Laplace equation-based method. The area of the droplet is measured using the software rather than controlling the volume of droplet with a micro-pipette. The volume of each droplet is ~10.0±0.5 µL. Results are shown in the Table below.

TABLE 33

Contact Angle Measurements (Water on Polypropylene Plaques)

| Formulation | Contact Angle (°) |
|---|---|
| 33-(1) 0.01% UV-1164/0.09% UV-3346/0.10% BRIJ ® S2 | 102 |
| 33-(2) 0.01% UV-1164/0.09% UV-3346/0.15% BRIJ ® S2 | 94 |
| 33-(3) 0.01% UV-1164/0.09% UV-3346/0.30% BRIJ ® S2 | 98 |
| 33-(4) 0.025% UV-1164/0.23% UV-3346/0.30% BRIJ ® S2 | 96 |
| 33-(5) 0.01% UV-1164/0.09% UV-3346 | 102 |
| 33-(6) Polypropylene resin (control) | 102 |

TABLE 33-continued

Contact Angle Measurements (Water on Polypropylene Plaques)

| Formulation | Contact Angle (°) |
|---|---|
| 33-(7) 0.10% BRIJ ® S2 | 107 |
| 33-(8) 0.15% BRIJ ® S2 | 96 |
| 33-(9) 0.30% BRIJ ® S2 | 88 |
| 33-(10) 1.0% BRIJ ® S2 | <5 |

Table 33 shows that formulations of the invention can provide a low degree of wettability as measured by the contact angle made with a water droplet on a surface of an article of manufacture made with a material, such as polypropylene, containing a stabilizer composition as described herein.

As those skilled in the art will appreciate, all ranges described herein include the upper and lower limits, as well as any value in between as if specifically recited herein, and each value is contemplated by the inventors. Thus, disclosure of a narrower range or more specific group in addition to a broader range is not a disclaimer of the broader range or larger group. Various patent and/or scientific literature references have been referred to throughout this application. The disclosures of these publications in their entireties are hereby incorporated by reference as if written herein. However, if a term in the present application contradicts or conflicts with a term in the incorporated reference, the term from the present application takes precedence over the conflicting term from the incorporated reference. In view of the above description and the examples, one of ordinary skill in the art will be able to practice the disclosure as claimed without undue experimentation.

Although the foregoing description has shown, described, and pointed out the fundamental novel features of the typical embodiments of the invention, it will be understood that various omissions, substitutions, and changes may be made by those skilled in the art, without departing from the scope of the present teachings.

We claim:

1. A masterbatch concentrate comprising a stabilizer composition for polymeric organic materials, and at least one polymeric organic material identical to or compatible with a polymeric organic material to be stabilized by the masterbatch concentrate, wherein the stabilizer composition is present in an amount from 10 wt. % to 90 wt. %, based on the total weight of the masterbatch concentrate, said stabilizer composition consisting essentially of:

(i) a stabilizing amount of an ultraviolet light absorber (UVA) selected from the group consisting of: orthohydroxybenzophenone compounds; orthohydroxyphenyl benzotriazole compounds; and mixtures thereof;

(ii) a stabilizing amount of a co-active agent selected from the group consisting of $C_{12}$-$C_{60}$ monohydric alcohols; alkoxylated alcohols or monoalkyl ethers thereof; and mixtures thereof, wherein the co-active agent is present at from 1 wt. % to 99 wt. % based on the total weight of the stabilizer composition; and (iii) a stabilizing amount of a hindered amine light stabilizer compound (HALS) comprising a functional group according to Formula (II):

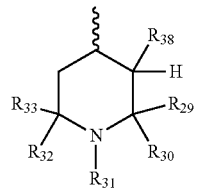

(II)

wherein $R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or a functional group according to Formula (IIa):

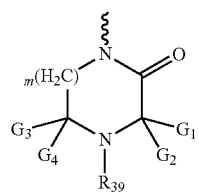

(IIa)

wherein
m is an integer from 1 to 2;
$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and
each of $G_1$-$G_4$ is independently chosen from $C_1$-$C_{20}$ hydrocarbyl; or
mixtures of HALS compounds having functional groups according to Formula (II) and Formula (IIa).

2. The masterbatch concentrate according to claim 1, wherein the co-active agent and the UV absorber combined with HALS (co-active agent:(UVA+HALS)) are present in a weight ratio from 1:20 to 50:1.

3. The masterbatch concentrate according to claim 1, wherein the UV absorber comprises a orthohydroxybenzophenone compound selected from the group consisting of 2-hydroxy-4-methoxybenzophenone; 2,2'-dihydroxy-4-methoxybenzophenone; 2-hydroxy-4-octyloxybenzophenone; 2,2'-dihydroxy-4,4'-di-methoxybenzophenone; 2,2'-dihydroxybenzophenone; 2,2',4,4'-tetrahydroxybenzophenone; 2,2'-dihydroxy-4,4'-dimethoxybenzophenone; 2,2'-dihydroxy-4,4'-diethoxybenzophenone; 2,2'-dihydroxy-4,4'-dipropoxybenzophenone; 2,2'-dihydroxy-4,4'-dibutoxybenzophenone; 2,2'-dihydroxy-4-methoxy-4'-ethoxybenzophenone; 2,2'-dihydroxy-4-methoxy-4'-propoxybenzophenone; 2,2'-dihydroxy-4-methoxy-4'-butoxybenzophenone; 2,2'-dihydroxy-4-ethoxy-4'-propoxybenzophenone; 2,2'-dihydroxy-4-ethoxy-4'-butoxybenzophenone; 2,3'-dihydroxy-4,4'-dimethoxybenzophenone; 2,3'-dihydroxy-4-methoxy-4'-butoxybenzophenone; 2-hydroxy-4,4',5'-trimethoxybenzophenone; 2-hydroxy-4,4',6'-tributoxybenzophenone; 2-hydroxy-4-butoxy-4',5'-dimethoxybenzophenone; 2-hydroxy-4-ethoxy-2',4'-dibutylbenzophenone; 2-hydroxy-4-propoxy-4',6'-dichlorobenzophenone; 2-hydroxy-4-propoxy-4',6'-dibromobenzophenone; 2,4-dihydroxybenzophenone;

2-hydroxy-4-ethoxybenzophenone; 2-hydroxy-4-propoxybenzophenone; 2-hydroxy-4-butoxybenzophenone; 2-hydroxy-4-methoxy-4'-methylbenzophenone; 2-hydroxy-4-methoxy-4'-ethylbenzophenone; 2-hydroxy-4-methoxy-4'-propylbenzophenone; 2-hydroxy-4-methoxy-4'-butylbenzophenone; 2-hydroxy-4-methoxy-4'-tertiary butylbenzophenone; 2-hydroxy-4-methoxy-4'-chlorobenzophenone; 2-hydroxy-4-methoxy-2'-chlorobenzophenone; 2-hydroxy-4-methoxy-4'-bromobenzophenone; 2-hydroxy-4,4'-dimethoxybenzophenone; 2-hydroxy-4,4'-dimethoxy-3-methylbenzophenone; 2-hydroxy-4,4'-dimethoxy-2'-ethylbenzophenone; 2-hydroxy-4,4',5'-trimethoxybenzophenone; 2-hydroxy-4-ethoxy-4'-methylbenzophenone; 2-hydroxy-4-ethoxy-4'-ethylbenzophenone; 2-hydroxy-4-ethoxy-4'-propylbenzophenone; 2-hydroxy-4-ethoxy-4'-butylbenzophenone; 2-hydroxy-4-ethoxy-4'-methoxybenzophenone; 2-hydroxy-4,4'-diethoxybenzophenone; 2-hydroxy-4-ethoxy-4'-propoxybenzophenone; 2-hydroxy-4-ethoxy-4'-butoxybenzophenone; 2-hydroxy-4-ethoxy-4'-chlorobenzophenone; 2-hydroxy-4-ethoxy-4'-bromobenzophenone; and mixtures thereof.

4. The masterbatch concentrate according to claim 3, wherein the UV absorber comprises an orthohydroxyphenyl benzotriazole compound selected from the group consisting of 2-(2'-hydroxy-5'-methylphenyl)-benzotriazole; 2-(2'-hydroxy-5'-tert-butylphenyl)benzotriazole; 2-(2'-hydroxy-3'-methyl-5'-tert-butylphenyl)-benzotriazole; 2-(2'-hydroxy-5'-cyclohexylphenyl)-benzotriazole; 2-(2'-hydroxy-3',5'-dimethylphenyl)-benzotriazole; 2-(2'-hydroxy-5'-tert-butylphenyl)-5-chloro-benzotriazole; 2-(2'-hydroxy-5-tert-octylphenyl)-2H-benzotriazole; 2-(2'-hydroxy-5-octylphenyl)-2H-benzotriazole; 2-(3',5'-di-tert-butyl-2'-hydroxyphenyl)-5-chlorobenzotriazole; 2-(3'-tert-butyl-5'-methyl-butyl-2'hydroxyphenyl)-5-chlorobenzotriazole; 2-(3',5'-di-tert-amyl-2'-hydroxyphenyl)benzotriazole; 2-(3',5'-bis(α,α-dimethylbenzyl)-2'-hydroxyphenyl)benzotriazole; 2-(3'-tert-butyl-2'-hydroxy-5'-(2-octyloxycarbonylethyl)phenyl) benzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; 2-[2'-hydroxy-3'-(α,α-dimethylbenzyl)-5'-(1,1,3,3-tetramethyl-butyl)phenyl]benzotriazole; 5-trifluoromethyl-2-(2-hydroxy-3-«-cumyl-5-tert-octylphenyl)-2H-benzotriazole; 2-(2'-hydroxy-5'-(2-hydroxyethyl) phenyl)benzotriazole; 2-(2'-hydroxy-5'-(2-methacryloyloxyethyl)phenyl)benzotriazole; 2-(3'-tert-butyl-5'-methyl-2'-hydroxyphenyl)-5-chloro-benzotriazole; 2-(3'-sec-butyl-5'-tert.butyl-2'-hydroxyphenyl)-benzotriazole; 2-(3',5'-di-tert-butyl-2'-hydroxyphenyl)-benzotriazole; 2-(5'-tert-octyl-2'-hydroxyphenyl)-benzotriazole; 2-(3'-dodecyl-5'-methyl-2'-hydroxyphenyl)-benzotriazole; 2-(3'-tert-butyl-5'-(2-octyloxycarbonylethyl)-2'-hydroxyphenyl)-5-chlorobenzotriazole; 2-(5'-methyl-2'-hydroxyphenyl)-benzotriazole; 2-(5'-tert-butyl-2'-hydroxyphenyl)-benzotriazole; 2-(2'-hydroxy-3'-di-tert-butylphenyl)-benzotriazole; and mixtures thereof.

5. The masterbatch concentrate according to claim 1, wherein the hindered amine light stabilizer is selected from the group consisting of bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl) sebacate; bis (1-octyloxy-2,2,6,6-tetramethylpiperidin-4-yl) sebacate; bis (1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl) hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2, 6,6-tetramethylpiperidine; bis(1,2,2,6,6-pentamethylpiperidyl)-2-n-butyl-2-(2-hydroxy-3,5-di-tert-butylbenzyl) malonate; 3-n-octyl-7,7,9,9-tetramethyl-1,3,8-triazaspiro [4.5]decan-2,4-dione; bis(1-octyloxy-2,2,6,6-tetramethylpiperidyl) sebacate; bis(1-octyloxy-2,2,6,6-tetramethylpiperidyl)succinate; a condensate of N,N'-bis(2,2,6,6-tetramethylpiperidin-4-yl) hexamethylenediamine and 4-morpholino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino) ethane; a condensate of 2-chloro-4,6-bis(4-n-butylamino-1,2,2,6,6-pentamethylpiperidyl)-1, 3,5-triazine and 1,2-bis-(3-aminopropylamino) ethane; 8-acetyl-3-dodecyl-7,7,9,9-tetramethyl-1,3,8-triazaspiro [4.5]decane-2,4-dione; 3-dodecyl-1-(2,2,6,6-tetramethylpiperidin-4-yl) pyrrolidin-2,5-dione; 3-dodecyl-1-(1-ethanoyl-2,2,6,6-tetramethylpiperidin-4-yl) pyrrolidin-2,5-dione; 3-dodecyl-1-(1,2,2,6,6-pentamethylpiperidin-4-yl) pyrrolidine-2,5-dione; a mixture of 4-hexadecyloxy- and 4-stearyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl) hexamethylenediamine and 4-cyclohexylamino-2,6-dichloro-1,3,5-triazine; a condensate of 1,2-bis(3-aminopropylamino) ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro [4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2, 2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol, 1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl) carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2, 6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl) pyrrolidine-2,5-dione; 1H-pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1"'-[1,3,5-triazine-2,4,6-triyltris[(cyclohexylimino)-2,1-ethanediyl]]tris[3,3,5, 5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl) hexamethylenediamine and 4-cyclohexylamino-2,6-dichloro-1,3,5-triazine; the condensate of 1,2-bis(3-aminopropylamino) ethane, 2,4,6-trichloro-1,3,5-triazine and 4-butylamino-2,2,6,6-tetramethylpiperidine; the condensate of N,N'-bis(2,2,6,6-tetramethylpiperidin-4-yl) hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino) ethane; the condensate of 2-chloro-4,6-bis(4-n-butylamino-1,2,2,6,6-pentamethylpiperidyl)-1,3,5-triazine and 1,2-bis-(3-aminopropylamino) ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl)ester; tetrakis (2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl) hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy (2',2',6',6'-tetramethyl-4,4'-piperidinyl)]siloxane; polymethyl[propyl-3-oxy (l',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl) succinimide; 1,2,3,4-butanetetracarboxylic acid, polymer with β,β,β',β'-tetramethyl-2,4,8,10-tetraoxaspiro [5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl) pyrrolidine-2,5-dione; 3-dodecyl-1-(1-ethanoyl-2,2,6,6-pentamethylpiperidin-4-yl) pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl) malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl)succinate; 8-acetyl-3-dodecyl-7,7,9,9-tetramethyl-1,3,8-triazaspiro [4.5]decane-2,4-dione; 3-dodecyl-1-(2,2,6,6-tetramethylpiperidin-4-yl) pyrrolidin-2,5-dione; 3-dodecyl-1-(1-ethanoyl-2,2,6,6-tetramethylpiperidin-4-yl) pyrrolidin-2,5-dione; 3-dodecyl-1-(1,2,2,6,6-pentamethylpiperidin-4-yl) pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5]decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl) 3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5) pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5) pentamethylene-1,5-diazepin-2-one; 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated; and mixtures thereof.

6. The masterbatch concentrate according to claim 1, wherein the co-active agent is an alcohol selected from the group consisting of 1-decanol; 1-undecanol; 1-dodecanol; 1-tridecanol; 1-tetradecanol; 1-pentadecanol; 1-hexadecanol; 1-heptadecanol; 1-octadecanol; 1-nonadecanol; 1-eicosanol; 1-docosanol; 1-tetracosanol; 1-hexacosanol; 1 octacosanol; 1-triacontanol; 2-methyl-1-undecanol; 2-propyl-1-nonanol; 2-butyl-1-octanol; 2-methyl-1-tridecanol; 2-ethyl-1-dodecanol; 2-propyl-1-undecanol; 2-butyl-1-decanol; 2-pentyl-1-nonanol; 2-hexyl-1-octanol; 2-methyl-1-pentadecanol; 2-ethyl-1-tetradecanol; 2-propyl-1-tridecanol; 2-butyl-1-dodecanol; 2-pentyl-1-undecanol; 2-hexyl-1-decanol; 2-heptyl-1-decanol; 2-hexyl-1-nonanol; 2-octyl-1-octanol; 2-methyl-1-heptadecanol; 2-ethyl-1-hexadecanol;

2-propyl-1-pentadecanol; 2-butyl-1-tetradecanol; 1-pentyl-1-tridecanol; 2-hexyl-1-dodecanol; 2-octyl-1-decanol; 2-nonyl-1-nonanol; 2-dodecanol; 3-dodecanol; 4-dodecanol; 5-dodecanol; 6-dodecanol; 2-tetradecanol; 3-tetradecanol; 4-tetradecanol; 5-tetradecanol; 6-tetradecanol; tetradecanol; 7-tetradecanol; 2-hexadecanol; 3-hexadecanol; 4-hexadecanol; 5-hexadecanol; 6-hexadecanol; 7-hexadecanol; 8-hexadecanol; 2-octadecanol; 3-octadecanol; 4-octadecanol; 5-octadecanol; 6-octadecanol; 7-octadecanol; 8-octadecanol; 9-octadecanol; 9-octadedcanol-1; 2,4,6-trimethyl-1-heptanol; 2,4,6,8-tetramethyl-1-nonanol; 3,5,5-trimethyl-1-hexanol; 3,5,5,7,7-pentamethyl-1-octanol; 3-butyl-1-nonanol; 3-butyl-1-undecanol; 3-hexyl-1-undecanol; 3-hexyl-1-tridecanol; 3-octyl-1-tridecanol; 2-methyl-2-undecanol; 3-methyl-3-undecanol; 4-methyl-4-undecanol; 2-methyl-2-tridecanol; 3-methyl-3-tridecanol; 4-methyl-3-tridecanol; 4-methyl-4-tridecanol; 3-ethyl-3-decanol; 3-ethyl-3-dodecanol; 2,4,6,8-tetramethyl-2-nonanol; 2-methyl-3-undecanol; 2-methyl-4-undecanol; 4-methyl-2-undecanol; 5-methyl-2-undecanol; 4-ethyl-2-decanol; 4-ethyl-3-decanol; and mixtures thereof.

7. The masterbatch concentrate according to claim 1, wherein the co-active agent comprises an alkoxylated alcohol according to Formula (III):

or monoalkyl ether thereof, wherein R is a hydrocarbyl group having from 12 to 60 carbon atoms; R' is chosen from H or $C_1$-$C_4$ alkyl; R" is chosen from H or a hydrocarbyl group having from 1 to 10 carbon atoms; and y is an integer from 1 to 100.

8. The masterbatch concentrate according to claim 7, wherein R is a $C_{12}$ to $C_{30}$ alkyl.

9. The masterbatch concentrate according to claim 8, wherein the alkyl group contains from 12 to 22 carbons.

10. The masterbatch concentrate according to claim 8, wherein R" is H.

11. The masterbatch concentrate according to claim 7, wherein y is from 1 to 75.

12. The masterbatch concentrate according to claim 7, wherein the co-active agent comprises an ethoxylated and/or propoxylated alcohol, wherein the alcohol is selected from the group consisting of docosyl alcohol; stearyl alcohol; oleyl alcohol; cetyl alcohol; isotridecyl alcohol; lauryl alcohol; $C_{12}$-$C_{15}$ alcohols; $C_{16}$/$C_{18}$ alcohols; and $C_{20}$-$C_{50}$ alcohols.

13. The masterbatch concentrate according to claim 12, wherein the co-active agent comprises a mixture of ethoxylated alcohol and propoxylated alcohol.

14. The masterbatch concentrate according to claim 13, wherein the alcohol comprises $C_{12}$-$C_{30}$ alcohols.

15. The masterbatch concentrate according to claim 12, wherein the co-active agent is selected from the group consisting of $C_{12}$-$C_{15}$ oxo alcohols having 2 ethylene oxide and 5 propylene oxide groups; and $C_{12}$-$C_{15}$ oxo alcohols having 5 ethylene oxide and 2 propylene oxide groups.

16. The masterbatch concentrate according to claim 7, wherein R" is methyl and the co-active agent comprises a monoalkyl ether of an ethoxylated and/or propoxylated alcohol, wherein the alcohol is selected from the group consisting of docosyl alcohol; stearyl alcohol; oleyl alcohol; cetyl alcohol; isotridecyl alcohol; lauryl alcohol; $C_{12}$-$C_{15}$ alcohols; $C_{16}$/$C_{18}$ alcohols; and $C_{20}$-$C_{50}$ alcohols.

17. The masterbatch concentrate according to any one of claims 1 to 7, wherein
(i) the UVA comprises
a benzophenone compound selected from the group consisting of 2-hydroxy-4-methoxybenzophenone; 2,2'-dihydroxy-4-methoxybenzophenone; 2-hydroxy-4-octyloxybenzophenone; and mixtures thereof;
a benzotriazole compound selected from the group consisting of 2-(2'-hydroxy-5'-methylphenyl)-benzotriazole; 2-(2'-hydroxy-3',5'-dimethylphenyl)-benzotriazole; 2-(2'-hydroxy-5-tert-octylphenyl)-2H-benzotriazole; 2-(3',5'-di-tert-butyl-2'-hydroxyphenyl)-5-chlorobenzotriazole; 2-(3'-tert-butyl-5'-methyl-2'-hydroxyphenyl)-5-chloro-benzotriazole; 2-(3',5'-di-tert-amyl-2'-hydroxyphenyl)benzotriazole; 2-(3',5'-bis(α,α-dimethylbenzyl)-2'-hydroxyphenyl)
benzotriazole; the transesterification product of 2-[3'-tert-butyl-5'-(2-methoxycarbonylethyl)-2'-hydroxyphenyl]-2H-benzotriazole with polyethylene glycol 300; and mixtures thereof, or
mixtures of said benzophenone and said benzotriazole compounds;
(ii) the co-active agent comprises an alkoxylated alcohol according to Formula (III):

or monoalkyl ether thereof,
wherein R is a hydrocarbyl group having from 12 to 60 carbon atoms; R' is chosen from H or $C_1$-$C_4$ alkyl; R" is chosen from H or a hydrocarbyl group having from 1 to 10 carbon atoms; and y is an integer from 1 to 100; and
(iii) the HALS is selected from the group consisting of bis(2,2,6,6-tetramethylpiperidin-4-yl) sebacate; bis(2,2,6,6-tetramethylpiperidin-4-yl)succinate; bis(1,2,2,6,6-pentamethylpiperidin-4-yl) sebacate; bis(1-octyloxy-2,2,6,6-tetramethylpiperidin-4-yl) sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl) hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)
malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl)succinate; a condensate of N,N'-bis(2,2,6,6-tetramethylpiperidin-4-yl)
hexamethylenediamine and 4-morpholino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine, methylated; a condensate of 2-chloro-4,6-bis(4-n-butylamino-2,2,6,6-tetramethylpiperidyl)-1,3,5-triazine and 1,2-bis(3-aminopropylamino) ethane; a condensate of 2-chloro-4,6-bis(4-n-butylamino-1,2,2,6,6-pentamethylpiperidyl)-1,3,5-triazine and 1,2-bis-(3- aminopropylamino) ethane; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl) pyrrolidin-2,5-dione; 3-dodecyl-1-(1-ethanoyl-2,2,6,6-tetramethylpiperidin-4-yl) pyrrolidin-2,5-dione; 3-dodecyl-1-(1,2,2,6,6-pentamethylpiperidin-4-yl) pyrrolidine-2,5-dione; a mixture of 4-hexadecyloxy- and 4-stearyloxy-2,2,6,6-tetramethylpiperidine; a mixture of 4-hexadecyloxy- and 4-stearyloxy-1,2,2,6,6-pentamethylpiperidine; a condensate of N,N'-bis(2,2,6,6-tetramethylpiperidin-4-yl) hexamethylenediamine and 4-cyclohexylamino-2,6-dichloro-1,3,5-triazine; a condensate of 1,2-bis(3-aminopropylamino) ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis(1,2,2,6,6-pentamethyl-4-piperidinyl)ester; 1,2,3,4-butanetetracarboxylic acid, 1,2,2,6,6-pentamethyl-4-piperidinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethanol,1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl) carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine; 1-(4-octadecanoyloxy-2,2,6,6-tetramethylpiperidin-1-yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethylsuccinate; 2,2,4,4-tetramethyl-7-oxa-3,20-diazadispiro[5.1.11.2]heneicosan-21-one; the ester of 2,2,6,6-tetramethyl-4-piperidinol with higher fatty acids; 3-dodecyl-1-(2,2,6,6-tetramethyl-4-piperidyl) pyrrolidine-2,5-dione; 1H-Pyrrole-2,5-dione, 1-octadecyl-, polymer with (1-methylethenyl)benzene and 1-(2,2,6,6-tetramethyl-4-piperidinyl)-1H-pyrrole-2,5-dione; piperazinone, 1,1',1''-[1,3,5-triazine-2,4,6-triyltris[(cyclohexylimino)-2,1-ethanediyl]]tris[3,3,5,5-tetramethyl-; piperazinone, 1,1',1''-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl) hexamethylenediamine and 4-cyclohexylamino-2,6-dichloro-1,3,5-triazine; the condensate of 1,2-bis(3-aminopropylamino) ethane, 2,4,6-trichloro-1,3,5-triazine and 4-butylamino-2,2,6,6-tetramethylpiperidine; the condensate of N,N'-bis(2,2,6,6-tetramethylpiperidin-4-yl) hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino) ethane; the condensate of 2-chloro-4,6-bis(4-n-butylamino-1,2,2,6,6-pentamethylpiperidyl)-1,3,5-triazine and 1,2-bis-(3-aminopropylamino) ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl)ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro{5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl) hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecylester and 2,2,4,4-tetramethyl-21-oxo-7-oxa-3.20-diazaspiro(5.1.11.2)-heneicosane-20-propanoic acid-tetradecylester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy (2',2',6',6'-tetramethyl-4,4'-piperidinyl)]siloxane; polymethyl[propyl-3-oxy (1',2',2',6',6'-pentamethyl-4,4'-piperidinyl)]siloxane; copolymer of methylmethacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl) succinimide; 1,2,3,4-butanetetracarboxylic acid, polymer with $\beta,\beta,\beta',\beta'$-tetramethyl-2,4,8,10-tetraoxaspiro [5.5]undecane-3,9-diethanol, 1,2,2,6,6-pentamethyl-4-piperidinyl ester; 1,2,3,4-butanetetracarboxylic acid, polymer with $\beta,\beta,\beta',\beta'$-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine; ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl); D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2] heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethyl-4-piperidinyl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl) pyrrolidine-2, 5-dione; 3-dodecyl-1-(1-ethanoyl-2,2,6,6-pentamethylpiperidin-4-yl) pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl) malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl) pyrrolidin-2,5-dione; 3-dodecyl-1-(1-ethanoyl-2,2,6,6-tetramethylpiperidin-4-yl) pyrrolidin-2,5-dione; 3-dodecyl-1-(1,2,2,6,6-pentamethylpiperidin-4-yl) pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro[4.5] decane; 1,5-dioxaspiro{5,5}undecane-3,3-dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl) 3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5) pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; $N^1$-octyl-1,4-diazadispiro-(3,3,5,5) pentamethylene-1,5-diazepin-2-one; 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated; and mixtures thereof.

18. The masterbatch concentrate according to claim 17, wherein R is a $C_{12}$ to $C_{18}$ alkyl; each of R' and R" is H; and y is chosen from 1 to 75.

19. A stabilized article of manufacture having a contact angle with water at a surface of the article of greater than 20°, said stabilized article of manufacture comprising
an organic material to be stabilized; wherein the organic material is a polyolefin; and
(a) from 0.01 wt. % to 15 wt. %, based on the total weight of the article of manufacture, of a stabilizer composition consisting essentially of:
(i) a stabilizing amount of an ultraviolet light absorber (UVA) selected from the group consisting of: orthohydroxybenzophenone compounds; orthohydroxyphenyl benzotriazole compounds; and mixtures thereof;
(ii) from 1 wt. % to 99 wt. % based on the total weight of the stabilizer composition of a co-active agent selected from the group consisting of $C_{12}$-$C_{60}$ monohydric alcohols; alkoxylated alcohols or monoalkyl ethers thereof; and mixtures thereof; and
(iii) a stabilizing amount of a hindered amine light stabilizer compound (HALS) comprising a functional group according to Formula (II):

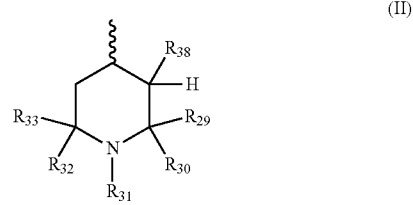

(II)

wherein
$R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and
each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or
a functional group according to Formula (IIa):

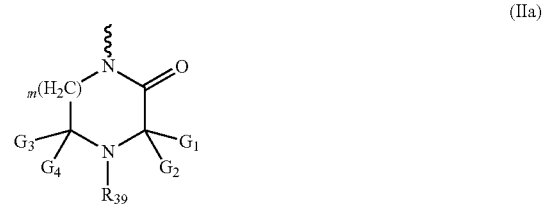

(IIa)

wherein
m is an integer from 1 to 2;
$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and
each of $G_1$-$G_4$ is independently chosen from $C_1$-$C_{20}$ hydrocarbyl; or
mixtures of HALS compounds having functional groups according to Formula (II) and Formula (IIa); or
(b) a masterbatch concentrate as defined in claim 1, such that the final concentration of the co-active agent in the article of manufacture is from 0.01 wt. % to 1 wt. %, based on the weight of the article of manufacture.

20. An article of manufacture according to claim 19, wherein the final concentration of co-active agent in the article of manufacture is from 0.05 wt. % to 0.5 wt. %, based on the weight of the article of manufacture.

21. An article of manufacture according to claim 1, wherein the polymeric organic material to be stabilized is selected from the group consisting of polyolefins, poly (ethylene-vinyl acetate) (EVA), polyesters, polyethers, polyketones, polyamides, natural and synthetic rubbers, polyurethanes, polystyrenes, high-impact polystyrenes, polyacrylates, polymethacrylates, polybutyl acrylates, polyacetals, polyacrylonitriles, polybutadienes, polystyrenes, acrylonitrile-butadiene-styrene, styrene acrylonitrile, acrylate styrene acrylonitrile, cellulosic acetate butyrate, cellulosic polymers, polyimides, polyamideimides, polyetherimides, polyphenylsulfides, polyphenyloxidepolysulfones, polyethersulfones, polyvinylchlorides, polycarbonates, polyketones, aliphatic polyketones, thermoplastic olefins (TPO), aminoresin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, coating compositions, radiation curable compositions, epoxymelamine resins, organic dyes, cosmetic products, cellulose-based paper formulations, photographic film paper, fibers, waxes, and inks.

22. A stabilized article of manufacture having a contact angle with water at a surface of the article greater than 20°, said stabilized article comprising:
a polymeric organic material to be stabilized that is a polyolefin polymer selected from the group consisting of i) polymers of monoolefins chosen from polyethylene, polypropylene, polyisobutylene, polybut-1-ene, or poly-4-methylpent-1-ene; ii) polymers of diolefins chosen from polyisoprene or polybutadiene; iii) polymers of cycloolefins chosen from cyclopentene or norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), or ultralow density polyethylene (ULDPE); v) thermoplastic olefins (TPO); vi) copolymers of any of (i)-(v); and vii) mixtures thereof; and
(a) from 0.01 wt. % to 15 wt. %, based on the total weight of the stabilized article of manufacture, of a stabilizer composition consisting essentially of:
(i) a stabilizing amount of an ultraviolet light absorber (UVA) selected from the group consisting of: orthohydroxybenzophenone compounds; orthohydroxyphenyl benzotriazole compounds; and mixtures thereof;
(ii) from 1 wt. % to 99 wt. % based on the total weight of the stabilizer composition of a co-active agent selected from the group consisting of $C_{12}$-$C_{60}$ monohydric alcohols; alkoxylated alcohols or monoalkyl ethers thereof; and mixtures thereof; and
(iii) a stabilizing amount of a hindered amine light stabilizer compound (HALS) comprising a functional group according to Formula (II):

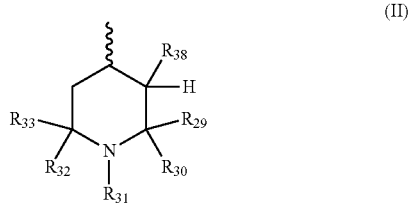

(II)

wherein
$R_{31}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; $R_{38}$ is chosen from: hydrogen; or $C_1$-$C_8$ hydrocarbyl; and
each of $R_{29}$, $R_{30}$, $R_{32}$, and $R_{33}$ is independently chosen from $C_1$-$C_{20}$ hydrocarbyl, or $R_{29}$ and $R_{30}$ and/or $R_{32}$ and $R_{33}$ taken together with the carbon to which they are attached form a $C_5$-$C_{10}$ cycloalkyl; or
a functional group according to Formula (IIa):

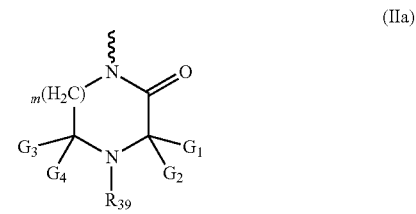

(IIa)

wherein
m is an integer from 1 to 2;
$R_{39}$ is chosen from: hydrogen; OH; $C_1$-$C_{20}$ hydrocarbyl; —$CH_2CN$; $C_1$-$C_{12}$ acyl; or $C_1$-$C_{18}$ alkoxy; and
each of $G_1$-$G_4$ is independently chosen from $C_1$-$C_{20}$ hydrocarbyl; or
mixtures of HALS compounds having functional groups according to Formula (II) and Formula (IIa); or
(b) a masterbatch concentrate comprising (i), (ii), and (iii), such that the final concentration of the co-active agent in the stabilized article of manufacture is from 0.01 wt. % to 1 wt. %, based on the weight of the stabilized article of manufacture.

23. An article of manufacture according to claim 19, wherein the stabilizer composition is as defined by claim 1.

24. An article of manufacture according to claim 19, wherein the ratio of co-active agent to UVA in the article of manufacture is from 200:1 to 1:50.

25. An article of manufacture according to claim 24, wherein the ratio of co-active agent to UVA in the article of manufacture is from 50:1 to 1:30.

26. An article of manufacture according to claim 19, wherein the contact angle with water at a surface of the article of greater than 50°.

27. A stabilized article of manufacture, having a contact angle with water at a surface of the article of greater than 20°, said stabilized article of manufacture comprising
a polymeric organic material to be stabilized; wherein the polymeric organic material is polyethylene or polypropylene and is blended with a stabilizing amount of a stabilizer composition; and
(a) from 0.01 wt. % to 15 wt. %, based on the total weight of the article of manufacture, of the stabilizer composition consisting essentially of:
(i) from 0.001 wt. % to 5 wt. % of a benzotriazole compound selected from the group consisting of 2-(2'-hydroxy-5'-methylphenyl)-benzotriazole; 2-(2'-hydroxy-3',5'-dimethylphenyl)-benzotriazole; 2-(2'-hydroxy-5-tert-octylphenyl)-2H-benzotriazole; 2-(3',5'-di-tert-butyl-2'-hydroxyphenyl)-5-chlorobenzotriazole; 2-(3'-tert-butyl-5'-methyl-2'-hydroxyphenyl)-5-chlorobenzotriazole; 2-(3',5'-di-tert-amyl-2'-hydroxyphenyl) benzotriazole; 2-(3',5'-bis(α,α-dimethylbenzyl)-2'-hydroxyphenyl)benzotriazole; the transesterification product of 2-[3'-tert-butyl-5'-(2-methoxycarbonylethyl)-2'-hydroxyphenyl]-2H-benzotriazole with polyethylene glycol 300; and mixtures thereof;

(ii) from 0.05 wt. % to 0.5 wt. % of a co-active agent in the form of an alkoxylated alcohol according to Formula (III):

$$R\text{—}(OCHR'CH_2)_y\text{—}OR'' \qquad (III),$$

wherein R is a $C_{12}$ to $C_{18}$ alkyl; each of R' and R" is H; and y is chosen from 1 to 75; and (iii) from 0.01 wt. % to 5 wt. % of a hindered amine light stabilizer compound selected from the group consisting of bis(2,2,6,6-tetramethylpiperidin-4-yl) sebacate; bis(1,2,2,6,6-pentamethylpiperidin-4-yl) sebacate; bis(1-octyloxy-2,2,6,6-tetramethylpiperidin-4-yl) sebacate; a condensate of 1-(2-hydroxyethyl)-2,2,6,6-tetramethyl-4-hydroxypiperidine and succinic acid; a condensate of N,N'-bis(2,2,6,6-tetramethylpiperidin-4-yl) hexamethylenediamine and 4-tert-octylamino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine, methylated; 2,2,6,6-tetramethylpiperidin-4-yl stearate; the condensate of 2-chloro-4,6-bis(4-n-butylamino-1,2,2,6,6-pentamethylpiperidyl)-1,3,5-triazine and 1,2-bis-(3-aminopropylamino) ethane; 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated; and mixtures thereof; or (b) a masterbatch concentrate comprising (i), (ii), and (iii) and at least one polymeric organic material identical to or compatible with a polymeric organic material to be stabilized by the masterbatch concentrate, wherein the stabilizer composition is present in an amount from 10 wt. % to 90 wt. %, based on the total weight of the masterbatch concentrate and wherein the final concentration of the co-active agent in the article of manufacture is from 0.01 wt % to 1 wt %, based on the weight of the article of manufacture.

28. A stabilized article of manufacture having a contact angle with water at a surface of the article of greater than 20°, said stabilized article of manufacture comprising: a polymeric organic material to be stabilized, wherein the polymeric organic material is polyethylene or polypropylene and is blended with a stabilizing amount of a stabilizer composition; and (a) from 0.01 wt. % to 15 wt. %, based on the total weight of the article of manufacture, of a stabilizer composition consisting essentially of:

(i) from 0.001 wt. % to 5 wt. % of a benzophenone compound selected from the group consisting of 2-hydroxy-4-methoxybenzophenone; 2,2'-dihydroxy-4-methoxybenzophenone; 2-hydroxy-4-octyloxybenzophenone; and mixtures thereof;

(ii) from 0.05 wt. % to 0.5 wt. % of a co-active agent in the form of an alkoxylated alcohol according to Formula (III):

$$R\text{—}(OCHR'CH_2)_y\text{—}OR'' \qquad (III),$$

wherein R is a $C_{12}$ to $C_{18}$ alkyl; each of R' and R" is H; and y is chosen from 1 to 75; and (iii) from 0.01 wt. % to 5 wt. % of a hindered amine light stabilizer compound selected from the group consisting of bis(2,2,6,6-tetramethylpiperidin-4-yl) sebacate; bis(1,2,2,6,6-pentamethylpiperidin-4-yl) sebacate; bis(1-octyloxy-2,2,6,6-tetramethylpiperidin-4-yl) sebacate; a condensate of 1-(2-hydroxyethyl)-2,2,6,6-tetramethyl-4-hydroxypiperidine and succinic acid; a condensate of N,N'-bis(2,2,6,6-tetramethylpiperidin-4-yl) hexamethylenediamine and 4-tert-octylamino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine; a condensate of N,N'-bis(2,2,6,6-tetramethylpiperidin-4-yl) hexamethylenediamine and 4-morpholino-2,6-dichloro-1,3,5-triazine, methylated; 2,2,6,6-tetramethylpiperidin-4-yl stearate; the condensate of 2-chloro-4,6-bis(4-n-butylamino-1,2,2,6,6-pentamethylpiperidyl)-1,3,5-triazine and 1,2-bis-(3-aminopropylamino) ethane; 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated; and mixtures thereof, or (b) a masterbatch concentrate comprising (i), (ii) and (iii) and at least one polymeric organic material identical to or compatible with the organic material to be stabilized by the masterbatch concentrate, wherein the stabilizer composition is present in an amount from 10 wt. % to 90 wt. %, based on the total weight of the masterbatch concentrate and wherein the final concentration of the co-active agent in the article of manufacture is from 0.01 wt % to 1 wt %, based on the weight of the article of manufacture.

* * * * *